United States Patent
Khanna

(10) Patent No.: US 12,147,142 B2
(45) Date of Patent: Nov. 19, 2024

(54) REMOTE MANAGEMENT OF A FACILITY

(71) Applicant: View, Inc., Milpitas, CA (US)

(72) Inventor: Nitin Khanna, Sunnyvale, CA (US)

(73) Assignee: View, Inc., San Jose, CA (US)

( * ) Notice: Subject to any disclaimer, the term of this patent is extended or adjusted under 35 U.S.C. 154(b) by 213 days.

(21) Appl. No.: 17/194,795

(22) Filed: Mar. 8, 2021

(65) Prior Publication Data

US 2021/0302799 A1   Sep. 30, 2021

Related U.S. Application Data

(63) Continuation of application No. PCT/US2020/018677, filed on Feb. 18, 2020, and a continuation-in-part of application No. PCT/US2021/017946, filed on Feb. 12, 2021, and a continuation-in-part of application No. 16/447,169,
(Continued)

(51) Int. Cl.
| | |
|---|---|
| *G02F 1/163* | (2006.01) |
| *E06B 9/24* | (2006.01) |
| *G05B 19/042* | (2006.01) |
| *H02J 50/20* | (2016.01) |
| *H02J 50/80* | (2016.01) |

(52) U.S. Cl.
CPC .......... *G02F 1/163* (2013.01); *E06B 9/24* (2013.01); *G05B 19/042* (2013.01); *H02J 50/20* (2016.02); *H02J 50/80* (2016.02); *E06B 2009/2417* (2013.01); *E06B 2009/2464* (2013.01); *G05B 2219/25011* (2013.01); *G05B 2219/25252* (2013.01); *G05B 2219/2614* (2013.01); *G05B 2219/2628* (2013.01)

(58) Field of Classification Search
CPC .......... G02F 1/163; H02J 50/80; H02J 50/20; E06B 9/24; G05B 19/042
USPC ......................................................... 700/276
See application file for complete search history.

(56) References Cited

U.S. PATENT DOCUMENTS

| | | |
|---|---|---|
| 4,129,861 A | 12/1978 | Giglia |
| 4,553,085 A | 11/1985 | Canzano |

(Continued)

FOREIGN PATENT DOCUMENTS

| | | |
|---|---|---|
| AU | 2015101660 A4 | 12/2015 |
| CN | 1161092 A | 10/1997 |

(Continued)

OTHER PUBLICATIONS

"Halio Rooftop Sensor Kit (Model SR500)," Product Data Sheet, Kinestral Technologies, 2020, 4 pp.
(Continued)

*Primary Examiner* — Mohammad Ali
*Assistant Examiner* — Joshua T Sanders
(74) *Attorney, Agent, or Firm* — Weaver Austin Villeneuve & Sampson LLP; Brian D. Griedel

(57) ABSTRACT

Systems, apparatuses, methods, and non-transitory computer readable program instructions relating to controlling one or more devices of a facility where a hierarchy of controllers includes a plurality of control levels of which only a single control level is physically disposed in the facility, and the single control level is configured to communicatively couple to the one or more devices and control, or direct control of, the one or more devices.

15 Claims, 12 Drawing Sheets

Related U.S. Application Data filed on Jun. 20, 2019, now Pat. No. 11,743,071, and a continuation-in-part of application No. 17/083,128, filed on Oct. 28, 2020, now abandoned, which is a continuation of application No. 16/664,089, filed on Oct. 25, 2019, now Pat. No. 11,294,254, which is a continuation-in-part of application No. PCT/US2019/030467, filed on May 2, 2019, and a continuation-in-part of application No. PCT/US2018/029460, filed on Apr. 25, 2018, application No. 17/194,795 is a continuation-in-part of application No. 17/081,809, filed on Oct. 27, 2020, now Pat. No. 11,460,749, which is a continuation of application No. 16/608,159, filed as application No. PCT/US2018/029406 on Apr. 25, 2018, now Pat. No. 11,300,849.

(60) Provisional application No. 62/988,861, filed on Mar. 12, 2020, provisional application No. 62/807,668, filed on Feb. 19, 2019, provisional application No. 63/146,365, filed on Feb. 5, 2021, provisional application No. 63/027,452, filed on May 20, 2020, provisional application No. 62/978,755, filed on Feb. 19, 2020, provisional application No. 62/977,001, filed on Feb. 14, 2020, provisional application No. 62/688,957, filed on Jun. 22, 2018, provisional application No. 62/858,100, filed on Jun. 6, 2019, provisional application No. 62/803,324, filed on Feb. 8, 2019, provisional application No. 62/768,775, filed on Nov. 16, 2018, provisional application No. 62/666,033, filed on May 2, 2018, provisional application No. 62/607,618, filed on Dec. 19, 2017, provisional application No. 62/523,606, filed on Jun. 22, 2017, provisional application No. 62/507,704, filed on May 17, 2017, provisional application No. 62/506,514, filed on May 15, 2017, provisional application No. 62/490,457, filed on Apr. 26, 2017.

(56) References Cited

U.S. PATENT DOCUMENTS

| | | |
|---|---|---|
| 5,384,653 A | 1/1995 | Benson et al. |
| 5,416,617 A | 5/1995 | Loiseaux et al. |
| 5,440,317 A | 8/1995 | Jalloul et al. |
| 5,477,152 A | 12/1995 | Hayhurst |
| 5,579,149 A | 11/1996 | Moret et al. |
| 5,754,329 A | 5/1998 | Coleman |
| 5,847,858 A | 12/1998 | Krings |
| 5,867,495 A | 2/1999 | Elliott et al. |
| 6,039,390 A | 3/2000 | Agrawal et al. |
| 6,055,089 A | 4/2000 | Schulz et al. |
| 6,066,801 A | 5/2000 | Kodaira et al. |
| 6,262,831 B1 | 7/2001 | Bauer et al. |
| 6,344,748 B1 | 2/2002 | Gannon |
| 6,407,847 B1 | 6/2002 | Poll et al. |
| 6,567,708 B1 | 5/2003 | Bechtel et al. |
| 6,707,590 B1 | 3/2004 | Bartsch |
| 6,795,226 B2 | 9/2004 | Agrawal |
| 6,897,936 B1 | 5/2005 | Li et al. |
| 6,965,813 B2 | 11/2005 | Granqvist et al. |
| 7,133,181 B2 | 11/2006 | Greer |
| 7,347,608 B2 | 3/2008 | Emde |
| 7,391,420 B1 | 6/2008 | Coyne |
| 7,536,370 B2 | 5/2009 | Masurkar |
| 7,554,437 B2 | 6/2009 | Axelsen |
| 7,684,105 B2 | 3/2010 | Lamontagne et al. |
| 7,739,138 B2 | 6/2010 | Chauhan et al. |
| 7,800,812 B2 | 9/2010 | Moskowitz |
| 7,941,245 B1 | 5/2011 | Popat |
| 8,022,977 B2 | 9/2011 | Kanade |
| 8,149,756 B2 | 4/2012 | Hottinen |
| 8,213,074 B1 | 7/2012 | Shrivastava et al. |
| 8,254,013 B2 | 8/2012 | Mehtani et al. |
| 8,290,627 B2 | 10/2012 | Richards et al. |
| 8,686,984 B2 | 4/2014 | Hummel |
| 8,705,162 B2 | 4/2014 | Brown et al. |
| 8,843,238 B2 | 9/2014 | Wenzel et al. |
| 8,963,378 B1 | 2/2015 | Fornage et al. |
| 8,976,440 B2 | 3/2015 | Berland et al. |
| 9,081,246 B2 | 7/2015 | Rozbicki |
| 9,128,346 B2 | 9/2015 | Shrivastava et al. |
| 9,170,008 B2 | 10/2015 | Reul et al. |
| 9,225,286 B1 | 12/2015 | Tweedie |
| 9,300,581 B1 | 3/2016 | Hui et al. |
| 9,341,912 B2 | 5/2016 | Shrivastava |
| 9,348,192 B2 | 5/2016 | Brown et al. |
| 9,412,290 B2 | 8/2016 | Jack |
| 9,442,338 B2 | 9/2016 | Uhm et al. |
| 9,442,341 B2 | 9/2016 | Shrivastava et al. |
| 9,454,055 B2 | 9/2016 | Brown et al. |
| 9,470,947 B2 | 10/2016 | Nagel et al. |
| 9,494,055 B2 | 11/2016 | Rusche |
| 9,551,913 B2 | 1/2017 | Kim et al. |
| 9,677,327 B1 | 6/2017 | Nagel et al. |
| 9,690,174 B2 | 6/2017 | Wang |
| 9,709,869 B2 | 7/2017 | Baumann et al. |
| 9,740,074 B2 | 8/2017 | Agrawal et al. |
| 9,778,533 B2 | 10/2017 | Bertolini |
| 9,791,701 B2 | 10/2017 | Ato |
| 9,898,912 B1 | 2/2018 | Jordan, II et al. |
| 9,906,956 B1 | 2/2018 | Huang |
| 9,917,867 B2 | 3/2018 | Sallam |
| 9,946,138 B2 | 4/2018 | Shrivastava et al. |
| 9,965,865 B1 | 5/2018 | Agrawal |
| 10,001,691 B2 | 6/2018 | Shrivastava et al. |
| 10,049,402 B1 | 8/2018 | Miranda |
| 10,067,344 B2 | 9/2018 | Kilcher |
| 10,110,631 B2 | 10/2018 | Bauer et al. |
| 10,137,764 B2 | 11/2018 | Driscoll et al. |
| 10,268,098 B2 | 4/2019 | Shrivastava et al. |
| 10,286,839 B1 | 5/2019 | Mazuir et al. |
| 10,288,971 B2 | 5/2019 | Phillips et al. |
| 10,303,035 B2 | 5/2019 | Brown et al. |
| 10,329,839 B2 | 6/2019 | Fasi et al. |
| 10,379,265 B2 | 8/2019 | Brown |
| 10,387,221 B2 | 8/2019 | Shrivastava et al. |
| 10,394,070 B2 | 8/2019 | Park |
| 10,409,652 B2 | 9/2019 | Shrivastava et al. |
| 10,416,520 B2 | 9/2019 | Jovanovic |
| 10,460,636 B2 | 10/2019 | Salmimaa |
| 10,481,459 B2 | 11/2019 | Shrivastava et al. |
| 10,488,837 B2 | 11/2019 | Cirino |
| 10,505,751 B2 | 12/2019 | Casilli |
| 10,514,963 B2 | 12/2019 | Shrivastava et al. |
| 10,532,268 B2 | 1/2020 | Tran et al. |
| 10,699,604 B2 | 6/2020 | Hicks |
| 10,720,766 B2 | 7/2020 | Krammer et al. |
| 10,746,761 B2 | 8/2020 | Rayman et al. |
| 10,747,082 B2 | 8/2020 | Shrivastava et al. |
| 10,768,582 B2 | 9/2020 | Shrivastava et al. |
| 10,859,983 B2 | 12/2020 | Shrivastava et al. |
| 10,917,259 B1 | 2/2021 | Chein et al. |
| 10,921,675 B2 | 2/2021 | Barnum et al. |
| 10,923,226 B2 | 2/2021 | Macary |
| 10,949,267 B2 | 3/2021 | Shrivastava et al. |
| 10,954,677 B1 | 3/2021 | Scanlin |
| 10,956,231 B2 | 3/2021 | Shrivastava et al. |
| 10,982,487 B2 | 4/2021 | Ramirez |
| 10,989,977 B2 | 4/2021 | Shrivastava et al. |
| 11,016,357 B2 | 5/2021 | Brown et al. |
| 11,054,792 B2 | 7/2021 | Shrivastava et al. |
| 11,073,800 B2 | 7/2021 | Shrivastava et al. |
| 11,150,616 B2 | 10/2021 | Shrivastava et al. |
| 11,168,910 B2 | 11/2021 | Alcala Perez |
| 11,182,970 B1 | 11/2021 | Kathol |
| 11,294,254 B2 | 4/2022 | Patterson et al. |
| 11,384,596 B2 | 7/2022 | Shrivastava et al. |
| 11,436,061 B2 | 9/2022 | Shrivastava et al. |
| 11,566,468 B2 | 1/2023 | Vigano et al. |
| 11,579,571 B2 | 2/2023 | Shrivastava et al. |

(56) References Cited

U.S. PATENT DOCUMENTS

| | | |
|---|---|---|
| 11,681,197 B2 | 6/2023 | Shrivastava et al. |
| 11,687,045 B2 | 6/2023 | Shrivastava et al. |
| 11,733,660 B2 | 8/2023 | Shrivastava et al. |
| 11,740,948 B2 | 8/2023 | Shrivastava et al. |
| 11,750,594 B2 | 9/2023 | Vangati et al. |
| 11,754,902 B2 | 9/2023 | Brown et al. |
| 11,868,103 B2 | 1/2024 | Shrivastava et al. |
| 11,882,111 B2 | 1/2024 | Vangati et al. |
| 11,892,737 B2 | 2/2024 | Shrivastava et al. |
| 11,948,015 B2 | 4/2024 | Shrivastava et al. |
| 2001/0005083 A1 | 6/2001 | Serizawa et al. |
| 2002/0024424 A1 | 2/2002 | Burns et al. |
| 2002/0027504 A1 | 3/2002 | Davis et al. |
| 2002/0149829 A1 | 10/2002 | Mochizuka et al. |
| 2003/0039257 A1 | 2/2003 | Manis |
| 2003/0101154 A1 | 5/2003 | Hisano et al. |
| 2003/0169574 A1 | 9/2003 | Maruyama et al. |
| 2003/0191546 A1 | 10/2003 | Bechtel et al. |
| 2003/0227663 A1 | 12/2003 | Agrawal et al. |
| 2004/0001056 A1 | 1/2004 | Atherton et al. |
| 2004/0215520 A1 | 10/2004 | Butler et al. |
| 2004/0236620 A1 | 11/2004 | Chauhan et al. |
| 2005/0157675 A1 | 7/2005 | Feder et al. |
| 2005/0270620 A1 | 12/2005 | Bauer et al. |
| 2005/0270621 A1 | 12/2005 | Bauer et al. |
| 2006/0018000 A1 | 1/2006 | Greer |
| 2006/0107616 A1 | 5/2006 | Ratti et al. |
| 2006/0174333 A1 | 8/2006 | Thomas et al. |
| 2006/0279527 A1 | 12/2006 | Zehner et al. |
| 2007/0008603 A1 | 1/2007 | Sotzing et al. |
| 2007/0053053 A1 | 3/2007 | Moskowitz |
| 2007/0067048 A1 | 3/2007 | Bechtel et al. |
| 2007/0115979 A1 | 5/2007 | Balay et al. |
| 2007/0188676 A1 | 8/2007 | Choi |
| 2007/0285759 A1 | 12/2007 | Ash et al. |
| 2008/0042012 A1 | 2/2008 | Callahan et al. |
| 2008/0043316 A2 | 2/2008 | Moskowitz |
| 2008/0048101 A1 | 2/2008 | Romig et al. |
| 2008/0147847 A1 | 6/2008 | Pitkow et al. |
| 2008/0172312 A1 | 7/2008 | Synesiou et al. |
| 2008/0184350 A1 | 7/2008 | Chu |
| 2008/0186562 A2 | 8/2008 | Moskowitz |
| 2008/0198584 A1 | 8/2008 | Fouraux |
| 2008/0211682 A1 | 9/2008 | Hyland et al. |
| 2008/0238706 A1 | 10/2008 | Kenwright |
| 2009/0015740 A1 | 1/2009 | Sagitov et al. |
| 2009/0163170 A1 | 6/2009 | Norp et al. |
| 2009/0271042 A1 | 10/2009 | Voysey |
| 2009/0323160 A1 | 12/2009 | Egerton et al. |
| 2010/0039410 A1 | 2/2010 | Becker et al. |
| 2010/0052844 A1 | 3/2010 | Wesby |
| 2010/0172010 A1 | 7/2010 | Gustavsson et al. |
| 2010/0188057 A1 | 7/2010 | Tarng |
| 2010/0228854 A1 | 9/2010 | Morrison et al. |
| 2010/0243427 A1 | 9/2010 | Kozlowski et al. |
| 2010/0245973 A1 | 9/2010 | Wang et al. |
| 2010/0274366 A1 | 10/2010 | Fata et al. |
| 2010/0286839 A1* | 11/2010 | Iaquinangelo ....... G05B 19/042 700/295 |
| 2010/0286937 A1 | 11/2010 | Hedley et al. |
| 2010/0315693 A1 | 12/2010 | Lam et al. |
| 2011/0050756 A1 | 3/2011 | Cassidy et al. |
| 2011/0071685 A1 | 3/2011 | Huneycutt et al. |
| 2011/0083152 A1 | 4/2011 | Centore, III et al. |
| 2011/0097081 A1 | 4/2011 | Gupta et al. |
| 2011/0124313 A1 | 5/2011 | Jones |
| 2011/0148218 A1 | 6/2011 | Rozbicki |
| 2011/0154022 A1 | 6/2011 | Cheng et al. |
| 2011/0164317 A1 | 7/2011 | Vergohl et al. |
| 2011/0223886 A1 | 9/2011 | Nasielski et al. |
| 2011/0261429 A1 | 10/2011 | Sbar et al. |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0086363 A1 | 4/2012 | Golding et al. |
| 2012/0140492 A1 | 6/2012 | Alvarez |
| 2012/0188627 A1 | 7/2012 | Chen et al. |
| 2012/0190386 A1 | 7/2012 | Anderson |
| 2012/0194895 A1 | 8/2012 | Podbelski et al. |
| 2012/0229275 A1 | 9/2012 | Mattern |
| 2012/0235493 A1 | 9/2012 | Kiuchi et al. |
| 2012/0239209 A1 | 9/2012 | Brown et al. |
| 2012/0259583 A1 | 10/2012 | Noboa et al. |
| 2012/0268369 A1 | 10/2012 | Kikkeri |
| 2012/0275008 A1 | 11/2012 | Pradhan |
| 2012/0293855 A1 | 11/2012 | Shrivastava et al. |
| 2013/0013921 A1 | 1/2013 | Bhathena et al. |
| 2013/0024029 A1 | 1/2013 | Tran et al. |
| 2013/0054033 A1 | 2/2013 | Casilli |
| 2013/0060357 A1 | 3/2013 | Li et al. |
| 2013/0073681 A1 | 3/2013 | Jiang et al. |
| 2013/0085614 A1 | 4/2013 | Wenzel et al. |
| 2013/0085615 A1 | 4/2013 | Barker |
| 2013/0085616 A1 | 4/2013 | Wenzel |
| 2013/0088331 A1 | 4/2013 | Cho et al. |
| 2013/0131869 A1 | 5/2013 | Majewski et al. |
| 2013/0157493 A1 | 6/2013 | Brown |
| 2013/0158790 A1 | 6/2013 | McIntyre, Jr. et al. |
| 2013/0182308 A1 | 7/2013 | Guarr et al. |
| 2013/0196600 A1 | 8/2013 | Capers et al. |
| 2013/0241299 A1 | 9/2013 | Snyker et al. |
| 2013/0243425 A1 | 9/2013 | Franklin |
| 2013/0271812 A1* | 10/2013 | Brown ................. G01J 1/4228 359/275 |
| 2013/0271813 A1 | 10/2013 | Brown |
| 2013/0271814 A1 | 10/2013 | Brown |
| 2013/0278989 A1 | 10/2013 | Lam et al. |
| 2013/0306615 A1 | 11/2013 | Rozbicki et al. |
| 2014/0101573 A1 | 4/2014 | Kuo |
| 2014/0156097 A1 | 6/2014 | Nesler et al. |
| 2014/0160550 A1 | 6/2014 | Brown et al. |
| 2014/0170863 A1 | 6/2014 | Brown |
| 2014/0171016 A1 | 6/2014 | Sennett et al. |
| 2014/0172557 A1 | 6/2014 | Eden et al. |
| 2014/0182350 A1 | 7/2014 | Bhavaraju et al. |
| 2014/0236323 A1* | 8/2014 | Brown ...................... E06B 9/24 700/90 |
| 2014/0243033 A1 | 8/2014 | Wala et al. |
| 2014/0249876 A1 | 9/2014 | Wu et al. |
| 2014/0273911 A1 | 9/2014 | Dunn et al. |
| 2014/0274458 A1 | 9/2014 | Kronenberg et al. |
| 2014/0300945 A1 | 10/2014 | Parker |
| 2014/0303788 A1 | 10/2014 | Sanders et al. |
| 2014/0330538 A1 | 11/2014 | Conklin et al. |
| 2014/0347190 A1 | 11/2014 | Grimm |
| 2014/0349497 A1 | 11/2014 | Brown et al. |
| 2014/0367057 A1 | 12/2014 | Feldstein |
| 2014/0368899 A1 | 12/2014 | Greer |
| 2014/0371931 A1 | 12/2014 | Lin et al. |
| 2015/0002919 A1 | 1/2015 | Jack et al. |
| 2015/0003822 A1 | 1/2015 | Fukada et al. |
| 2015/0023661 A1 | 1/2015 | Borkenhagen et al. |
| 2015/0098121 A1 | 4/2015 | Turnbull et al. |
| 2015/0116811 A1* | 4/2015 | Shrivastava ............. H04Q 9/00 359/275 |
| 2015/0120297 A1 | 4/2015 | Meruva |
| 2015/0129140 A1 | 5/2015 | Dean et al. |
| 2015/0137792 A1 | 5/2015 | Filippi et al. |
| 2015/0160525 A1 | 6/2015 | Shi |
| 2015/0338713 A1 | 11/2015 | Brown |
| 2015/0362819 A1 | 12/2015 | Bjornard |
| 2015/0378230 A1 | 12/2015 | Gudmunson et al. |
| 2015/0378231 A1 | 12/2015 | Greer et al. |
| 2016/0070151 A1 | 3/2016 | Shrivastava et al. |
| 2016/0109778 A1 | 4/2016 | Shrivastava et al. |
| 2016/0134932 A1 | 5/2016 | Karp et al. |
| 2016/0135175 A1 | 5/2016 | Tarlazzi |
| 2016/0147100 A1 | 5/2016 | Van Oosten et al. |
| 2016/0154290 A1 | 6/2016 | Brown et al. |
| 2016/0202589 A1* | 7/2016 | Nagel ...................... E06B 9/24 359/275 |
| 2016/0203403 A1 | 7/2016 | Nagel et al. |
| 2016/0225832 A1 | 8/2016 | Kwon et al. |
| 2016/0231354 A1 | 8/2016 | Rayman et al. |

(56) References Cited

U.S. PATENT DOCUMENTS

| | | |
|---|---|---|
| 2016/0261837 A1 | 9/2016 | Thompson et al. |
| 2017/0044057 A1 | 2/2017 | Rozbicki |
| 2017/0063429 A1 | 3/2017 | Flask |
| 2017/0068414 A1 | 3/2017 | Plumb |
| 2017/0070457 A1 | 3/2017 | Sachs |
| 2017/0075183 A1 | 3/2017 | Brown |
| 2017/0075323 A1 | 3/2017 | Shrivastava et al. |
| 2017/0077988 A1 | 3/2017 | Flask |
| 2017/0080341 A1 | 3/2017 | Mao et al. |
| 2017/0082903 A1 | 3/2017 | Vigano et al. |
| 2017/0085834 A1 | 3/2017 | Kim et al. |
| 2017/0097259 A1 | 4/2017 | Brown et al. |
| 2017/0139301 A1 | 5/2017 | Messere et al. |
| 2017/0146884 A1 | 5/2017 | Vigano |
| 2017/0147023 A1* | 5/2017 | Kumar ................ G05F 1/66 |
| 2017/0197494 A1 | 7/2017 | Li |
| 2017/0200424 A1 | 7/2017 | Xu et al. |
| 2017/0212400 A1 | 7/2017 | Shrivastava et al. |
| 2017/0234067 A1 | 8/2017 | Fasi et al. |
| 2017/0243122 A1 | 8/2017 | Komatsu et al. |
| 2017/0251488 A1 | 8/2017 | Urban et al. |
| 2017/0253801 A1 | 9/2017 | Bae et al. |
| 2017/0264865 A1 | 9/2017 | Huangfu |
| 2017/0272317 A1 | 9/2017 | Singla et al. |
| 2017/0277342 A1 | 9/2017 | Hong |
| 2017/0279930 A1 | 9/2017 | Zhang |
| 2017/0284691 A1* | 10/2017 | Sinha ................ F24F 11/77 |
| 2017/0285432 A1 | 10/2017 | Shrivastava et al. |
| 2017/0285433 A1 | 10/2017 | Shrivastava et al. |
| 2017/0328121 A1 | 11/2017 | Purdy et al. |
| 2017/0347129 A1 | 11/2017 | Levi et al. |
| 2017/0364046 A1 | 12/2017 | Westrick, Jr. et al. |
| 2017/0364395 A1 | 12/2017 | Shrivastava et al. |
| 2017/0374255 A1 | 12/2017 | Campbell |
| 2018/0004059 A1 | 1/2018 | Jovanovic |
| 2018/0076978 A1 | 3/2018 | Schubert et al. |
| 2018/0090992 A1 | 3/2018 | Shrivastava et al. |
| 2018/0106098 A1 | 4/2018 | Unveren et al. |
| 2018/0129172 A1 | 5/2018 | Shrivastava et al. |
| 2018/0144712 A1 | 5/2018 | Threlkel et al. |
| 2018/0157141 A1 | 6/2018 | Brown |
| 2018/0176799 A1 | 6/2018 | Lange et al. |
| 2018/0188627 A1 | 7/2018 | Vigano |
| 2018/0189117 A1 | 7/2018 | Shrivastava et al. |
| 2018/0241587 A1* | 8/2018 | Bull ................ H04L 12/66 |
| 2018/0259804 A1 | 9/2018 | Bae |
| 2018/0267380 A1 | 9/2018 | Shrivastava et al. |
| 2018/0284555 A1 | 10/2018 | Klawuhn et al. |
| 2018/0321042 A1 | 11/2018 | Brewer et al. |
| 2018/0335939 A1 | 11/2018 | Karunamuni et al. |
| 2019/0011798 A9 | 1/2019 | Brown |
| 2019/0025661 A9 | 1/2019 | Brown |
| 2019/0028287 A1 | 1/2019 | Jin et al. |
| 2019/0155122 A1 | 5/2019 | Brown et al. |
| 2019/0215694 A1 | 7/2019 | Rubin et al. |
| 2019/0235451 A1 | 8/2019 | Shrivastava et al. |
| 2019/0271895 A1 | 9/2019 | Shrivastava et al. |
| 2019/0320033 A1 | 10/2019 | Nagata et al. |
| 2019/0327320 A1 | 10/2019 | Rubin et al. |
| 2019/0331978 A1 | 10/2019 | Shrivastava et al. |
| 2019/0347141 A1 | 11/2019 | Shrivastava et al. |
| 2019/0353972 A1 | 11/2019 | Shrivastava et al. |
| 2019/0356508 A1 | 11/2019 | Trikha |
| 2019/0361411 A1 | 11/2019 | Park et al. |
| 2019/0384652 A1 | 12/2019 | Shrivastava et al. |
| 2020/0041963 A1 | 2/2020 | Shrivastava et al. |
| 2020/0041967 A1 | 2/2020 | Shrivastava et al. |
| 2020/0045261 A1 | 2/2020 | Lim et al. |
| 2020/0057421 A1 | 2/2020 | Trikha et al. |
| 2020/0067865 A1 | 2/2020 | Jiménez et al. |
| 2020/0096775 A1 | 3/2020 | Franklin |
| 2020/0103841 A1 | 4/2020 | Pillai et al. |
| 2020/0150508 A1 | 5/2020 | Patterson et al. |
| 2020/0150602 A1 | 5/2020 | Trikha |
| 2020/0162856 A1 | 5/2020 | Ziv et al. |
| 2020/0241379 A1 | 7/2020 | Barnum et al. |
| 2020/0257179 A1 | 8/2020 | Barnum et al. |
| 2020/0260556 A1 | 8/2020 | Rozbicki |
| 2020/0387041 A1 | 12/2020 | Shrivastava et al. |
| 2021/0021788 A1 | 1/2021 | Mcnelley et al. |
| 2021/0041759 A1 | 2/2021 | Trikha |
| 2021/0063836 A1 | 3/2021 | Patterson et al. |
| 2021/0132458 A1 | 5/2021 | Trikha et al. |
| 2021/0165696 A1 | 6/2021 | Shrivastava et al. |
| 2021/0191221 A1 | 6/2021 | Shrivastava et al. |
| 2021/0210053 A1 | 7/2021 | Ng et al. |
| 2021/0232015 A1 | 7/2021 | Brown et al. |
| 2021/0246719 A1 | 8/2021 | Shrivastava et al. |
| 2021/0373511 A1 | 12/2021 | Shrivastava et al. |
| 2021/0383804 A1 | 12/2021 | Makker et al. |
| 2021/0390953 A1 | 12/2021 | Makker et al. |
| 2022/0011729 A1 | 1/2022 | Shrivastava et al. |
| 2022/0121078 A1 | 4/2022 | Vollen et al. |
| 2022/0159077 A1 | 5/2022 | Shrivastava et al. |
| 2022/0171248 A1 | 6/2022 | Shrivastava et al. |
| 2022/0179275 A1 | 6/2022 | Patterson et al. |
| 2022/0231399 A1 | 7/2022 | Brown et al. |
| 2022/0298850 A1 | 9/2022 | Shrivastava et al. |
| 2022/0316269 A1 | 10/2022 | Shrivastava et al. |
| 2022/0337596 A1 | 10/2022 | Smith et al. |
| 2022/0365494 A1 | 11/2022 | Shrivastava et al. |
| 2022/0365830 A1 | 11/2022 | Shrivastava et al. |
| 2023/0041490 A1 | 2/2023 | Vangati et al. |
| 2023/0074720 A1 | 3/2023 | Brown et al. |
| 2023/0111311 A1 | 4/2023 | Shrivastava et al. |
| 2023/0120049 A1 | 4/2023 | Vangati et al. |
| 2023/0333520 A1 | 10/2023 | Shrivastava et al. |
| 2023/0341740 A1 | 10/2023 | Shrivastava et al. |
| 2023/0393542 A1 | 12/2023 | Shrivastava et al. |
| 2024/0171566 A1 | 5/2024 | Vangati et al. |
| 2024/0192563 A1 | 6/2024 | Hur et al. |
| 2024/0220337 A1 | 7/2024 | Shrivastava et al. |
| 2024/0242717 A1 | 7/2024 | Makker et al. |
| 2024/0276204 A1 | 8/2024 | Lee et al. |

FOREIGN PATENT DOCUMENTS

| | | |
|---|---|---|
| CN | 1219251 A | 6/1999 |
| CN | 1311935 A | 9/2001 |
| CN | 1599280 A | 3/2005 |
| CN | 1692348 | 11/2005 |
| CN | 1692348 A | 11/2005 |
| CN | 1723658 A | 1/2006 |
| CN | 101154104 A | 4/2008 |
| CN | 101253460 A | 8/2008 |
| CN | 101501757 A | 8/2009 |
| CN | 101510078 | 8/2009 |
| CN | 101510078 A | 8/2009 |
| CN | 101856193 A | 10/2010 |
| CN | 102325326 A | 1/2012 |
| CN | 102414601 A | 4/2012 |
| CN | 102598469 | 7/2012 |
| CN | 102598469 A | 7/2012 |
| CN | 202443309 U | 9/2012 |
| CN | 103051737 A | 4/2013 |
| CN | 103168269 A | 6/2013 |
| CN | 203019761 U | 6/2013 |
| CN | 103238107 A | 8/2013 |
| CN | 103282841 A | 9/2013 |
| CN | 103327126 | 9/2013 |
| CN | 103327126 A | 9/2013 |
| CN | 103345236 A | 10/2013 |
| CN | 103547965 | 1/2014 |
| CN | 103547965 A | 1/2014 |
| CN | 103649826 A | 3/2014 |
| CN | 103842735 A | 6/2014 |
| CN | 103987909 A | 8/2014 |
| CN | 104114804 A | 10/2014 |
| CN | 104321497 A | 1/2015 |
| CN | 104335595 A | 2/2015 |
| CN | 105143586 A | 12/2015 |
| CN | 105974160 A | 9/2016 |
| CN | 106125444 A | 11/2016 |
| CN | 106164973 A | 11/2016 |

(56) References Cited

FOREIGN PATENT DOCUMENTS

| | | |
|---|---|---|
| CN | 106462023 A | 2/2017 |
| CN | 205992531 U | 3/2017 |
| CN | 106575064 A | 4/2017 |
| CN | 107111287 A | 8/2017 |
| CN | 107850815 A | 3/2018 |
| CN | 207409225 | 5/2018 |
| CN | 108139644 A | 6/2018 |
| EP | 0917667 A1 | 5/1999 |
| EP | 1929701 A2 | 6/2008 |
| EP | 2090961 A1 | 8/2009 |
| EP | 2357544 A2 | 8/2011 |
| EP | 2648086 A2 | 10/2013 |
| EP | 2764998 A1 | 8/2014 |
| EP | 2357544 B1 | 10/2014 |
| EP | 3015915 A1 | 5/2016 |
| EP | 2837205 B1 | 2/2017 |
| EP | 3293941 A1 | 3/2018 |
| EP | 3328000 A1 | 5/2018 |
| EP | 3352053 A1 | 7/2018 |
| EP | 3230943 B1 | 7/2021 |
| JP | H10215492 A | 8/1998 |
| JP | H10246078 A | 9/1998 |
| JP | H11500838 A | 1/1999 |
| JP | 2003284160 | 10/2003 |
| JP | 2003284160 A | 10/2003 |
| JP | 2004332350 A | 11/2004 |
| JP | 2006287729 A | 10/2006 |
| JP | 2007156909 | 6/2007 |
| JP | 2007156909 A | 6/2007 |
| JP | 4139109 B2 | 8/2008 |
| JP | 2008293024 A | 12/2008 |
| JP | 2009005116 A | 1/2009 |
| JP | 2010152646 A | 7/2010 |
| JP | 2012017614 A | 1/2012 |
| JP | 2012533060 A | 12/2012 |
| JP | 3184348 U | 6/2013 |
| JP | 2018050290 A | 3/2018 |
| JP | 2018507337 A | 3/2018 |
| JP | 2019508946 A | 3/2019 |
| JP | 2019186771 A | 10/2019 |
| KR | 19990088613 A | 12/1999 |
| KR | 20030040361 A | 5/2003 |
| KR | 20030073121 A | 9/2003 |
| KR | 20070089370 A | 8/2007 |
| KR | 20090066107 A | 6/2009 |
| KR | 20110003698 A | 1/2011 |
| KR | 20120045915 | 5/2012 |
| KR | 20120045915 A | 5/2012 |
| KR | 20120092921 A | 8/2012 |
| KR | 20120117409 A | 10/2012 |
| KR | 20130023668 A | 3/2013 |
| KR | 20130026740 A | 3/2013 |
| KR | 20130112693 A | 10/2013 |
| KR | 101323668 B1 | 11/2013 |
| KR | 101346862 B | 1/2014 |
| KR | 101346862 B1 | 1/2014 |
| KR | 20140004175 | 1/2014 |
| KR | 20140004175 A | 1/2014 |
| KR | 101471443 B1 | 12/2014 |
| KR | 20150060051 A | 6/2015 |
| KR | 20160012564 A | 2/2016 |
| KR | 20160105005 A | 9/2016 |
| KR | 20170022132 A | 3/2017 |
| KR | 101799323 B1 | 12/2017 |
| KR | 20190142032 A | 12/2019 |
| KR | 20210032133 A | 3/2021 |
| KR | 20210039721 A | 4/2021 |
| RU | 104808 U1 | 5/2011 |
| RU | 2012107324 | 9/2013 |
| RU | 2012107324 A | 9/2013 |
| TW | 200532346 A | 10/2005 |
| TW | 201029838 A | 8/2010 |
| TW | 201635840 A | 10/2016 |
| TW | I607269 B | 12/2017 |
| WO | WO-0124700 A1 | 4/2001 |
| WO | WO-03092309 A1 | 11/2003 |
| WO | WO-2012079159 A1 | 6/2012 |
| WO | WO-2012125332 A2 | 9/2012 |
| WO | WO-2012125348 A2 | 9/2012 |
| WO | WO-2012130262 A1 | 10/2012 |
| WO | WO-2013046112 A1 | 4/2013 |
| WO | 2013121103 | 8/2013 |
| WO | 2013159778 A1 | 10/2013 |
| WO | WO-2013155467 A1 | 10/2013 |
| WO | WO-2013158464 A1 | 10/2013 |
| WO | WO-2013177575 A1 | 11/2013 |
| WO | 2014032023 | 2/2014 |
| WO | WO-2014059268 A2 | 4/2014 |
| WO | 2014082092 | 5/2014 |
| WO | WO-2014082092 A1 | 5/2014 |
| WO | 2014121809 | 8/2014 |
| WO | 2014130471 | 8/2014 |
| WO | WO-2014121809 A1 | 8/2014 |
| WO | WO-2014124701 A1 * | 8/2014 ......... G05B 19/0426 |
| WO | WO-2014124710 A1 | 8/2014 |
| WO | WO-2014130471 A1 | 8/2014 |
| WO | 2014209812 | 12/2014 |
| WO | WO-2015051262 A1 | 4/2015 |
| WO | 2015100419 | 7/2015 |
| WO | WO-2015113592 A1 | 8/2015 |
| WO | WO-2015134789 A1 | 9/2015 |
| WO | WO-2016004109 A1 | 1/2016 |
| WO | 2016054112 | 4/2016 |
| WO | 2016072620 A1 | 5/2016 |
| WO | 2016085964 | 6/2016 |
| WO | 2016094139 A1 | 6/2016 |
| WO | 2016094445 | 6/2016 |
| WO | WO-2016085964 A1 | 6/2016 |
| WO | WO-2016094445 A1 | 6/2016 |
| WO | WO-2016153467 A1 | 9/2016 |
| WO | 16183059 | 11/2016 |
| WO | WO-2016183059 A1 | 11/2016 |
| WO | WO-2017007841 A1 | 1/2017 |
| WO | WO-2017007942 A1 | 1/2017 |
| WO | 2017035650 A1 | 3/2017 |
| WO | 17062592 | 4/2017 |
| WO | 2017058568 | 4/2017 |
| WO | 2017075059 | 5/2017 |
| WO | 2017075472 | 5/2017 |
| WO | WO-2017075059 A1 | 5/2017 |
| WO | 2017120262 A1 | 7/2017 |
| WO | 2017137904 | 8/2017 |
| WO | 2017155833 | 9/2017 |
| WO | 2017180734 | 10/2017 |
| WO | 2017192881 | 11/2017 |
| WO | WO-2017189618 A1 | 11/2017 |
| WO | 2018039080 | 3/2018 |
| WO | 2018063919 | 4/2018 |
| WO | 2018067377 | 4/2018 |
| WO | WO-2018067377 A1 | 4/2018 |
| WO | 2018098089 | 5/2018 |
| WO | WO-2018098089 A1 | 5/2018 |
| WO | 2018102103 | 6/2018 |
| WO | 2018200740 | 11/2018 |
| WO | WO-2018200702 A1 | 11/2018 |
| WO | WO-2018200740 A2 | 11/2018 |
| WO | WO-2018200752 A1 | 11/2018 |
| WO | 2019040809 | 2/2019 |
| WO | WO-2019157602 A1 | 8/2019 |
| WO | 2019178282 | 9/2019 |
| WO | 2019203931 | 10/2019 |
| WO | WO-2019203931 A1 | 10/2019 |
| WO | WO-2019204205 A1 | 10/2019 |
| WO | 2019213441 | 11/2019 |
| WO | WO-2019213441 A1 | 11/2019 |
| WO | WO-2020172187 A1 | 8/2020 |
| WO | WO-2020185941 A1 | 9/2020 |
| WO | 2020243690 A1 | 12/2020 |
| WO | WO-2021211798 A1 | 10/2021 |

(56) References Cited

OTHER PUBLICATIONS

"Remote Radio Head for CPRI and 4G, 5G & LTE Networks," CableFree by Wireless Excellence Limited, 2020, 8 pp., <<https://www.cablefree.net/wirelesstechnology/4glte/remote-radio-head/>> Accessed May 19, 2021.
"SageGlass UnpluggedTM—wireless dynamic glass", 2014, 2 pages.
"SPN1 Sunshine Pyranometer," Product Overview, Specification, Accessories and Product Resources, Delta-T Devices, May 5, 2016, 9 pp. <<https://www.delta-t.co.uk/product/spn1/>> (downloaded Apr. 28, 2020).
[http://atmospheres.gsfc.nasa.gov/climate/index.php?section=134]. Density DPU Technical Specifications v1.0, Density, 2018, downloaded from <www.density.io>.
Dols, W. Stuart, et al., A tool to model the fate and transport of indoor microbiological aerosols (FaTIMA), NIST Technical Note 2095, National Institute of Standards and Technology, US Department of Commerce, Jun. 2020, 32 pp. <<https://doi.org/10.6028/NIST.TN.2095>>.
EP Extended Search Report dated Dec. 17, 2019 in EP Application No. 19202054.3.
European Extended Search Report dated Nov. 11, 2020 in EP Application No. 18791268.8.
European Extended Search Report dated Nov. 12, 2020 in EP Application No. 18791669.7.
Hard Anodize of Aluminum, https://www.titaniumfinishing.com.
International Preliminary Report on Patentability dated Dec. 22, 2020 in PCT/US2019/038429.
International Preliminary Report on Patentability dated Nov. 7, 2019 in PCT Application No. PCT/US2018/029476.
International Search Report and Written Opinion (ISA/EP) dated Sep. 30, 2020 in PCT Application No. PCT/US2020/035485.
International Search Report and Written Opinion dated Sep. 16, 2019 in PCT/US2019/038429.
Joseph, J., "Xiaomi shows off near perfect Under Screen Camera Technology," Gizchina.com, Aug. 28, 2020, 7 pp., <<https://www.gizmochina.com/2020/08/28/xiaomi-perfected-third-gen-under-screen-camera-technology-prototype/>>, retrieved Apr. 21, 2021.
Kipp & Zonen, "Solar Radiation" (undated) [http://www.kippzonen.com/Knowledge-Center/Theoretical-info/Solar-Radiation].
LG and Assa Abloy to Develop Transparent OLED Automatic Door | LG Newsroom, www.Lgnewsroom.com/2020/12/lg-and-assa-abloy-to-develop-transparent-oled-automatic-door/ Dec. 9, 2020.
LG Developing Sliding Doors Made of Transparent OLED Displays, The Verge https://www.theverge.com/2020/12/7/22158335/lg-assa-abloy-automatic-sliding-doors-transparent-oled-displays.
National Aeronautics & Space Administration, "Cloud Remote Sensing and Modeling," (undated) [http://atmospheres.gsfc.nasa.gov/climate/index.php?section=134].
Nituff®, Aluminum Surface Engineering (Brita Finish Ltd), 2017.
PCT Application No. PCT/US2020/053641 filed Sep. 30, 2020.
PCT Application No. PCT/US2021/012313 filed Jan. 6, 2021.
PCT Application No. PCT/US2021/015378 filed Jan. 28, 2021.
PCT Application No. PCT/US2021/017946 filed Feb. 12, 2021.
PCT Application No. PCT/US2021/023433 filed Mar. 22, 2021.
PCT Application No. PCT/US2021/023433 filed Mar. 23, 2021.
PCT International Search Report and Written Opinion (ISA:KIPO) dated Aug. 13, 2018 for PCT Application No. PCT/US2018/029476.
Rajiv, "How does Cloud Radio Access Network (C-RAN) works," RF Page, Apr. 16, 2018, 5 pp. <<https://www.rfpage.com/how-cloud-radio-access-network-works/>> Accessed May 19, 2021.
Science News, "New technique could help spot snooping drones", Jan. 23, 2018, 2 pages [https://www.sciencenews.org/article/new-technique-could-help-spot-snooping-drones] retrieved Jan. 24, 2018.
The Mirror Gym/Lululemon, https://shop.lululemon.com/story/mirror-home-gym.
US Final Office Action dated Jan. 1, 2021 in U.S. Appl. No. 16/550,052.
US Final Office Action dated Mar. 17, 2017 in U.S. Appl. No. 14/887,178.
US Final Office Action dated Sep. 19, 2016 in U.S. Appl. No. 14/887,178.
US Notice of Allowance dated Mar. 9, 2018 in U.S. Appl. No. 14/887,178.
US Notice of Allowance dated May 14, 2015 in U.S. Appl. No. 13/479,137.
US Office Action dated Jan. 19, 2021 in U.S. Appl. No. 16/608,159.
US Office Action dated Jul. 3, 2014 in U.S. Appl. 13/479,137.
US Office Action dated Mar. 25, 2016 in U.S. Appl. No. 14/887,178.
US Office Action dated Sep. 18, 2020 in U.S. Appl. No. 16/550,052.
US Preliminary Amendment dated Apr. 6, 2020 in U.S. Appl. No. 16/550,052.
US Preliminary Amendment dated Mar. 31, 2020 in U.S. Appl. No. 16/608,157.
U.S. Appl. No. 16/338,403, filed Mar. 29, 2019 Shrivastava et al.
U.S. Appl. No. 16/550,052, filed Aug. 23, 2019 Brown et al.
U.S. Appl. No. 16/555,377, filed Aug. 29, 2019 Shrivastava et al.
U.S. Appl. No. 16/608,159, filed Oct. 24, 2019 Trikha et al.
U.S. Appl. No. 16/655,032, filed Oct. 16, 2019 Shrivastava et al.
U.S. Appl. No. 16/664,089, filed Oct. 25, 2019 Patterson et al.
U.S. Appl. No. 62/958,653, filed Jan. 8, 2020 Gopinathanasari et al.
U.S. Appl. No. 62/993,617, filed Mar. 23, 2020 Gupta et al.
U.S. Appl. No. 63/020,819, filed May 6, 2020 Gupta et al.
U.S. Appl. No. 63/029,301, filed May 22, 2020 Gupta et al.
U.S. Appl. No. 63/033,474, filed Jun. 2, 2020 Gupta et al.
U.S. Appl. No. 63/034,792, filed Jun. 4, 2020 Gupta et al.
U.S. Appl. No. 63/041,002, filed Jun. 18, 2020 Gupta et al.
U.S. Appl. No. 63/057,120, filed Jul. 27, 2020 Gupta et al.
U.S. Appl. No. 63/069,358, filed Aug. 24, 2020 Gupta et al.
U.S. Appl. No. 63/078,805, filed Sep. 15, 2020 Gupta et al.
U.S. Appl. No. 63/079,851, filed Sep. 17, 2020 Gupta et al.
U.S. Appl. No. 63/085,254, filed Sep. 30, 2020 Young et al.
U.S. Appl. No. 63/106,058, filed Oct. 27, 2020 Rasmus-Vorrath et al.
U.S. Appl. No. 63/115,842, filed Nov. 19, 2020 Martinson et al.
U.S. Appl. No. 63/115,886, filed Nov. 19, 2020 Gupta et al.
U.S. Appl. No. 63/124,673, filed Dec. 11, 2020 Tai et al.
U.S. Appl. No. 63/133,725, filed Jan. 4, 2021 Gopinathanasari et al.
U.S. Appl. No. 63/135,021, filed Jan. 8, 2021 Martinson et al.
U.S. Appl. No. 63/146,365, filed Feb. 5, 2021 Brown et al.
U.S. Appl. No. 63/154,352, filed Feb. 26, 2021 Martinson et al.
U.S. Appl. No. 63/159,814, filed Mar. 11, 2021 Gupta et al.
U.S. Appl. No. 63/163,305, filed Mar. 19, 2021 Trikha et al.
U.S. Appl. No. 63/170,245, filed Apr. 2, 2021 Martinson et al.
U.S. Appl. No. 63/171,871, filed Apr. 7, 2021 Gomez-Martinez et al.
U.S. Appl. No. 63/173,759, filed Apr. 12, 2021 Rasmus-Vorrath et al.
U.S. Appl. No. 63/181,648, filed Apr. 29, 2021 Makker et al.
U.S. Appl. No. 63/187,632, filed May 12, 2021 Hur et al.
"Sage Product Highlights" screenshot, accessed Aug. 28, 2015, 1 page.
"SageGlass Mobile App" screenshot, accessed Aug. 28, 2015, 1 page.
"SageGlass Unplugged" screenshot, accessed Aug. 28, 2015, 1 page.
"SageGlass Unplugged™—wireless dynamic glass", 2014, 2 pages.
Alguindigue. I., et al., "Monitoring and Diagnosis of Rolling Element Bearings Using Artificial Neural Networks," IEEE Transactions on Industrial Electronics, 1993, vol. 40 (2), pp. 209-217.
APC by Schneider Electric, Smart-UPS 120V Product Brochure, 2013, 8 pp.
AU Office Action dated Jan. 11, 2022, in Application No. AU2021201145.
AU Office action dated Sep. 30, 2022, in AU Application No. AU2021215134.
AU Office action dated Apr. 4, 2022, in AU Application No. AU2020226999.
AU Office action dated Oct. 12, 2022, in AU Application No. AU2020226999.
AU Office action dated Oct. 22, 2021, in AU Application No. AU2020226999.
Australian Examination Report dated Dec. 24, 2019 in AU Application No. 2015227056.

(56) References Cited

OTHER PUBLICATIONS

Australian Examination Report dated Mar. 2, 2020 in AU Application No. 2015353569.
Australian Office Action dated Aug. 10, 2020 in AU Application No. 2015360714.
Australian Office Action dated Aug. 9, 2021 in AU Application No. 2015360714.
Australian Office Action dated Dec. 4, 2020 in AU Application No. 2015360714.
Australian Office Action dated Jun. 4, 2021 in AU Application No. 2015360714.
Bucci, G., et al., "Digital Measurement Station for Power Quality Analysis in Distributed Environments," IEEE Transactions on Instrumentation and Measurement, 2003, vol. 52(1), pp. 75-84.
Byun, J. et al., "Development of a Self-adapting Intelligent System for Building Energy Saving and Context-aware Smart Services", IEEE Transactions on Consumer Electronics, Feb. 2011, vol. 57, No. 1, pp. 90-98.
CA Office Action dated Dec. 13, 2021, in Application No. CA2970300.
CA Office Action dated Dec. 23, 2021, in Application No. CA2941526.
CA Office Action dated Feb. 22, 2023, in Application No. CA2970300.
CA Office Action dated Sep. 13, 2022, in Application No. CA2970300.
Cecilio, J., et al., "A configurable middleware for processing heterogenous industrial intelligent sensors," IEEE 16th International Conference on Intelligent Engineering Systems (INES), Jun. 15, 2012, pp. 145-149.
Chen, H. et al. "The Design and Implementation of a Smart Building Control System", 2009 IEEE International Conference on e-Business Engineering, pp. 255-262.
CN Office Action dated Aug. 1, 2022, in Application No. CN201880037591.6 With English translation.
CN Office action dated Aug. 22, 2022 in Application No. CN202011547257.0 With English translation.
CN Office Action dated Dec. 29, 2021, in application No. 202010466929.9 with English translation.
CN Notice of Allowance with Supplemental Search Report (w/translation) dated Mar. 1, 2021 in CN Application No. 201580040461.4.
CN Office Action dated May 17, 2022, in Application No. CN201780069604.3 With English Translation.
CN Office Action dated Nov. 1, 2022, in Application No. CN201880037591.6 with English translation.
CN Office Action dated Apr. 18, 2022, in Application No. CN202011547257.0 with English translation.
CN Office Action dated Aug. 16, 2019 in CN Application No. 201580015979.2.
CN Office Action dated Aug. 19, 2022, in Application No. CN202080022001.X with English translation.
CN Office Action dated Aug. 28, 2018 in CN Application No. 201580070776.3.
CN Office Action dated Aug. 31, 2022 in Application No. CN201780069604.3 with English translation.
CN Office Action dated Dec. 1, 2021, in application No. CN201780069604.3 with English translation.
CN Office Action dated Feb. 2, 2019 in CN Application No. 201580015979.2.
CN Office Action dated Feb. 3, 2020 in CN Application No. 201580072749.X.
CN Office Action dated Jan. 10, 2023, in Application No. CN202080022001.X with English translation.
CN Office Action dated Jan. 12, 2023 in CN Application No. CN202011547257 with English translation.
CN Office Action dated Jan. 15, 2020 in CN Application No. 201580015979.2.
CN Office Action dated Jun. 29, 2021 in CN Application No. 202010466929.9.
CN Office Action dated Jun. 3, 2020 in CN Application No. 201580015979.2.
CN Office Action dated Jun. 3, 2021 in CN Application No. 201580072749.X.
CN Office Action dated Mar. 19, 2019 in CN Application No. 201580070776.3.
CN Office Action dated Mar. 2, 2022, in Application No. CN201880037591.6 with English translation.
CN Office Action dated Mar. 8, 2021 in CN Application No. 201580072749.X.
CN Office Action dated Mar. 9, 2020 in CN Application No. 201580040461.4.
CN Office Action dated May 20, 2022, in Application No. CN202010466929.9 with English translation.
CN Office Action dated Nov. 12, 2021, in Application No. CN20158072749 with English translation.
CN Office Action dated Oct. 21, 2020 in CN Application No. 201580040461.4.
CN Office Action dated Oct. 9, 2019 in CN Application No. 201580070776.3.
CN Office Action dated Sep. 28, 2022 in Application No. CN202010466929.9 with English translation.
CN Office Action dated Sep. 30, 2020 in CN Application No. 201580072749.X.
Duchon, Claude E. et al., "Estimating Cloud Type from Pyranometer Observations," Journal of Applied Meteorology, vol. 38, Jan. 1999, pp. 132-141.
EP Office Action dated Jul. 13, 2022 in Application No. EP20170858928.
EP Office Action dated Sep. 12, 2022 in Application No. EP20180791117.7.
EP Examination Report dated Mar. 4, 2019 in EP Application No. 15814233.1.
EP Extended European search report dated Jan. 3, 2023 in Application No. EP22198532.8.
EP Extended European Search Report mailed on Sep. 14, 2021, in the application EP21182449.7.
EP Extended Search Report dated Dec. 17, 2019 in EP Application No. 19202054.
EP Extended Search Report dated Feb. 15, 2018 in EP Application No. 15814233.1.
EP Extended Search Report dated Jun. 19, 2017 in EP Application No. 15758538.1.
EP Extended Search Report dated Jun. 5, 2018 in EP Application No. 15868003.3.
EP Extended Search Report dated Nov. 11, 2020 in EP Application No. 18791117.7.
EP Extended Search Report dated Nov. 28, 2019 in EP Application No. 19188907.0.
EP Extended Search Report dated Nov. 8, 2018 in EP Application No. 15863112.7.
EP Extended Search Report dated Oct. 1, 2020 in EP Application No. 17858928.9.
EP Office Action dated Jan. 17, 2022, in Application No. 17858928.9.
EP Office Action dated Jun. 30, 2022 in Application No. EP20190727174.
EP Office Action dated Aug. 21, 2018 in EP Application No. 15758538.1.
EP office action dated Aug. 25, 2021, in EP Application No. EP19202054.3.
EP Office Action dated Feb. 15, 2022, in Application No. EP19188907.0.
EP Office Action dated Jan. 29, 2021 in EP Application No. 15868003.3.
EP Office Action dated May 14, 2020 in EP Application No. 15868003.3.
EP Office Action dated Nov. 19, 2020 in EP Application No. 15758538.1.
EP Search Report dated Dec. 10, 2021, in Application No. EP19787808.5.
European Office Action dated Feb. 25, 2021 in EP Application No. 15863112.7.
Hadziosmanovic, D., et al., "Through the Eye of the Plc: Semantic Security Monitoring for Industrial Processes," Proceedings of the 30th Annual Computer Security Applications Conference, 2014, pp. 126-135.

(56) References Cited

OTHER PUBLICATIONS

Hameed, Z. et al., "Condition Monitoring and Fault Detection of Wind Turbines and Related Algorithms: a Review.", Renewable and Sustainable energy reviews, 2009, vol. 13, pp. 1-39.
IN Office Action dated Aug. 5, 2022 In Application No. IN201937050525.
IN Office Action dated Jan. 13, 2022, in Application No. 201937044701.
IN Office Action dated Aug. 2, 2021 in IN Application No. 201637028587.
IN Office Action dated Nov. 24, 2020 in IN Application No. 201737020192.
Indian Office Action dated Feb. 24, 2021 in IN Application No. 201737021981.
International Preliminary Report on Patentability dated Mar. 3, 2022, in Application No. PCT/US2020/070427.
International Preliminary Report on Patentability dated Oct. 6, 2022 in PCT Application PCT/US2021/023834.
International Search Report and Written Opinion dated Sep. 1, 2022 in Application No. PCT/US2022/028850.
International Preliminary Report on Patentability dated Apr. 18, 2019 in PCT Application No. PCT/US17/54120.
International Preliminary Report on Patentability dated Jan. 12, 2017 in PCT Application No. PCT/US15/38667.
International Preliminary Report on Patentability dated Jun. 22, 2017 in PCT Application No. PCT/US15/64555.
International Preliminary Report on Patentability dated Jun. 8, 2017 in PCT/US2015/062480.
International Preliminary Report on Patentability dated Nov. 12, 2020 in PCT Application No. PCT/US2019/030467.
International Preliminary Report on Patentability dated Nov. 7, 2019 in PCT Application No. PCT/US2018/029406.
International Preliminary Report on Patentability dated Nov. 7, 2019 in PCT Application No. PCT/US2018/029460.
International Preliminary Report on Patentability dated Oct. 29, 2020 in PCT/US2019/019455.
International Preliminary Report on Patentability dated Sep. 15, 2016 in Application No. PCT/US2015/019031.
International Search Report and Written Opinion dated Apr. 28, 2020 in PCT Application No. PCT/US2020/018677.
International Search Report and Written Opinion dated Feb. 15, 2016 in PCT/US2015/062480.
International Search Report and Written Opinion dated Jul. 6, 2022, in PCT Application No. PCT/US2022/020730.
International Search Report and Written Opinion dated Jul. 11, 2019 in PCT Application No. PCT/US2019/030467.
International Search Report and Written Opinion dated Mar. 29, 2016 in PCT Application No. PCT/US15/64555.
International Search Report and Written Opinion dated May 29, 2015 in Application No. PCT/US2015/019031.
International Search Report and Written Opinion dated Nov. 16, 2018 in PCT Application No. PCT/US2018/029460.
International Search Report and Written Opinion dated Oct. 15, 2018 in PCT Application No. PCT/US2018/029406.
International Search Report and Written Opinion dated Oct. 16, 2015 in PCT Application No. PCT/US15/38667.
International Search Report and Written Opinion dated Sep. 1, 2022, in Application No. PCT/US2022/024812.
International Search Report and Written Opinion (ISA/KR) dated Jan. 9, 2018 in PCT Application No. PCT/US17/54120.
International Search Report and Written Opinion (ISA/KR) dated Jun. 14, 2019 in PCT/US2019/019455.
JP Examination Report dated Nov. 26, 2020 in JP Application No. 2017-549175.
JP Office Action dated Dec. 7, 2021, in Application No. JP20170549175 with English translation.
JP Office Action dated Jul. 20, 2021 in JP Application No. 2017-549175.
JP Office Action dated Jun. 16, 2020 in JP Application No. 2017-549175.
JP Office Action dated Mar. 1, 2022, in Application No. JP2020-175033 with translation.
JP Office Action dated Nov. 19, 2019 in JP Application No. 2017-549175.
JP office action dated Sep. 7, 2021, in JP Application No. 2020-175033.
Kipp & Zonen, "Solar Radiation" (known as of Sep. 3, 2014) [http://www.kippzonen.com/Knowledge-Center/Theoretical-info/Solar-Radiation].
KR Office Action dated Nov. 3, 2022, in Application No. KR10-2022-7027386 with English Translation.
KR Office Action dated Apr. 13, 2022, in KR Application No. KR1020217028044 with English translation.
KR Office Action dated Dec. 7, 2022 in Application No. KR10-2022-7036992 with English translation.
KR Office Action dated Dec. 22, 2021, in Application No. KR1020177018491 with English translation.
KR Office Action dated Jan. 22, 2021 in KR Application No. 10-2016-7025862.
KR Office Action dated Jul. 31, 2021 in KR Application No. 10-2016-7025862.
KR Office Action dated Oct. 26, 2021, in KR Application No. KR1020217028044 with English translation.
Mumaw, R.J et al., "There is More to Monitoring a Nuclear Power Plant Than Meets the Eye", Human factors, 2000, vol. 42, No. 1, pp. 36-55.
National Aeronautics & Space Administration, "Cloud Remote Sensing and Modeling," (known as of Sep. 3, 2014), published date of Sep. 15, 2014, [ http://atmospheres.gsfc.nasa.gov/climate/index.php?section=134 ].
"Ossia Wireless Charging", screenshot and picture of Cota device, accessed Apr. 20, 2015, 1 page.
Preliminary Amendment dated Jan. 18, 2017 in U.S. Appl. No. 15/123,069.
RU Office Action dated Sep. 24, 2018 in RU Application No. 2016139012.
Russian Office Action dated Jul. 10, 2019 in RU Application No. 2017123902.
Sim, S., "Next generation data interchange: tool-to-tool application programming interfaces," IEEE Working Conference on Reverse Engineering, Nov. 25, 2000, pp. 278-280.
Taiwanese Office Action dated Dec. 12, 2018 in TW Application No. 107129150.
Taiwanese Office Action dated Feb. 27, 2020 in TW Application No. 108126548.
Taiwanese Office Action dated May 13, 2019 in TW Application No. 104139217.
TW Notice of Allowance & Search Report (translated) dated Jul. 30, 2021 in TW Application No. 106133985.
TW Office Action dated Jun. 6, 2022 in Application No. TW108115291 With English Translation.
TW Office Action dated Apr. 29, 2022, in Application No. TW110140314 with English translation.
TW Office Action dated Jan. 12, 2023 in Application No. TW108115291 with English translation.
TW Office Action dated Jan. 28, 2022, in Application No. TW110109128 with English translation.
TW Office Action dated Mar. 15, 2022, in Application No. TW109112242 with English translation.
TW Office Action dated Nov. 23, 2022, in Application No. TW107114217 with English translation.
U.S. Non-Final office Action dated Sep. 21, 2022 in U.S. Appl. No. 17/301,026.
U.S. Notice of Allowance dated May 12, 2022, in U.S. Appl. No. 17/171,667.
U.S. Corrected Notice of Allowance dated Jan. 6, 2023 in U.S. Appl. No. 16/655,032.
U.S. Corrected Notice of Allowance dated Jun. 27, 2022 in U.S. Appl. No. 16/527,554.
US Corrected Notice of Allowability dated Jun. 4, 2020 in U.S. Appl. No. 16/298,776.
US Corrected Notice of Allowability dated May 3, 2021 in U.S. Appl. No. 16/253,971.

(56) References Cited

OTHER PUBLICATIONS

US Corrected Notice of Allowability dated Sep. 23, 2021, in U.S. Appl. No. 16/338,403.
U.S. Corrected Notice of Allowance dated Apr. 28, 2022, in U.S. Appl. No. 15/733,765.
US Final Office Action dated Dec. 23, 2020 in U.S. Appl. No. 16/338,403.
US Final Office Action dated Feb. 26, 2015 in U.S. Appl. No. 13/479,137.
US Final Office Action dated Jan. 27, 2014 in U.S. Appl. No. 13/479,137.
US Final Office Action dated Jan. 31, 2019 in U.S. Appl. No. 15/534,175.
US Final Office Action dated Jul. 2, 2019 in U.S. Appl. No. 15/691,468.
US Final Office Action dated Jul. 3, 2019 in U.S. Appl. No. 15/623,237.
US Final Office Action dated Mar. 15, 2018 in U.S. Appl. No. 14/951,410.
US Final Office Action dated Mar. 17, 2017 in U.S. Appl. 14/887,178.
US Final Office Action dated Mar. 18, 2020 in U.S. Appl. No. 16/253,971.
US Final Office Action dated Mar. 3, 2020 in U.S. Appl. No. 16/508,099.
US Final Office Action dated Sep. 19, 2016 in U.S. Appl. 14/887,178.
U.S. Non-Final office Action dated Jan. 23, 2023 in U.S. Appl. No. 17/869,725.
U.S. Non-Final office Action dated Nov. 14, 2022 in U.S. Appl. No. 17/804,802.
U.S. Non-Final office Action dated Nov. 15, 2022 in U.S. Appl. No. 17/355,086.
U.S. Non-Final office Action dated Sep. 9, 2022 in U.S. Appl. No. 17/249,442.
U.S. Non-Final Office Action dated Aug. 12, 2022, in U.S. Appl. No. 16/655,032.
U.S. Non-Final Office Action dated Dec. 6, 2022 in U.S. Appl. No. 17/453,469.
U.S. Non-final Office Action dated Jul. 28, 2022 in U.S. Appl. No. 16/655,032.
U.S. Non-Final office Action dated Mar. 9, 2023 in U.S. Appl. No. 17/909,925.
U.S. Non-Final Office Action dated Oct. 24, 2022, in U.S. Appl. No. 17/486,716.
U.S. Non-Final Office Action dated Oct. 28, 2021 in U.S. Appl. No. 15/733,765.
U.S. Non-Final Office Action dated Oct. 29, 2021 in U.S. Appl. No. 16/527,554.
US Notice of Allowability (supplemental) dated Sep. 30, 2020 in U.S. Appl. No. 15/123,069.
US Notice of Allowance (corrected) dated Apr. 18, 2019 in U.S. Appl. No. 15/320,725.
US Notice of Allowance dated Apr. 17, 2019 in U.S. Appl. No. 15/534,175.
US Notice of Allowance dated Apr. 17, 2019 in U.S. Appl. No. 15/910,936.
US Notice of Allowance dated Apr. 6, 2020 in U.S. Appl. No. 16/298,776.
U.S. Notice of Allowance dated Apr. 6, 2022, in U.S. Appl. No. 15/733,765.
US Notice of Allowance dated Apr. 9, 2020 in U.S. Appl. No. 15/123,069.
US Notice of Allowance dated Dec. 13, 2018 in U.S. Appl. No. 15/978,029.
US Notice of Allowance dated Dec. 14, 2018 in U.S. Appl. No. 15/910,936.
U.S. Notice of Allowance dated Dec. 29, 2022 in U.S. Appl. No. 16/655,032.
US Notice of Allowance dated Dec. 31, 2020 in U.S. Appl. No. 16/523,624.
US Notice of Allowance dated Dec. 31, 2020 in U.S. Appl. No. 16/555,377.
US Notice of Allowance dated Dec. 7, 2020 in U.S. Appl. No. 16/508,099.
U.S. Notice of Allowance dated Feb. 7, 2023 in U.S. Appl. No. 17/249,442.
U.S. Notice of Allowance dated Feb. 14, 2023 in U.S. Appl. No. 17/355,086.
U.S. Notice of Allowance dated Feb. 16, 2022 in U.S. Appl. No. 16/664,089.
US Notice of Allowance dated Feb. 4, 2021 in U.S. Appl. No. 16/253,971.
US Notice of Allowance dated Jul. 1, 2020 in U.S. Appl. No. 15/623,237.
US Notice of Allowance dated Jul. 17, 2019 in U.S. Appl. No. 15/123,069.
US Notice of Allowance dated Jul. 17, 2019 in U.S. Appl. No. 15/320,725.
US Notice of Allowance dated Jul. 25, 2019 in U.S. Appl. No. 15/534,175.
U.S Notice of Allowance dated Jun. 8, 2022 in U.S. Appl. No. 15/733,765.
US Notice of Allowance dated Jun. 14, 2021 in U.S. Appl. No. 16/338,403.
U.S. Notice of Allowance dated Jun. 20, 2022 in U.S. Appl. No. 16/527,554.
US Notice of Allowance dated Mar. 10, 2021 in U.S. Appl. No. 15/691,468.
US Notice of Allowance dated Mar. 20, 2019 in U.S. Appl. No. 15/320,725.
US Notice of Allowance dated Mar. 26, 2021 in U.S. Appl. No. 16/254,434.
US Notice of Allowance dated Mar. 9, 2018 in U.S. Appl. 14/887,178.
US Notice of Allowance dated May 14, 2015 in U.S. Appl. 13/479,137.
US Notice of Allowance dated May 14, 2019 in U.S. Appl. No. 15/623,235.
US Notice of Allowance dated May 6, 2020 in U.S. Appl. No. 15/623,237.
US Notice of Allowance dated Nov. 28, 2018 in U.S. Appl. No. 15/123,069.
US Notice of Allowance dated Nov. 3, 2020 in U.S. Appl. No. 15/691,468.
US Notice of Allowance dated Oct. 7, 2021 in U.S. Appl. No. 16/664,089.
US Notice of Allowance dated Oct. 14, 2021 in U.S. Appl. No. 16/664,089.
US Notice of Allowance dated Oct. 22, 2018 in U.S. Appl. No. 14/951,410.
US Notice of Allowance (supplemental) dated Jun. 12, 2015 in U.S. Appl. No. 13/479,137.
US Office Action dated Apr. 27, 2018 in U.S. Appl. No. 15/123,069.
US Office Action dated Aug. 21, 2019 in U.S. Appl. No. 16/508,099.
US Office Action dated Aug. 22, 2019 in U.S. Appl. No. 16/298,776.
US Office Action dated Aug. 7, 2018 in U.S. Appl. No. 15/910,936.
US Office Action dated Aug. 7, 2020 in U.S. Appl. No. 16/338,403.
US Office Action dated Feb. 4, 2019 in U.S. Appl. No. 15/623,235.
US Office Action dated Feb. 7, 2019 in U.S. Appl. No. 15/623,237.
US Office Action dated Feb. 7, 2019 in U.S. Appl. No. 15/691,468.
US Office Action dated Jul. 21, 2020 in U.S. Appl. No. 16/523,624.
US Office Action dated Jul. 21, 2020 in U.S. Appl. No. 16/555,377.
US Office Action dated Jul. 23, 2020 in U.S. Appl. No. 16/508,099.
US Office Action dated Jul. 24, 2018 in U.S. Appl. No. 15/978,029.
US Office Action dated Jul. 25, 2019 in U.S. Appl. No. 16/253,971.
US Office Action dated Jul. 29, 2020 in U.S. Appl. No. 16/253,971.
US Office Action dated Jul. 3, 2014 in U.S. Appl. No. 13/479,137.
US Office Action dated Jul. 6, 2018 in U.S. Appl. No. 15/534,175.
US Office Action dated Mar. 25, 2016 in U.S. Appl. 14/887,178.
US Office Action dated May 6, 2020 in U.S. Appl. No. 15/691,468.
US Office Action dated Oct. 23, 2017 in U.S. Appl. No. 14/887,178.
US Office Action dated Sep. 11, 2017 in U.S. Appl. No. 14/951,410.
US Office Action dated Sep. 23, 2013 in U.S. Appl. No. 13/479,137.
US Office Action dated Sep. 30, 2020 in U.S. Appl. No. 16/254,434.

(56) References Cited

OTHER PUBLICATIONS

US Office Action dated Sep. 4, 2018 in U.S. Appl. No. 15/320,725.
U.S. Appl. No. 16/338,403, inventors Shrivastava et al., filed Mar. 29, 2019.
U.S. Appl. No. 63/124,673, inventors Tai et al., filed Dec. 11, 2020.
U.S. Appl. No. 63/146,365, inventors Brown et al., filed Feb. 5, 2021.
U.S. Appl. No. 63/163,305, inventors Trikha et al., filed Mar. 19, 2021.
U.S. Appl. No. 63/181,648, inventors Makker et al., filed Apr. 29, 2021.
U.S. Appl. No. 63/187,632, inventors Hur et al., filed May 12, 2021.
U.S. Appl. No. 63/226,127, inventors Lee et al., filed Jul. 21, 2021.
U.S. Appl. No. 17/989,603, Inventors Shrivastava et al., filed Nov. 17, 2022.
US Preliminary Amendment dated Dec. 31, 2019 in U.S. Appl. No. 16/608,159.
U.S. Supplemental Notice of Allowance dated Aug. 1, 2022 in U.S. Appl. No. 17/171,667.
Woods, D., "The Alarm Problem and Directed Attention in Dynamic Fault Management.", Ergonomics, 1995, vol. 38, No. 11, pp. 2371-2393.
AU Office action dated Mar. 20, 2023, in AU Application No. AU20210215134.
Bannat, A., et al., "Artificial Cognition in Production Systems", IEEE Transactions on Automation Science and Engineering, 2011, vol. 8, No. 1, pp. 148-174.
CN Office Action dated Jul. 28, 2023, in Application No. CN201980031543.
CN Office Action dated Mar. 16, 2023, in Application No. CN202080022001.X with English translation.
CN Office Action dated Mar. 30, 2023 in Application No. CN201980031543 with English translation.
CN Office Action dated May 24, 2023, in Application No. CN202080022001.X with English translation.
EP office action dated Apr. 24, 2023, in application No. EP21182448.7.
EP office action dated Jul. 3, 2023, in application No. EP17858928.9.
EP Office Action dated Jun. 19, 2023 in Application No. EP20190727174.5.
EP office action dated Jun. 29, 2023, in application No. EP19787808.5.
EP office action dated Mar. 10, 2023, in application No. EP20712740.8.
European Office Action dated Apr. 25, 2023 in Application No. EP19188907.
JP Office Action dated Jun. 6, 2023, in application No. JP2022-149815 with English translation.
JP Office Action dated Jun. 6, 2023, in Application No. JP2020-560912 with English translation.
JP office action dated Sep. 7, 2021, in JP Application No. 2020-175033 with English translation.
KR Office Action dated Apr. 25, 2023, in Application No. KR10-2017-7017128 with English translation.
KR Office Action dated Jul. 10, 2023, in application No. KR 10-2023-7021596 with English Translation.
KR Office Action dated May 12, 2023, in Application No. KR10-2022-7027386 with English translation.
Laskar, S.H., et al., "Power Quality Monitoring by Virtual Instrumentation using LabVIEW", 2011 46th International Universities' Power Engineering Conference (UPEC), 2011, pp. 1-6.
Tuokko, R., et al., "Micro and Desktop Factory Road Map", Tampere University of Technology, 2012, pp. 1-114.
TW Office Action dated Apr. 27, 2023, in application No. TW20220142122 with English translation.
TW Office Action dated Jun. 17, 2023, in application No. TW107114217 with English translation.
U.S. Corrected Notice of Allowance dated Jul. 17, 2023, in U.S. Appl. No. 17/301,026.
U.S. Corrected Notice of Allowance dated Jun. 12, 2023, in U.S. Appl. No. 17/453,469.
U.S. Corrected Notice of Allowance dated May 26, 2023 in U.S. Appl. No. 17/355,086.
U.S. Non-Final Office Action dated Apr. 18, 2023 in U.S. Appl. No. 17/609,671.
U.S. Non-Final Office Action dated Jul. 20, 2023, in U.S. Appl. No. 17/804,802.
U.S. Notice of Allowance dated Aug. 3, 2023, in U.S. Appl. No. 17/869,725.
U.S. Notice of Allowance dated Aug. 10, 2023 in U.S. Appl. No. 17/301,026.
U.S. Notice of Allowance dated Jul. 6, 2023 in U.S. Appl. No. 17/870,480.
U.S. Notice of Allowance dated Jul. 13, 2023 in U.S. Appl. No. 17/940,951.
U.S. Notice of Allowance dated Jun. 7, 2023 in U.S. Appl. No. 17/453,469.
U.S. Notice of Allowance dated Jun. 7, 2023 in U.S. Appl. No. 17/870,480.
U.S. Notice of Allowance dated Jun. 12, 2023, in U.S. Appl. No. 17/940,951.
U.S. Notice of Allowance dated Jun. 16, 2023, in U.S. Appl. No. 17/301,026.
U.S. Notice of Allowance dated Mar. 31, 2023 in U.S. Appl. No. 17/249,442.
U.S. Notice of Allowance dated May 19, 2023 in U.S. Appl. No. 17/249,442.
U.S. Notice of Allowance dated May 22, 2023 in U.S. Appl. No. 17/486,716.
U.S. Notice of Allowance dated May 23, 2023 in U.S. Appl. No. 17/869,725.
U.S. Notice of Allowance dated May 26, 2023, in U.S. Appl. No. 17/453,469.
U.S. Appl. No. 18/213,843, inventors Shrivastava D, et al., filed Jun. 25, 2023.
U.S. Appl. No. 18/310,443, inventors Shrivastava et al., filed May 1, 2023.
CA Office Action dated Dec. 5, 2023 in Application No. 2970300.
CA Office Action dated Dec. 27, 2023 in CA Application No. 3172227.
CA Office Action dated Jul. 31, 2023, in Application No. CA3156883.
CA Office Action dated Nov. 9, 2023, in CA Application No. 3139813.
CA Office Action dated Oct. 26, 2023, in CA Application No. 3039342.
CA Office Action dated Oct. 31, 2023, in Application No. CA3129952.
CA Office Action dated Sep. 28, 2023, in Application No. CA3062817.
CN Office Action dated Dec. 12, 2023 in CN Application No. 201980003232.3.
CN Office Action dated Jul. 28, 2023, in Application No. CN201980031543 with English translation.
EP Extended European Search report dated Oct. 24, 2023, in Application No. EP23161161.7.
International Preliminary Report on Patentability and Written Opinion dated Nov. 23, 2023 in PCT Application No. PCT/US2022/024999.
International Preliminary Report on Patentability and Written Opinion dated Nov. 23, 2023 in PCT Application No. PCT/US2022/028850.
International Preliminary Report on Patentability dated Oct. 26, 2023, in Application No. PCT/US2022/024812.
International Preliminary Reporton Patentability dated Sep. 28, 2023, in PCT Application No. PCT/US2022/020730.
International Search Report and Written Opinion dated Jul. 26, 2022 in Application No. PCT/US2022/024999.
International Search Report and Written Opinion dated Nov. 16, 2022 in PCT Application No. PCT/US2022/074162.
KR Office Action dated Jul. 26, 2023, in Application No. KR10-2022-7037562 with English translation.
KR Office Action dated Sep. 25, 2023, in Application No. KR10-2022-7027386 withEnglish Translation.

(56) References Cited

OTHER PUBLICATIONS

U.S. Corrected Notice of Allowance dated Dec. 4, 2023 in U.S. Appl. No. 17/453,469.
U.S. Corrected Notice of Allowance dated Oct. 31, 2023, in U.S. Appl. No. 17/453,469.
U.S. Final Office Action dated Nov. 15, 2023 in U.S. Appl. No. 17/609,671.
U.S. Non-Final Office Action dated Dec. 28, 2023 in U.S. Appl. No. 18/310,443.
U.S. Non-Final Office Action dated Sep. 29, 2023, in U.S. Appl. No. 17/989,603.
U.S. Notice of Allowance dated Aug. 23, 2023 in U.S. Appl. No. 17/909,925.
U.S. Notice of Allowance dated Aug. 29, 2023 in U.S. Appl. No. 17/486,716.
U.S. Notice of Allowance dated Dec. 12, 2023 in U.S. Appl. No. 17/486,716.
U.S. Notice of Allowance dated Dec. 13, 2023 in U.S. Appl. No. 17/453,469.
U.S. Notice of Allowance dated Dec. 21, 2023 in U.S. Appl. No. 17/909,925.
U.S. Notice of Allowance dated Jan. 8, 2024 in U.S. Appl. No. 17/989,603.
U.S. Notice of Allowance dated Sep. 20, 2023, in U.S. Appl. No. 17/453,469.
U.S. Appl. No. 18/281,913 inventors Trikha N, etaL, filed Sep. 13, 2023.
U.S. Appl. No. 18/513,707, inventors Vangati M R, et al., filed Nov. 20, 2023.
U.S. Appl. No. 18/555,129, inventors MakkerT, et al., filed Oct. 12, 2023.
U.S. Appl. No. 18/555,275, inventors Hur Yerang et al., filed Oct. 13, 2023.
CN Office Action dated Apr. 11, 2024 in CN Application No. 201980003232.3 with English translation.
CN Office Action dated Dec. 12, 2023 in CN Application No. 201980003232.3, withEnglish Translation.
EP Extended European Search report dated Mar. 6, 2024 in EP Application No. 23214710.8.
EP Extended European Search Report dated May 28, 2024 in EP Application No. 21775725.1.
EP Office Action dated Feb. 21, 2024 in EP Application No. 20729442.2.
EP Office Action dated Jul. 2, 2024 in EP Application No. 19188907.0.
EP Partial Supplementary European Search report dated Mar. 6, 2024, in EP Application No. 21775725.1.
International Preliminary Report on Patentability and Written Opinion dated Feb. 8, 2024 in PCT Application No. PCT/US2022/074162.
JP Office Action dated Feb. 13, 2024 in JP Application No. 2020-560912, with English Translation.
JP Office Action dated Jun. 11, 2024 in JP Application No. 2021-564914, with English Translation.
U.S. Corrected Notice of Allowance dated Aug. 5, 2024 in U.S. Appl. No. 18/310,443.
U.S. Non Final Office Action dated Mar. 21, 2024, in U.S. Appl. No. 17/634,150.
U.S. Non-Final Office Action dated Apr. 24, 2024 in U.S. Appl. No. 18/237,146.
U.S. Non-Final Office Action dated Feb. 23, 2024 in U.S. Appl. No. 17/313,760.
U.S. Non-Final Office Action dated Jan. 24, 2024 in U.S. Appl. No. 17/609,671.
U.S. Non-Final Office Action dated Jul. 16, 2024 in U.S. Appl. No. 18/513,707.
U.S. Non-Final Office Action dated Jun. 12, 2024 in U.S. Appl. No. 17/300,303.
U.S. Notice of Allowance dated Feb. 14, 2024 in U.S. Appl. No. 17/989,603.
U.S. Notice of Allowance dated Feb. 28, 2024 in U.S. Appl. No. 17/989,603.
U.S. Notice of Allowance dated May 1, 2024 in U.S. Appl. No. 18/310,443.
U.S. Notice of Allowance dated May 10, 2024 in U.S. Appl. No. 17/609,671.
U.S. Notice of Allowance dated May 23, 2024 in U.S. Appl. No. 17/609,671.
U.S. Appl. No. 18/764,727, inventors Shrivastava D, et al., filed Jul. 5, 2024.
U.S. Appl. No. 18/797,037, inventors Brown S.C, et al., filed Aug. 7, 2024.
Zheng, Z., et al., "Subscription to Multiple Stream Originators, Draft-zhou-netconf-multi-stream-originators-10," Internet Engineering Task Force, 2019, vol. 6, pp. 1-21.

* cited by examiner

REMOTE MANAGEMENT OF A FACILITY

RELATED APPLICATION

This application claims priority to U.S. Provisional Patent Application Ser. No. 62/988,861, filed Mach 12, 2020 titled "SELF ORCHESTRATING NETWORK," and to International Patent Application Serial No. PCT/US20/18677, filed Feb. 18, 2020, titled "REMOTE MANAGEMENT OF A FACILITY," which claims priority to U.S. Provisional Patent Application Ser. No. 62/807,668, filed Feb. 19, 2019, titled "CLOUD-BASED TECHNIQUES FOR MANAGING SITES HAVING SWITCHABLE OPTICAL DEVICES." This application is also a Continuation-in-Part of PCT/US21/17946, filed Feb. 12, 2021, titled "DATA AND POWER NETWORK OF A FACILITY," which claims priority from U.S. Provisional Patent Application Ser. No. 63/146,365, filed Feb. 5, 2021, titled "DATA AND POWER NETWORK OF A FACILITY," from U.S. Provisional Patent Application Ser. No. 63/027,452, filed May 20, 2020, titled, "DATA AND POWER NETWORK OF AN ENCLOSURE," from U.S. Provisional Patent Application Ser. No. 62/978,755, filed Feb. 19, 2020, titled "DATA AND POWER NETWORK OF AN ENCLOSURE," from U.S. Provisional Patent Application Ser. No. 62/977,001, filed Feb. 14, 2020, titled "DATA AND POWER NETWORK OF AN ENCLOSURE." This application is also a Continuation-in-Part of U.S. patent application Ser. No. 16/447,169, filed Jun. 20, 2019, titled "SENSING AND COMMUNICATIONS UNIT FOR OPTICALLY SWITCHABLE WINDOW SYSTEMS," which claims priority from (I) U.S. Provisional Patent Application Ser. No. 62/688,957, filed Jun. 22, 2018, titled "SENSING AND COMMUNICATIONS UNIT FOR OPTICALLY SWITCHABLE WINDOW SYSTEMS," (II) U.S. Provisional Patent Application Ser. No. 62/858,100, filed Jun. 6, 2019, titled "SENSING AND COMMUNICATIONS UNIT FOR OPTICALLY SWITCHABLE WINDOW SYSTEMS," (III) U.S. Provisional Patent Application Ser. No. 62/803,324, filed Feb. 8, 2019, titled "SENSING AND COMMUNICATIONS UNIT FOR OPTICALLY SWITCHABLE WINDOW SYSTEMS," (IV) U.S. Provisional Patent Application Ser. No. 62/768,775, filed Nov. 16, 2018, titled "SENSING AND COMMUNICATIONS UNIT FOR OPTICALLY SWITCHABLE WINDOW SYSTEMS." This application is also a Continuation-In-Part of U.S. patent application Ser. No. 17/083,128, filed Oct. 28, 2020, titled "Building Network," which is a Continuation of U.S. patent application Ser. No. 16/664,089, filed Oct. 25, 2019, titled "Building Network," which is a Continuation-In-Part of International Patent Application Serial No. PCT/US19/30467, filed May 2, 2019, titled "EDGE NETWORK FOR BUILDING SERVICES," which claims priority to U.S. Provisional Patent Application Ser. No. 62/666,033, filed May 2, 2018, titled "EDGE NETWORK FOR BUILDING SERVICES," U.S. patent application Ser. No. 16/664,089, filed Oct. 25, 2019, titled "BUILDING NETWORK," is also a Continuation-In-Part of International Patent Application Serial No. PCT/US18/29460, filed Apr. 25, 2018, titled "TINTABLE WINDOW SYSTEM FOR BUILDING SERVICES," that claims priority to (i) U.S. Provisional Patent Application Ser. No. 62/607,618, filed Dec. 19, 2017, titled "ELECTROCHROMIC WINDOWS WITH TRANSPARENT DISPLAY TECHNOLOGY FIELD," (ii) U.S. Provisional Patent Application Ser. No. 62/523,606, filed Jun. 22, 2017, titled "ELECTROCHROMIC WINDOWS WITH TRANSPARENT DISPLAY TECHNOLOGY," (iii) U.S. Provisional Patent Application Ser. No. 62/507,704, filed May 17, 2017, titled "ELECTROCHROMIC WINDOWS WITH TRANSPARENT DISPLAY TECHNOLOGY," (iv) U.S. Provisional Patent Application Ser. No. 62/506,514, filed May 15, 2017, titled "ELECTROCHROMIC WINDOWS WITH TRANSPARENT DISPLAY TECHNOLOGY," and (v) U.S. Provisional Patent Application Ser. No. 62/490,457, filed Apr. 26, 2017, titled "ELECTROCHROMIC WINDOWS WITH TRANSPARENT DISPLAY TECHNOLOGY." This application is also a Continuation-In-Part of U.S. patent application Ser. No. 17/081,809, filed Oct. 27, 2020, titled "Tintable Window System Computing Platform," which is a Continuation of U.S. patent application Ser. No. 16/608,159, filed Oct. 24, 2019, titled "TINTABLE WINDOW SYSTEM COMPUTING PLATFORM," that is a National Stage Entry of International Patent Application Serial No. PCT/US18/29406, filed Apr. 25, 2018, titled "TINTABLE WINDOW SYSTEM COMPUTING PLATFORM," which claims priority to U.S. Provisional Patent Application Ser. No. 62/607,618, U.S. Provisional Patent Application Ser. No. 62/523,606, U.S. Provisional Patent Application Ser. No. 62/507,704, U.S. Provisional Patent Application Ser. No. 62/506,514, and U.S. Provisional Patent Application Ser. No. 62/490,457. Each of the above recited patent applications is incorporated herein by reference in its entirety.

BACKGROUND

The present disclosure relates to techniques for managing sites having switchable optical devices, more particularly cloud-based techniques for remotely managing sites that each include a local network of switchable optical devices.

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device of the window will cause them to darken; reversing the voltage causes them to lighten. This capability allows control of the amount of light that passes through the windows, and presents an opportunity for electrochromic windows to be used as energy-saving devices.

Optically switchable devices such as electrochromic windows, sometimes referred to as "smart windows", may be networked together, and with one or more window controllers and/or network controllers, by way of a local network such as a Controller Area Network (CAN) bus that includes in a particular installation, building site or structure ("site") an associated controller "CAN Manager" for regulating communications across the CAN bus. Improved techniques for interfacing with such networks are desirable.

SUMMARY

In some aspects, disclosed herein are techniques for managing sites having switchable optical devices are disclosed, including cloud-based techniques for remotely managing sites that each include a local network of switchable optical devices. In another aspect, a system includes a building and remote master network controller, the building including a network of electrochromic windows and window controllers and at least one network controller. In an embodiment, the network controller is configured to (i) communicate with the window controllers, e.g., over a local data bus, and (ii) communicate with a remote master controller, e.g., by way of an internet protocol.

In one embodiment, a cloud-based system includes one or both of computational and data storage resources. The cloud-based system is configured to be communicatively coupled with a plurality of remote sites, each site including a respective network of switchable optical devices and at least one associated network controller. The cloud-based system is further configured to receive data from the at least one network controller about the functioning of the respective network and send data and/or control messages, over the one or more interfaces, to the at least one associated network controller.

In another embodiment, a building includes a plurality of electrochromic windows and window controllers and at least one network controller. The network controller is configured to communicate with the window controllers over a local data bus and communicate with a remote master controller by way of an internet protocol.

In another aspect, a cloud-based system comprises one or both of computational and data storage resources, wherein the cloud-based system is configured to: (i) be communicatively coupled with a plurality of remote sites, each site including (a) a respective network of switchable optical devices and (b) at least one associated network controller; (ii) receive data from the at least one associated network controller about the functioning of the respective network; and (iii) responsive to the received data, send data and/or control messages to the at least one associated network controller.

In some embodiments, at least one of the remote sites is a building including (A) a building management system (BMS) and (B) the cloud-based system, is communicatively coupled with the respective network of switchable optical devices by way of one or both of the BMS and the associated network controller. In some embodiments, at least one of the remote sites is a building including a building management system (BMS), and the cloud-based system is communicatively coupled with the at least one remote site (e.g., only) by way the BMS. In some embodiments, the cloud-based system is communicatively coupled with at least one remote site (e.g., only) by way of the associated network controller, e.g., irrespective of whether or not the remote site includes a building management system. In some embodiments, the system is configured as a master network controller for at least one of the plurality of remote sites. In some embodiments, the system is communicatively coupled with at least one of the remote sites by way of an application programming interface. In some embodiments, the system is configured to provide a human operator interface. In some embodiments, the human operator interface includes one or more control consoles configured to present information about functioning of devices in the remote sites to a human operator.

In another aspect, a building comprises (I) (i) a network of electrochromic windows and (ii) window controllers; and (II) at least one network controller, wherein the network controller is figured to: (A) communicate with the window controllers over a local data bus, and (B) communicate with a remote master controller, e.g., by way of an internet protocol.

In some embodiments, the remote master controller is configured to reside in a cloud-based system including one or both of computational and data storage resources. In some embodiments, the local data bus is compliant with a Controller Area Network (abbreviated herein as "CAN") standard. In some embodiments, the network controller includes a CAN manager, the CAN manager including an application programming interface configured to accept HTTP inputs from the remote master controller (e.g., over the Internet and a CAN interface) to communicate with the window controllers. In some embodiments, the at least one network controller is configured to (a) send data about the functioning of the network to the remote master controller, and (b) receive data and/or control messages, from the remote master controller.

In another aspect, a system comprises: a building including a network of electrochromic windows and window controllers and at least one network controller; and a remote master network controller, wherein the network controller is configured to: (i) communicate with the window controllers over a local data bus; and (ii) communicate with a remote master controller by way of an internet protocol.

In some embodiments, the remote master controller is configured to reside in a cloud-based system including one or both of computational and data storage resources. In some embodiments, the local data bus is compliant with a Controller Area Network (CAN) standard. In some embodiments, the network controller includes a CAN manager, the CAN manager including an application programming interface configured to accept HTTP inputs from the remote master controller over the Internet and a CAN interface to communicate with the window controllers. In some embodiments, the building includes a building management system (BMS) and the remote master network controller is communicatively coupled with the network of electrochromic windows by way of one or both of the BMS and the network controller. In some embodiments, the building includes a building management system (BMS) and the remote master network controller is communicatively coupled with the building only by way of the BMS. In some embodiments, the remote master network controller is communicatively coupled with the network of electrochromic windows only by way of the network controller, irrespective of whether or not the building includes a building management system. In some embodiments, the remote master network controller is communicatively coupled with the window controllers by way of an application programming interface. In some embodiments, the network controller is configured to (i) send data about the functioning of the network to the remote master controller, and (ii) receive data and/or control messages, from the remote master controller.

In another aspect, a method, implemented on a cloud-based system coupled with a plurality of remote building sites, each site including a network of electrochromic windows, window controllers and at least one network controller, the method comprising: (a) receiving data from the at least one network controller about the functioning of the respective network; and (b) sending data and/or control messages to the at least one network controller.

In another aspect, a non-transitory computer readable media for controlling one or more devices of a facility, the non-transitory computer readable media having instructions inscribed thereon which, when executed by one or more processors, cause the one or more processors to execute a method, comprising: controlling, or directing control of, the one or more devices that are disposed in the facility, which hierarchy of controllers comprises a plurality of control levels of which a single control level is physically disposed in the facility, which single control level (e.g., one or more processors associated with the single control level) is configured to communicatively couple to the one or more devices.

In some embodiments, the single control level is controlled by at least one higher control level as compared to the single control level, which at least one higher control level is of the plurality of control levels. In some embodiments, the at least one higher control level comprises one or more processors that are disposed outside of the facility and/or in a cloud. In some embodiments, the at least one higher control level comprises one or more processors whose roles in the hierarchy of controllers are dynamically altered. In some embodiments, only one single control level is physically disposed in the facility. In some embodiments, the single control level comprises at least one circuitry configured to directly control the one or more devices. In some embodiments, the at least one circuitry comprises a microcontroller. In some embodiments, the at least one circuitry comprises a switch. In some embodiments, the switch is an on-off switch. In some embodiments, the at least one circuitry comprises a computer readable media of a lower sophistication level than that controller(s) at any higher level in the hierarchy of controllers. In some embodiments, the at least one circuitry is of a lower sophistication level than that of controller(s) at any higher level in the hierarchy of controllers. In some embodiments, the at least one circuitry is configured for communication with the one or more devices, which at least one circuitry is configured to control, or direct control of, operation of the one or more devices. In some embodiments, the one or more processors on which the non-transitory computer readable media is disposed, are external to the facility, which one or more processors are communicatively coupled to the one or more devices. In some embodiments, at least a portion of the one or more processors on which the non-transitory computer readable media is disposed, is disposed in a cloud. In some embodiments, the facility is devoid of the one or more processors as part of the hierarchy of controllers. In some embodiments, the facility is devoid of a non-transitory computer readable media on which a control logic is inscribed. In some embodiments, the one control level comprises one or more processors that comprise circuitry and logic. In some embodiments, the one or more processors on which the non-transitory computer readable media is disposed, is communicatively coupled to at least one cabling network system disposed in the facility. In some embodiments, the one or more devices are communicatively coupled to the at least one network system. In some embodiments, the at least one network system comprises a network management system. In some embodiments, the at least one network system includes electrical and/or optical cabling. In some embodiments, the at least one network system includes twisted wires and/or coaxial wires.

In another aspect, a method for controlling one or more devices of a facility, the method comprises: controlling, or directing control of, the one or more devices that are disposed in the facility, which hierarchy of controllers comprises a plurality of control levels of which a single control level (e.g., one or more controllers associated with the single control level) is physically disposed in the facility.

In some embodiments, the single control level is controlled by at least one higher control level as compared to the single control level, which at least one higher control level is of the plurality of control levels. In some embodiments, the at least one higher control level comprises one or more controllers that are disposed outside of the facility. In some embodiments, the further comprises dynamically altering roles in the hierarchy of controllers of the at least one higher control level. In some embodiments, only one single control level is physically disposed in the facility. In some embodiments, the single control level comprises at least one controller configured to control, or directly control of, the one or more devices. In some embodiments, the at least one controller comprises logic of a lower sophistication level than that controller(s) at any higher level in the hierarchy of controllers. In some embodiments, the at least one controller is of a lower sophistication level than that of controller(s) at any higher level in the hierarchy of controllers. In some embodiments, the one or more controllers are disposed external to the facility. In some embodiments, logic of the one or more controllers is in a cloud. In some embodiments, the facility is devoid of the one or more controllers as part of the hierarchy of controllers. In some embodiments, the facility is devoid of non-transitory media on which a control logic is inscribed. In some embodiments, the one or more controllers are communicatively coupled to at least one cabling network system disposed in the facility. In some embodiments, the further comprises communicating with the one or more devices through the at least one network system. In some embodiments, the at least one network system comprises a network management system that is controlled by the hierarchy of controllers. In some embodiments, the at least one network system includes electrical and/or optical cabling. In some embodiments, the at least one network system includes twisted wires and/or coaxial wires. In some embodiments, the at least one network system includes one network system per building of the facility. In some embodiments, the facility comprises one or more buildings.

In another aspect, a non-transitory computer readable media for controlling one or more devices of a facility, the non-transitory computer readable media having instructions inscribed thereon which, when executed by one or more processors, cause the one or more processors to execute a method, comprising: controlling, or directing control of, the one or more devices that are disposed in the facility, which hierarchy of controllers comprises a plurality of control levels of which a single control level is physically disposed in the facility, which single control level (e.g., one or more processors associated with the single control level) is configured to communicatively couple to the one or more devices.

In some embodiments, the single control level is controlled by at least one higher control level as compared to the single control level, which at least one higher control level is of the plurality of control levels. In some embodiments, the at least one higher control level comprises one or more processors that are disposed outside of the facility and/or in a cloud. In some embodiments, the at least one higher control level comprises one or more processors whose roles in the hierarchy of controllers are dynamically altered. In some embodiments, only one single control level is physically disposed in the facility. In some embodiments, the single control level comprises at least one circuitry configured to directly control the one or more devices. In some embodiments, the at least one circuitry comprises a microcontroller. In some embodiments, the at least one circuitry comprises a switch. In some embodiments, the switch is an on-off switch. In some embodiments, the at least one circuitry comprises a computer readable media of a lower sophistication level than that controller(s) at any higher level in the hierarchy of controllers. In some embodiments, the at least one circuitry is of a lower sophistication level than that of controller(s) at any higher level in the hierarchy of controllers. In some embodiments, the at least one circuitry is configured for communication with the one or more devices, which at least one circuitry is configured to control, or direct control of, operation of the one or more devices. In some embodiments, the one or more processors on which the non-transitory computer readable media is disposed, are external to the facility, which one or more processors are communicatively coupled to the one or more devices. In some embodiments, at least a portion of the one or more processors on which the non-transitory computer readable media is disposed, is disposed in a cloud. In some embodiments, the facility is devoid of the one or more processors as part of the hierarchy of controllers. In some embodiments, the facility is devoid of a non-transitory computer readable media on which a control logic is inscribed. In some embodiments, the one control level comprises one or more processors that comprise circuitry and logic. In some embodiments, the one or more processors on which the non-transitory computer readable media is disposed, is communicatively coupled to at least one cabling network system disposed in the facility. In some embodiments, the one or more devices are communicatively coupled to the at least one network system. In some embodiments, the at least one network system comprises a network management system. In some embodiments, the at least one network system includes electrical and/or optical cabling. In some embodiments, the at least one network system includes twisted wires and/or coaxial wires.

In another aspect, the present disclosure provides methods that use any of the systems and/or apparatuses disclosed herein, e.g., for their intended purpose.

In another aspect, the present disclosure provides systems, apparatuses (e.g., controllers), and/or non-transitory computer-readable medium (e.g., software) that implement any of the methods disclosed herein.

In another aspect, an apparatus comprises at least one controller that is programmed to direct a mechanism used to implement (e.g., effectuate) any of the method disclosed herein, wherein the at least one controller is operatively coupled to the mechanism.

In another aspect, an apparatus comprises at least one controller that is configured (e.g., programmed) to implement (e.g., effectuate) the method disclosed herein. The at least one controller may implement any of the methods disclosed herein.

In another aspect, a system comprises at least one controller that is programmed to direct operation of at least one another apparatus (or component thereof), and the apparatus (or component thereof), wherein the at least one controller is operatively coupled to the apparatus (or to the component thereof). The apparatus (or component thereof) may include any apparatus (or component thereof) disclosed herein. The at least one controller may direct any apparatus (or component thereof) disclosed herein.

In another aspect, a computer software product, comprising a non-transitory computer-readable medium in which program instructions are stored, which instructions, when read by a computer, cause the computer to direct a mechanism (e.g., apparatus and/or any of its components) disclosed herein to implement (e.g., effectuate) any of the method disclosed herein, wherein the non-transitory computer-readable medium is operatively coupled to the mechanism. The mechanism can comprise any apparatus (or any component thereof) disclosed herein.

In another aspect, the present disclosure provides a non-transitory computer-readable medium comprising machine-executable code that, upon execution by one or more computer processors, implements any of the methods disclosed herein.

In another aspect, the present disclosure provides a non-transitory computer-readable medium comprising machine-executable code that, upon execution by one or more computer processors, effectuates directions of the controller(s) (e.g., as disclosed herein).

In another aspect, the present disclosure provides a computer system comprising one or more computer processors and a non-transitory computer-readable medium coupled thereto. The non-transitory computer-readable medium comprises machine-executable code that, upon execution by the one or more computer processors, implements any of the methods disclosed herein and/or effectuates directions of the controller(s) disclosed herein.

The content of this summary section is provided as a simplified introduction to the disclosure and is not intended to be used to limit the scope of any invention disclosed herein or the scope of the appended claims.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

These and other features and embodiments will be described in more detail with reference to the drawings.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "Fig." and "Figs." herein), of which:

Figure 2A:
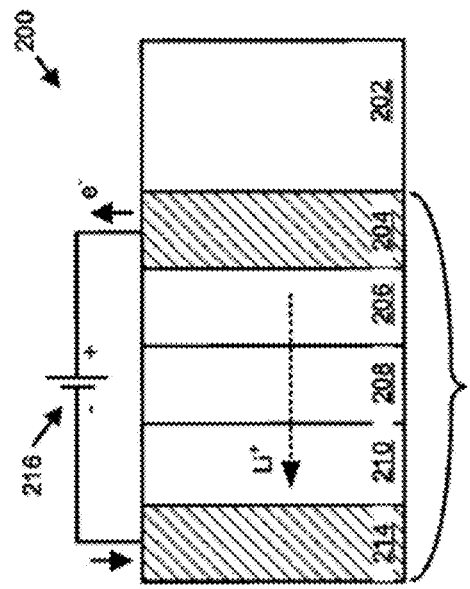
FIG. 2A depicts a schematic cross-section of an electrochromic device in a bleached state (or transitioning to a bleached state)

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a," "an," and "the" are not intended to refer to only a singular entity but include the general class of which a specific example may be used for illustration. The terminology herein is used to describe specific embodiments of the invention(s), but their usage does not delimit the invention(s).

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes "next to," "adjoining," "in contact with," and "in proximity to."

The term "operatively coupled" or "operatively connected" refers to a first element (e.g., mechanism) that is coupled (e.g., connected) to a second element, to allow the intended operation of the second and/or first element. The coupling may comprise physical or non-physical coupling. The non-physical coupling may comprise signal-induced coupling (e.g., wireless coupling). Coupled can include physical coupling (e.g., physically connected), or non-physical coupling (e.g., via wireless communication).

An element (e.g., mechanism) that is "configured to" perform a function includes a structural feature that causes the element to perform this function. A structural feature may include an electrical feature, such as a circuitry or a circuit element. A structural feature may include a circuitry (e.g., comprising electrical or optical circuitry). Electrical circuitry may comprise one or more wires. Optical circuitry may comprise at least one optical element (e.g., beam splitter, mirror, lens and/or optical fiber). A structural feature may include a mechanical feature. A mechanical feature may comprise a latch, a spring, a closure, a hinge, a chassis, a support, a fastener, or a cantilever, and so forth. Performing the function may comprise utilizing a logical feature. A logical feature may include programming instructions. Programming instructions may be executable by at least one processor. Programming instructions may be stored or encoded on a medium accessible by one or more processors.

In the following description, numerous specific details are set forth in order to provide a thorough understanding of the presented embodiments. The disclosed embodiments may be practiced without some or all of these specific details. In other instances, well-known process operations have not been described in detail to not unnecessarily obscure the disclosed embodiments. While the disclosed embodiments will be described in conjunction with the specific embodiments, it will be understood that it is not intended to limit the disclosed embodiments. It should be understood that while disclosed embodiments focus on electrochromic windows (also referred to as smart windows), the aspects disclosed herein may apply to other types of tintable windows. For example, a tintable window incorporating a liquid crystal device or a suspended particle device, instead of an electrochromic device could be incorporated in any of the disclosed embodiments.

In order to orient the reader to the embodiments of systems and methods disclosed herein, a brief discussion of electrochromic devices and window controllers is provided. This initial discussion is provided for context only, and the subsequently described embodiments of systems, window controllers, and methods are not limited to the specific features and fabrication processes of this initial discussion.

Figure 1:
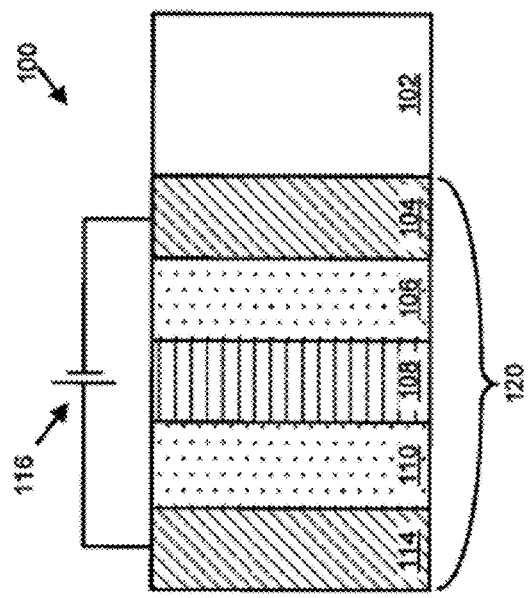
FIG. 1 depicts a schematic cross-section of an electrochromic device.

FIG. 1 schematically depicts an electrochromic device 100, in cross-section. Electrochromic device 100 includes a substrate 102, a first conductive layer (CL) 104, an electrochromic layer (EC) 106, an ion conducting layer (IC) 108, a counter electrode layer (CE) 110, and a second conductive layer (CL) 114. Layers 104, 106, 108, 110, and 114 are collectively referred to as an electrochromic stack 120. A voltage source 116 operable to apply an electric potential across electrochromic stack 120 effects the transition of the electrochromic device from, for example, a bleached state to a colored state. The order of layers can be reversed with respect to the substrate.

Electrochromic devices having distinct layers as described can be fabricated as all solid state devices and/or all inorganic devices. Such devices and methods of fabricating them are described in more detail in U.S. patent application Ser. No. 12/645,111, entitled "Fabrication of Low-Defectivity Electrochromic Devices," filed on Dec. 22, 2009, and naming Mark Kozlowski et al. as inventors, and in U.S. patent application Ser. No. 12/645,159, entitled, "Electrochromic Devices," filed on Dec. 22, 2009 and naming Zhongchun Wang et al. as inventors, each of which is hereby incorporated by reference in its entirety. It should be understood, however, that any one or more of the layers in the stack may contain some amount of organic material. The same can be said for liquids that may be present in one or more layers in small amounts. It should also be understood that solid state material may be deposited or otherwise formed by processes employing liquid components such as certain processes employing sol-gels or chemical vapor deposition.

Additionally, it should be understood that the reference to a transition between a bleached state and colored state is non-limiting and suggests only one example, among many, of an electrochromic transition that may be implemented. Unless otherwise specified herein (including the foregoing discussion), whenever reference is made to a bleached-colored transition, the corresponding device or process encompasses other optical state transitions such as non-reflective-reflective, transparent-opaque, etc. Further, the term "bleached" refers to an optically neutral state, for example, uncolored, transparent, or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In embodiments described herein, the electrochromic device reversibly cycles between a bleached state and a colored state. In some cases, when the device is in a bleached state, a potential is applied to the electrochromic stack 120 such that available ions in the stack reside primarily in the counter electrode 110. When the potential on the electrochromic stack is reversed, the ions are transported across the ion conducting layer 108 to the electrochromic material 106 and cause the material to transition to the colored state. In a similar way, the electrochromic device of embodiments described herein can be reversibly cycled between different tint levels (e.g., bleached state, darkest colored state, and intermediate levels between the bleached state and the darkest colored state).

Referring again to FIG. 1, voltage source 116 may be configured to operate in conjunction with radiant and other environmental sensors. As described herein, voltage source 116 interfaces with a device controller (not shown in this figure). Additionally, voltage source 116 may interface with an energy management system that controls the electrochromic device according to various criteria such as the time of year, time of day, and measured environmental conditions. Such an energy management system, in conjunction with large area electrochromic devices (e.g., an electrochromic window), can dramatically lower the energy consumption of a building.

Any material having suitable optical, electrical, thermal, and mechanical properties may be used as substrate 102. Such substrates include, for example, glass, plastic, and mirror materials. Suitable glasses include either clear or tinted soda lime glass, including soda lime float glass. The glass may be tempered or untempered.

In many cases, the substrate is a glass pane sized for residential window applications. The size of such glass pane can vary widely depending on the specific needs of the residence. In other cases, the substrate is architectural glass. Architectural glass is typically used in commercial buildings, but may also be used in residential buildings, and typically, though not necessarily, separates an indoor environment from an outdoor environment. In certain embodiments, architectural glass is at least 20 inches by 20 inches, and can be much larger, for example, as large as about 80 inches by 120 inches. Architectural glass is typically at least about 2 mm thick, typically between about 3 mm and about 6 mm thick. Of course, electrochromic devices are scalable to substrates smaller or larger than architectural glass. Further, the electrochromic device may be provided on a mirror of any size and shape.

On top of substrate 102 is conductive layer 104. In certain embodiments, one or both of the conductive layers 104 and 114 are inorganic and/or solid. Conductive layers 104 and 114 may be made from a number of different materials, including conductive oxides, thin metallic coatings, conductive metal nitrides, and composite conductors. Typically, conductive layers 104 and 114 are transparent at least in the range of wavelengths where electrochromism is exhibited by the electrochromic layer. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Since oxides are often used for these layers, they are sometimes referred to as "transparent conductive oxide" (TCO) layers. Thin metallic coatings that are substantially transparent may also be used, as well as combinations of TCO's and metallic coatings.

The function of the conductive layers is to spread an electric potential provided by voltage source 116 over surfaces of the electrochromic stack 120 to interior regions of the stack, with relatively little ohmic potential drop. The electric potential is transferred to the conductive layers though electrical connections to the conductive layers. In some embodiments, bus bars, one in contact with conductive layer 104 and one in contact with conductive layer 114, provide the electric connection between the voltage source 116 and the conductive layers 104 and 114. The conductive layers 104 and 114 may also be connected to the voltage source 116 with other conventional means.

Overlaying conductive layer 104 is electrochromic layer 106. In some embodiments, electrochromic layer 106 is inorganic and/or solid. The electrochromic layer may contain any one or more of a number of different electrochromic materials, including metal oxides. Such metal oxides include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_5$), nickel oxide ($Ni_2O_3$), cobalt oxide ($Co_2O_3$) and the like. During operation, electrochromic layer 106 transfers ions to and receives ions from counter electrode layer 110 to cause optical transitions.

Generally, the colorization (or change in any optical property—e.g., absorbance, reflectance, and transmittance) of the electrochromic material is caused by reversible ion insertion into the material (e.g., intercalation) and a corresponding injection of a charge balancing electron. Typically, some fraction of the ions responsible for the optical transition is irreversibly bound up in the electrochromic material. Some or all of the irreversibly bound ions are used to compensate "blind charge" in the material. In most electrochromic materials, suitable ions include lithium ions (Li+) and hydrogen ions (H+) (that is, protons). In some cases, however, other ions will be suitable. In various embodiments, lithium ions are used to produce the electrochromic phenomena. Intercalation of lithium ions into tungsten oxide ($WO_3$-y ($0<y\leq\sim0.3$)) causes the tungsten oxide to change from transparent (bleached state) to blue (colored state).

Referring again to FIG. 1, in electrochromic stack 120, ion conducting layer 108 is sandwiched between electrochromic layer 106 and counter electrode layer 110. In some embodiments, counter electrode layer 110 is inorganic and/or solid. The counter electrode layer may comprise one or more of a number of different materials that serve as a reservoir of ions when the electrochromic device is in the bleached state. During an electrochromic transition initiated by, for example, application of an appropriate electric potential, the counter electrode layer transfers some or all of the ions it holds to the electrochromic layer, changing the electrochromic layer to the colored state. Concurrently, in the case of NiWO, the counter electrode layer colors with the loss of ions.

In some embodiments, suitable materials for the counter electrode complementary to WO3 include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), and Prussian blue.

When charge is removed from a counter electrode 110 made of nickel tungsten oxide (that is, ions are transported from counter electrode 110 to electrochromic layer 106), the counter electrode layer will transition from a transparent state to a colored state.

In the depicted electrochromic device, between electrochromic layer 106 and counter electrode layer 110, there is the ion conducting layer 108. Ion conducting layer 108 serves as a medium through which ions are transported (in the manner of an electrolyte) when the electrochromic device transitions between the bleached state and the colored state. Preferably, ion conducting layer 108 is highly conductive to the relevant ions for the electrochromic and the counter electrode layers, but has sufficiently low electron conductivity that negligible electron transfer takes place during normal operation. A thin ion conducting layer with high ionic conductivity permits fast ion conduction and hence fast switching for high performance electrochromic devices. In certain embodiments, the ion conducting layer 108 is inorganic and/or solid.

Examples of suitable ion conducting layers (for electrochromic devices having a distinct IC layer) include silicates, silicon oxides, tungsten oxides, tantalum oxides, niobium oxides, and borates. These materials may be doped with different dopants, including lithium. Lithium doped silicon oxides include lithium silicon-aluminum-oxide. In some embodiments, the ion conducting layer comprises a silicate-based structure. In some embodiments, a silicon-aluminum-oxide (SiAlO) is used for the ion conducting layer 108.

Electrochromic device 100 may include one or more additional layers (not shown), such as one or more passive layers. Passive layers used to improve certain optical properties may be included in electrochromic device 100. Passive layers for providing moisture or scratch resistance may also be included in electrochromic device 100. For example, the conductive layers may be treated with anti-reflective or protective oxide or nitride layers. Other passive layers may serve to hermetically seal electrochromic device 100.

FIG. 2A is a schematic cross-section of an electrochromic device in a bleached state (or transitioning to a bleached state). In accordance with specific embodiments, an electrochromic device 200 includes a tungsten oxide electrochromic layer (EC) 206 and a nickel-tungsten oxide counter electrode layer (CE) 210. Electrochromic device 200 also includes a substrate 202, a conductive layer (CL) 204, an ion conducting layer (IC) 208, and conductive layer (CL) 214.

A power source 216 is configured to apply a potential and/or current to an electrochromic stack 220 through suitable connections (e.g., bus bars) to the conductive layers 204 and 214. In some embodiments, the voltage source is configured to apply a potential of a few volts in order to drive a transition of the device from one optical state to another. The polarity of the potential as shown in FIG. 2A is such that the ions (lithium ions in this example) primarily reside (as indicated by the dashed arrow) in nickel-tungsten oxide counter electrode layer 210.

Figure 2B:
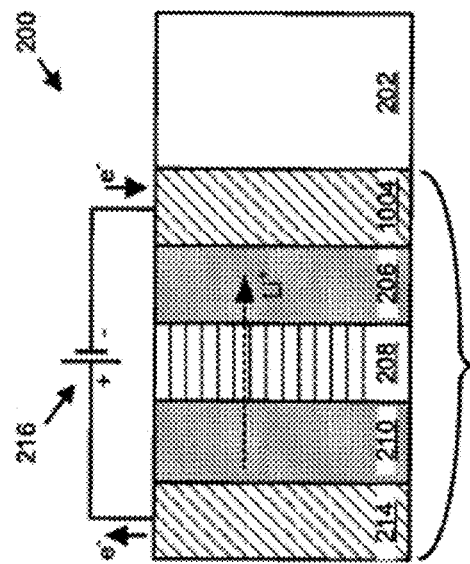
FIG. 2B depicts a schematic cross-section of the electrochromic device shown in FIG. 2A, but in a colored state (or transitioning to a colored state)

FIG. 2B is a schematic cross-section of electrochromic device 200 shown in FIG. 2A but in a colored state (or transitioning to a colored state). In FIG. 2B, the polarity of voltage source 216 is reversed, so that the electrochromic layer is made more negative to accept additional lithium ions, and thereby transition to the colored state. As indicated by the dashed arrow, lithium ions are transported across ion conducting layer 208 to tungsten oxide electrochromic layer 206. Tungsten oxide electrochromic layer 206 is shown in the colored state. Nickel-tungsten oxide counter electrode 210 is also shown in the colored state. As explained, nickel-tungsten oxide becomes progressively more opaque as it gives up (deintercalates) lithium ions. In this example, there is a synergistic effect where the transition to colored states for both layers 206 and 210 are additive toward reducing the amount of light transmitted through the stack and substrate.

As described above, an electrochromic device may include an electrochromic (EC) electrode layer and a counter electrode (CE) layer separated by an ionically conductive (IC) layer that is highly conductive to ions and highly resistive to electrons. As conventionally understood, the ionically conductive layer therefore prevents shorting between the electrochromic layer and the counter electrode layer. The ionically conductive layer allows the electrochromic and counter electrodes to hold a charge and thereby maintain their bleached or colored states. In electrochromic devices having distinct layers, the components form a stack which includes the ion conducting layer sandwiched between the electrochromic electrode layer and the counter electrode layer. The boundaries between these three stack components are defined by abrupt changes in composition and/or microstructure. Thus, the devices have three distinct layers with two abrupt interfaces.

In accordance with certain embodiments, the counter electrode and electrochromic electrodes are formed immediately adjacent one another, sometimes in direct contact, without separately depositing an ionically conducting layer. In some embodiments, electrochromic devices having an interfacial region rather than a distinct IC layer are employed. Such devices, and methods of fabricating them, are described in: U.S. patent application Ser. No. 12/772,075 filed on Apr. 30, 2010 issued as U.S. Pat. No. 8,300,298, and; U.S. patent application Ser. Nos. 12/814,277; and 12/814,279, filed on Jun. 11, 2010—each of the three patent applications and patent is entitled "Electrochromic Devices," each names Zhongchun Wang et al. as inventors, and each of which is incorporated by reference herein in its entirety.

A window controller is used to control the tint level of the electrochromic device of an electrochromic window. In some embodiments, the window controller is able to transition the electrochromic window between two tint states (levels), a bleached state and a colored state. In other embodiments, the controller can additionally transition the electrochromic window (e.g., having a single electrochromic device) to intermediate tint levels. In some disclosed embodiments, the window controller is able to transition the electrochromic window to four or more tint levels. Certain electrochromic windows allow intermediate tint levels by using two (or more) electrochromic lites in a single IGU, where each lite is a two-state lite.

If the window controller is able to transition each electrochromic device between two states, a bleached state and a colored state, the electrochromic window is able to attain four different states (tint levels), a colored state with both electrochromic devices being colored, a first intermediate state with one electrochromic device being colored, a second intermediate state with the other electrochromic device being colored, and a bleached state with both electrochromic devices being bleached. Embodiments of multi-pane electrochromic windows are further described in U.S. Pat. No. 8,270,059, naming Robin Friedman et al. as inventors, titled "MULTI-PANE ELECTROCHROMIC WINDOWS," which is hereby incorporated by reference in its entirety.

In some embodiments, the window controller is able to transition an electrochromic window having an electrochromic device capable of transitioning between two or more tint levels. For example, a window controller may be able to transition the electrochromic window to a bleached state, one or more intermediate levels, and a colored state. In some other embodiments, the window controller is able to transition an electrochromic window incorporating an electrochromic device between any number of tint levels between the bleached state and the colored state. Embodiments of methods and controllers for transitioning an electrochromic window to an intermediate tint level or levels are further described in U.S. Pat. No. 8,254,013, naming Disha Mehtani et al. as inventors, titled "CONTROLLING TRANSITIONS IN OPTICALLY SWITCHABLE DEVICES," which is hereby incorporated by reference in its entirety.

In some embodiments, a window controller can power one or more electrochromic devices in an electrochromic window. Typically, this function of the window controller is augmented with one or more other functions described in more detail below. Window controllers described herein are not limited to those that have the function of powering an electrochromic device to which it is associated for the purposes of control. That is, the power source for the electrochromic window may be separate from the window controller, where the controller has its own power source and directs application of power from the window power source to the window. However, it is convenient to include a power source with the window controller and to configure the controller to power the window directly, because it obviates the need for separate wiring for powering the electrochromic window.

Further, the window controllers described in this section are described as standalone controllers which may be configured to control the functions of a single window or a plurality of electrochromic windows, without integration of the window controller into a building control network or a building management system (BMS). Window controllers, however, may be integrated into a building control network or a BMS, as described further in the Building Management System section of this disclosure.

Figure 3:
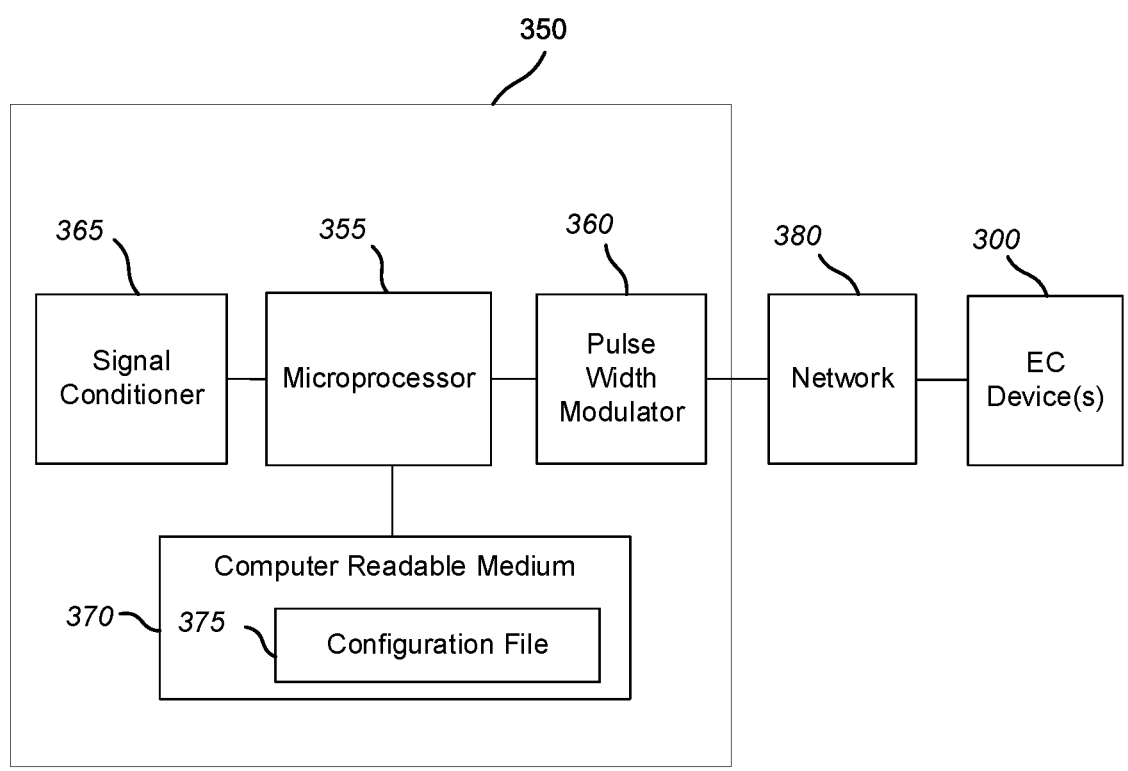
FIG. 3 depicts a simplified block diagram of components of a window controller.

FIG. 3 depicts a block diagram of some components of a window controller 350 and other components of a window controller system of disclosed embodiments. FIG. 3 is a simplified block diagram of a window controller, and more detail regarding window controllers can be found in U.S. patent application Ser. Nos. 13/449,248 and 13/449,251, both naming Stephen Brown as inventor, both titled "CONTROLLER FOR OPTICALLY-SWITCHABLE WINDOWS," and both filed on Apr. 17, 2012, and in U.S. patent Ser. No. 13/449,235, titled "CONTROLLING TRANSITIONS IN OPTICALLY SWITCHABLE DEVICES," naming Stephen Brown et al. as inventors and filed on Apr. 17, 2012, each of which is hereby incorporated by reference in its entireties.

In FIG. 3, the illustrated components of the window controller 350 include a microprocessor 355 or other processor, a pulse width modulator 360, a signal conditioning module 365, and a computer readable medium (e.g., memory) 370 having a configuration file 375. Window controller 350 is in electronic communication with one or more electrochromic devices 300 in an electrochromic window through network 380 (wired or wireless) to send instructions to the one or more electrochromic devices 300. In some embodiments, the window controller 350 may be a local window controller in communication through a network (wired or wireless) to a master window controller.

In disclosed embodiments, a building may have at least one room having an electrochromic window between the exterior and interior of a building. One or more sensors may be located to the exterior of the building and/or inside the room. In embodiments, the output from the one or more sensors may be input to the signal conditioning module 365 of the window controller 350. In some cases, the output from the one or more sensors may be input to a BMS, as described further in the Building Management Systems section. Although the sensors of depicted embodiments are shown as located on the outside vertical wall of the building, this is for the sake of simplicity, and the sensors may be in other locations, such as inside the room or on other surfaces to the exterior, as well. In some cases, two or more sensors may be used to measure the same input, which can provide redundancy in case one sensor fails or has an otherwise erroneous reading.

Figure 4:
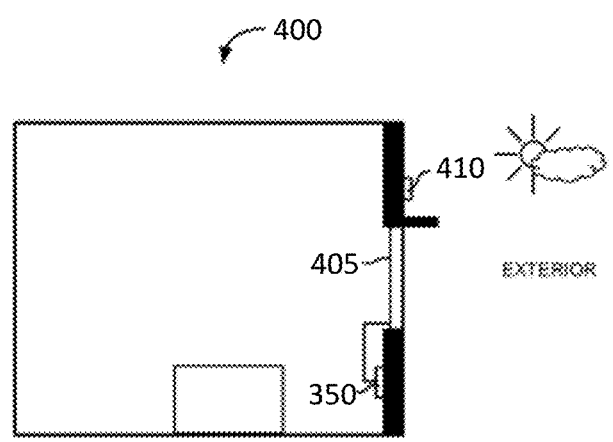
FIG. 4 is a schematic diagram of a room including a tintable window and at least one sensor, according to disclosed embodiments.

FIG. 4 depicts a schematic (side view) diagram of a room 400 having an electrochromic window 405 with at least one electrochromic device. The electrochromic window 405 is located between the exterior and the interior of a building, which includes the room 400. The room 400 also includes a window controller 350 connected to and configured to control the tint level of the electrochromic window 405. An exterior sensor 410 is located on a vertical surface in the exterior of the building. In other embodiments, an interior sensor may also be used to measure the ambient light in room 400. In yet other embodiments, an occupant sensor may also be used to determine when an occupant is in the room 400.

Exterior sensor 410 is a device, such as a photosensor, that is able to detect radiant light incident upon the device flowing from a light source such as the sun or from light reflected to the sensor from a surface, particles in the atmosphere, clouds, etc. The exterior sensor 410 may generate a signal in the form of electrical current that results from the photoelectric effect and the signal may be a function of the light incident on the sensor 410. In some cases, the device may detect radiant light in terms of irradiance in units of watts/$m^2$ or other similar units. In other cases, the device may detect light in the visible range of wavelengths in units of foot candles or similar units. In many cases, there is a linear relationship between these values of irradiance and visible light.

In some embodiments, exterior sensor 410 is configured to measure infrared light. In some embodiments, an exterior photosensor is configured to measure infrared light and/or visible light. In some embodiments, an exterior photosensor 410 may also include sensors for measuring temperature and/or humidity data. In some embodiments, intelligence logic may determine the presence of an obstructing cloud and/or quantify the obstruction caused by a cloud using one or more parameters (e.g., visible light data, infrared light data, humidity data, and temperature data) determined using an exterior sensor or received from an external network (e.g., a weather station). Various methods of detecting clouds using infrared sensors are described in International Patent Application No. PCT/US17/55631, titled "INFRARED CLOUD DETECTOR SYSTEMS AND METHODS," and filed, Oct. 6, 2017 which designates the United States and is incorporated herein by reference in its entirety.

Irradiance values from sunlight can be predicted based on the time of day and time of year as the angle at which sunlight strikes the earth changes. Exterior sensor 410 can detect radiant light in real-time, which accounts for reflected and obstructed light due to buildings, changes in weather (e.g., clouds), etc. For example, on cloudy days, sunlight would be blocked by the clouds and the radiant light detected by an exterior sensor 410 would be lower than on cloudless days.

In some embodiments, there may be one or more exterior sensors 410 associated with a single electrochromic window 405. Output from the one or more exterior sensors 410 could be compared to one another to determine, for example, if one of exterior sensors 410 is shaded by an object, such as by a bird that landed on exterior sensor 410. In some cases, it may be desirable to use relatively few sensors in a building because some sensors can be unreliable and/or expensive. In certain implementations, a single sensor or a few sensors may be employed to determine the current level of radiant light from the sun impinging on the building or perhaps one side of the building. A cloud may pass in front of the sun or a construction vehicle may park in front of the setting sun. These will result in deviations from the amount of radiant light from the sun calculated to normally impinge on the building.

Exterior sensor 410 may be a type of photosensor. For example, exterior sensor 410 may be a charge coupled device (CCD), photodiode, photoresistor, or photovoltaic cell. One of ordinary skill in the art would appreciate that future developments in photosensor and other sensor technology would also work, as they measure light intensity and provide an electrical output representative of the light level.

In some embodiments, output from exterior sensor 410 may be input to the signal conditioning module 365. The input may be in the form of a voltage signal to signal conditioning module 365. Signal conditioning module 365 passes an output signal to the window controller 350. Window controller 350 determines a tint level of the electrochromic window 405, based on various information from the configuration file 375, output from the signal conditioning module 365, and/or override values. Window controller 350 may then instruct the PWM 360, to apply a voltage and/or current to electrochromic window 405 to transition to the desired tint level.

In disclosed embodiments, window controller 250 can instruct the PWM 260, to apply a voltage and/or current to electrochromic window 405 to transition it to any one of four or more different tint levels. In disclosed embodiments, electrochromic window 405 can be transitioned to at least eight different tint levels described as: 0 (lightest), 5, 10, 15, 20, 25, 30, and 35 (darkest). The tint levels may linearly correspond to visual transmittance values and solar heat gain coefficient (SHGC) values of light transmitted through the electrochromic window 405. For example, using the above eight tint levels, the lightest tint level of 0 may correspond to an SHGC value of 0.80, the tint level of 5 may correspond to an SHGC value of 0.70, the tint level of 10 may correspond to an SHGC value of 0.60, the tint level of 15 may correspond to an SHGC value of 0.50, the tint level of 20 may correspond to an SHGC value of 0.40, the tint level of 25 may correspond to an SHGC value of 0.30, the tint level of 30 may correspond to an SHGC value of 0.20, and the tint level of 35 (darkest) may correspond to an SHGC value of 0.10.

Window controller 350 or a master controller in communication with the window controller 350 may employ any one or more predictive control logic components to determine a desired tint level based on signals from the exterior sensor 410 and/or other input. The window controller 350 can instruct the PWM 360 to apply a voltage and/or current to electrochromic window 405 to transition it to the desired tint level.

The window controllers described herein also are suited for integration with or are within/part of a BMS. A BMS is a computer-based control system installed in a building that monitors and controls the building's mechanical and electrical equipment such as ventilation, lighting, power systems, elevators, fire systems, and security systems. A BMS consists of hardware, including interconnections by communication channels to a computer or computers, and associated software for maintaining conditions in the building according to preferences set by the occupants and/or by the building manager. For example, a BMS may be implemented using a local area network, such as Ethernet. The software can be based on, for example, internet protocols and/or open standards. One example is software from Tridium, Inc. (of Richmond, Virginia). One communications protocol commonly used with a BMS is BACnet (building automation and control networks).

A BMS is most common in a large building, and typically functions at least to control the environment within the building. For example, a BMS may control temperature, carbon dioxide levels, and humidity within a building. Typically, there are many mechanical devices that are controlled by a BMS such as heaters, air conditioners, blowers, vents, and the like. To control the building environment, a BMS may turn on and off these various devices under defined conditions. A core function of a typical modern BMS is to maintain a comfortable environment for the building's occupants while minimizing heating and cooling costs/demand. Thus, a modern BMS is used not only to monitor and control, but also to optimize the synergy between various systems, for example, to conserve energy and lower building operation costs.

In some embodiments, a window controller is integrated with a BMS, where the window controller is configured to control one or more electrochromic windows (e.g., 405) or other tintable windows. In other embodiments, the window controller is within or part of the BMS and the BMS controls both the tintable windows and the functions of other systems of the building. In one example, the BMS may control the functions of all the building systems including the one or more zones of tintable windows in the building.

Figure 5:
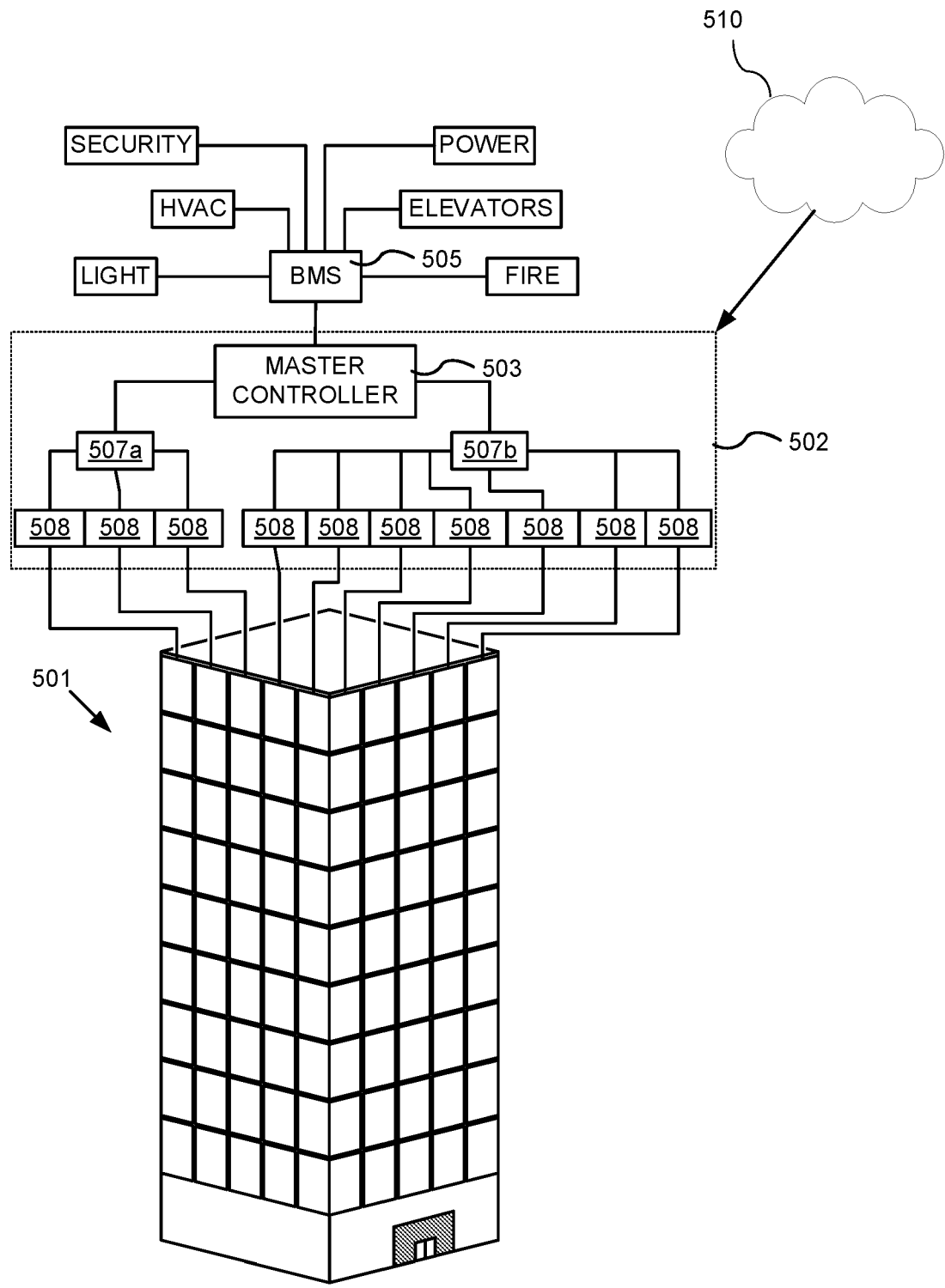
FIG. 5 is a schematic diagram of an example of a building and a building management system (BMS), according to certain implementations.

In some embodiments, each tintable window of the one or more zones includes at least one solid state and inorganic electrochromic device. In one embodiment, each of the tintable windows of the one or more zones is an electrochromic window having one or more solid state and inorganic electrochromic devices. In one embodiment, the one or more tintable windows include at least one all solid state and inorganic electrochromic device, but may include more than one electrochromic device, e.g. where each lite or pane of an IGU is tintable. In one embodiment, the electrochromic windows are multistate electrochromic windows, as described in U.S. patent application Ser. No. 12/851,514, filed on Aug. 5, 2010, and entitled "Multipane Electrochromic Windows." FIG. 5 depicts a schematic diagram of an example of a building 501 and a BMS 505 that manages a number of building systems including security systems, heating/ventilation/air conditioning (HVAC), lighting of the building, power systems, elevators, fire systems, and the like. Security systems may include magnetic card access, turnstiles, solenoid driven door locks, surveillance cameras, burglar alarms, metal detectors, and the like. Fire systems may include fire alarms and fire suppression systems including a water plumbing control. Lighting systems may include interior lighting, exterior lighting, emergency warning lights, emergency exit signs, and emergency floor egress lighting. Power systems may include the main power, backup power generators, and uninterrupted power source (UPS) grids.

Also, the BMS 505 manages a window control system 502. The window control system 502 is a distributed network of window controllers including a master controller, 503, network controllers, 507*a* and 507*b*, and end or leaf controllers 508. End or leaf controllers 508 may be similar to window controller 350 described with respect to FIG. 3. For example, master controller 503 may be in proximity to the BMS 505, and each floor of building 501 may have one or more network controllers 507*a* and 507*b*, while each window of the building has its own end controller 508. In this example, each of controllers 508 controls a specific electrochromic window of building 501. Window control system 502 is in communication with a cloud network 510 to receive data. For example, the window control system 502 can receive schedule information from clear sky models maintained on cloud network 510. Although, master controller 503 is described in FIG. 5 as separate from the BMS 505, in another embodiment, the master controller 503 is part of or within the BMS 505.

Each of controllers 508 can be in a separate location from the electrochromic window that it controls, or be integrated into the electrochromic window. For simplicity, only ten electrochromic windows of building 501 are depicted as controlled by master window controller 502. In a typical setting there may be a large number of electrochromic windows in a building controlled by window control system 502. Advantages and features of incorporating electrochromic window controllers as described herein with BMSs are described below in more detail and in relation to FIG. 5, where appropriate.

One aspect of the disclosed embodiments is a BMS including a multipurpose electrochromic window controller as described herein. By incorporating feedback from a electrochromic window controller, a BMS can provide, for example, enhanced: 1) environmental control, 2) energy savings, 3) security, 4) flexibility in control options, 5) improved reliability and usable life of other systems due to less reliance thereon and therefore less maintenance thereof, 6) information availability and diagnostics, 7) effective use of, and higher productivity from, staff, and various combinations of these, because the electrochromic windows can be automatically controlled. In some embodiments, a BMS may not be present or a BMS may be present but may not communicate with a master controller or communicate at a high level with a master controller. In certain embodiments, maintenance on the BMS would not interrupt control of the electrochromic windows.

In some cases, the BMS 505 or other building network may run according to daily, monthly, quarterly, or yearly schedules. For example, the lighting control system, the window control system, the HVAC, and the security system may operate on a 24 hour schedule accounting for when people are in the building during the workday. At night, the building may enter an energy savings mode, and during the day, the systems may operate in a manner that minimizes the energy consumption of the building while providing for occupant comfort. As another example, the systems may shut down or enter an energy savings mode over a holiday period.

The BMS schedule may be combined with geographical information. Geographical information may include the latitude and longitude of the building. Geographical information also may include information about the direction that each side of the building faces. Using such information, different rooms on different sides of the building may be controlled in different manners. For example, for east facing rooms of the building in the winter, the window controller may instruct the windows to have no tint in the morning so that the room warms up due to sunlight shining in the room and the lighting control panel may instruct the lights to be dim because of the lighting from the sunlight. The west facing windows may be controllable by the occupants of the room in the morning because the tint of the windows on the west side may have no impact on energy savings. However, the modes of operation of the east facing windows and the west facing windows may switch in the evening (e.g., when the sun is setting, the west facing windows are not tinted to allow sunlight in for both heat and lighting).

Described below is an example of a building, for example, like building 501 in FIG. 5, including a building network or a BMS, tintable windows for the exterior windows of the building (i.e., windows separating the interior of the building from the exterior of the building), and a number of different sensors. Light from exterior windows of a building generally has an effect on the interior lighting in the building about 20 feet or about 30 feet from the windows. That is, space in a building that is more that about 20 feet or about 30 feet from an exterior window receives little light from the exterior window. Such spaces away from exterior windows in a building are lit by lighting systems of the building.

Further, the temperature within a building may be influenced by exterior light and/or the exterior temperature. For example, on a cold day and with the building being heated by a heating system, rooms closer to doors and/or windows will lose heat faster than the interior regions of the building and be cooler compared to the interior regions.

For exterior sensors, the building may include exterior sensors on the roof of the building. Alternatively, the building may include an exterior sensor associated with each exterior window (e.g., as described in relation to FIG. 4, room 400) or an exterior sensor on each side of the building. An exterior sensor on each side of the building could track the irradiance on a side of the building as the sun changes position throughout the day.

When a window controller is integrated into a building network or a BMS, outputs from exterior sensors 410 may be input to a network of BMS and provided as input to the local window controller 350. For example, in some embodiments, output signals from any two or more sensors are received. In some embodiments, only one output signal is received, and in some other embodiments, three, four, five, or more outputs are received. These output signals may be received over a building network or a BMS.

In some embodiments, the output signals received include a signal indicating energy or power consumption by a heating system, a cooling system, and/or lighting within the building. For example, the energy or power consumption of the heating system, the cooling system, and/or the lighting of the building may be monitored to provide the signal indicating energy or power consumption. Devices may be interfaced with or attached to the circuits and/or wiring of the building to enable this monitoring. Alternatively, the power systems in the building may be installed such that the power consumed by the heating system, a cooling system, and/or lighting for an individual room within the building or a group of rooms within the building can be monitored.

Tint instructions can be provided to change to tint of the tintable window to the determined level of tint. For example, referring to FIG. 5, this may include master controller 503 issuing commands to one or more network controllers 507*a* and 507*b*, which in turn issue commands to end controllers 508 that control each window of the building. End controllers 508 may apply voltage and/or current to the window to drive the change in tint pursuant to the instructions.

In some embodiments, a building including electrochromic windows and a BMS may be enrolled in or participate in a demand response program run by the utility or utilities providing power to the building. The program may be a program in which the energy consumption of the building is reduced when a peak load occurrence is expected. The utility may send out a warning signal prior to an expected peak load occurrence. For example, the warning may be sent on the day before, the morning of, or about one hour before the expected peak load occurrence. A peak load occurrence may be expected to occur on a hot summer day when cooling systems/air conditioners are drawing a large amount of power from the utility, for example. The warning signal may be received by the BMS of the building or by window controllers configured to control the electrochromic windows in the building. The BMS can then instruct the window controller(s) to transition the appropriate electrochromic device in the electrochromic windows 405 to a dark tint level in order to aid in reducing the power draw of the cooling systems in the building at the time when the peak load is expected.

In some embodiments, tintable windows for the exterior windows of the building (i.e., windows separating the interior of the building from the exterior of the building), may be grouped into zones, with tintable windows in a zone being instructed in a similar manner. For example, groups of electrochromic windows on different floors of the building or different sides of the building may be in different zones. For example, on the first floor of the building, all of the east facing electrochromic windows may be in zone 1, all of the south facing electrochromic windows may be in zone 2, all of the west facing electrochromic windows may be in zone 3, and all of the north facing electrochromic windows may be in zone 4. As another example, all of the electrochromic windows on the first floor of the building may be in zone 1, all of the electrochromic windows on the second floor may be in zone 2, and all of the electrochromic windows on the third floor may be in zone 3. As yet another example, all of the east facing electrochromic windows may be in zone 1, all of the south facing electrochromic windows may be in zone 2, all of the west facing electrochromic windows may be in zone 3, and all of the north facing electrochromic windows may be in zone 4. As yet another example, east facing electrochromic windows on one floor could be divided into different zones. Any number of tintable windows on the same side and/or different sides and/or different floors of the building may be assigned to a zone. In embodiments where individual tintable windows have independently controllable zones, tinting zones may be created on a building façade using combinations of zones of individual windows, e.g. where individual windows may or may not have all of their zones tinted.

In some embodiments, electrochromic windows in a zone may be controlled by the same window controller. In some other embodiments, electrochromic windows in a zone may be controlled by different window controllers, but the window controllers may all receive the same output signals from sensors and use the same function or lookup table to determine the level of tint for the windows in a zone.

In some embodiments, electrochromic windows in a zone may be controlled by a window controller or controllers that receive an output signal from a transmissivity sensor. In some embodiments, the transmissivity sensor may be mounted proximate the windows in a zone. For example, the transmissivity sensor may be mounted in or on a frame containing an IGU (e.g., mounted in or on a mullion, the horizontal sash of a frame) included in the zone. In some other embodiments, electrochromic windows in a zone that includes the windows on a single side of the building may be controlled by a window controller or controllers that receive an output signal from a transmissivity sensor.

In some embodiments, a sensor (e.g., photosensor) may provide an output signal to a window controller to control the electrochromic windows 405 of a first zone (e.g., a master control zone). The window controller may also control the electrochromic windows 405 in a second zone (e.g., a slave control zone) in the same manner as the first zone. In some other embodiments, another window controller may control the electrochromic windows 405 in the second zone in the same manner as the first zone.

In some embodiments, a building manager, occupants of rooms in the second zone, or other person may manually instruct (using a tint or clear command or a command from a user console of a BMS, for example) the electrochromic windows in the second zone (i.e., the slave control zone) to enter a tint level such as a colored state (level) or a clear state. In some embodiments, when the tint level of the windows in the second zone is overridden with such a manual command, the electrochromic windows in the first zone (i.e., the master control zone) remain under control of the window controller receiving output from the transmissivity sensor. The second zone may remain in a manual command mode for a period of time and then revert back to be under control of the window controller receiving output from the transmissivity sensor. For example, the second zone may stay in a manual mode for one hour after receiving an override command, and then may revert back to be under control of the window controller receiving output from the transmissivity sensor.

In some embodiments, a building manager, occupants of rooms in the first zone, or other person may manually instruct (using a tint command or a command from a user console of a BMS, for example) the windows in the first zone (i.e., the master control zone) to enter a tint level such as a colored state or a clear state. In some embodiments, when the tint level of the windows in the first zone is overridden with such a manual command, the electrochromic windows in the second zone (i.e., the slave control zone) remain under control of the window controller receiving outputs from the exterior sensor. The first zone may remain in a manual command mode for a period of time and then revert back to be under control of window controller receiving output from the transmissivity sensor. For example, the first zone may stay in a manual mode for one hour after receiving an override command, and then may revert back to be under control of the window controller receiving output from the transmissivity sensor. In some other embodiments, the electrochromic windows in the second zone may remain in the tint level that they are in when the manual override for the first zone is received. The first zone may remain in a manual command mode for a period of time and then both the first zone and the second zone may revert back to be under control of the window controller receiving output from the transmissivity sensor.

Any of the methods described herein of control of a tintable window, regardless of whether the window controller is a standalone window controller or is interfaced with a building network, may be used control the tint of a tintable window.

In some embodiments, window controllers described herein include components for wired or wireless communication between the window controller, sensors, and separate communication nodes. Wireless or wired communications may be accomplished with a communication interface that interfaces directly with the window controller. Such interface could be native to the microprocessor or provided via additional circuitry enabling these functions. In addition, other systems of a site network may include components for wired or wireless communication between different system elements.

A separate communication node for wireless communications can be, for example, another wireless window controller, an end, intermediate, or master window controller, a remote control device, or a BMS. Wireless communication is used in the window controller for at least one of the following operations: programming and/or operating the electrochromic window 405, collecting data from the EC window 405 from the various sensors and protocols described herein, and using the electrochromic window 405 as a relay point for wireless communication. Data collected from electrochromic windows 405 also may include count data such as number of times an EC device has been activated, efficiency of the EC device over time, and the like. These wireless communication features are described in more detail below.

In one embodiment, wireless communication is used to operate the associated electrochromic windows 405, for example, via an infrared (IR), and/or radio frequency (RF) signal. In certain embodiments, the controller will include a wireless protocol chip, such as Bluetooth, EnOcean, Wi-Fi, Zigbee, and the like. Window controllers may also have wireless communication via a network. Input to the window controller can be manually input by an end user at a wall switch, either directly or via wireless communication, or the input can be from a BMS of a building of which the electrochromic window is a component.

In one embodiment, when the window controller is part of a distributed network of controllers, wireless communication is used to transfer data to and from each of a plurality of electrochromic windows via the distributed network of controllers, each having wireless communication components. For example, referring again to FIG. 5, master controller 503, communicates wirelessly with each of network controllers 507a and 507b, which in turn communicate wirelessly with end controllers 508, each associated with an electrochromic window. Master controller 503 may also communicate wirelessly with the BMS 505. In one embodiment, at least one level of communication in the window controller is performed wirelessly.

In some embodiments, more than one mode of wireless communication is used in the window controller distributed network. For example, a master window controller may communicate wirelessly to intermediate controllers via Wi-Fi or Zigbee, while the intermediate controllers communicate with end controllers via Bluetooth, Zigbee, EnOcean, or other protocol. In another example, window controllers have redundant wireless communication systems for flexibility in end user choices for wireless communication.

Wireless communication between, for example, master and/or intermediate window controllers and end window controllers offers the advantage of obviating the installation of hard communication lines. This is also true for wireless communication between window controllers and BMS. In one aspect, wireless communication in these roles is useful for data transfer to and from electrochromic windows for operating the window and providing data to, for example, a BMS for optimizing the environment and energy savings in a building. Window location data as well as feedback from sensors are synergized for such optimization. For example, granular level (window-by-window) microclimate information is fed to a BMS in order to optimize the building's various environments.

Figure 6:
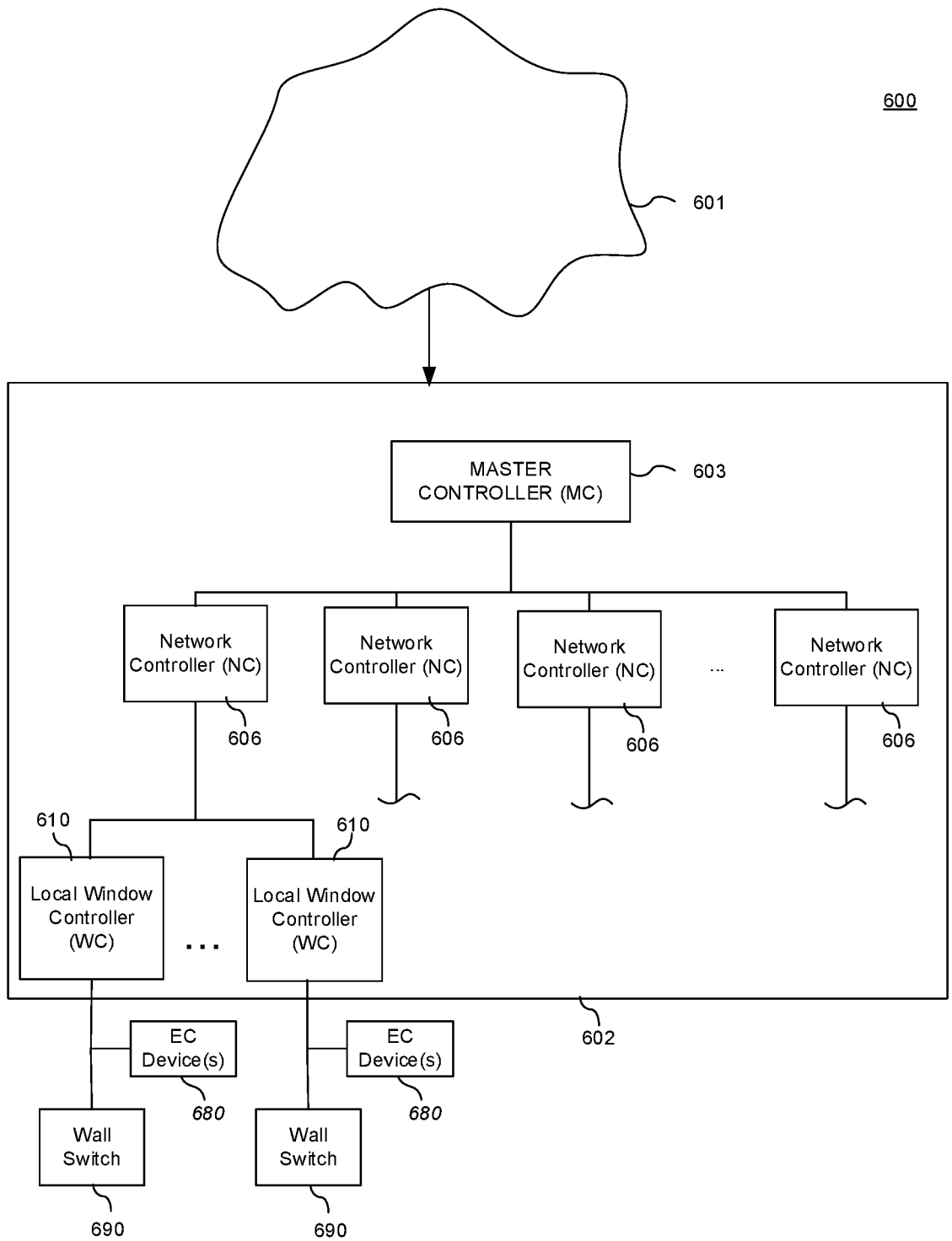
FIG. 6 is a block diagram of components of a system for controlling functions of one or more tintable windows of a building according to certain implementations.

FIG. 6 is a block diagram of components of a system 600 for controlling functions (e.g., transitioning to different tint levels) of one or more tintable windows of a building (e.g., building 501 shown in FIG. 5), according to embodiments. System 600 may be one of the systems managed by a BMS (e.g., BMS 505 shown in FIG. 5) or may operate independently of a BMS.

System 600 includes a window control system 602 having a network of window controllers that can send control signals to the tintable windows to control its functions. System 600 also includes a network 601 in electronic communication with master controller 603. The predictive control logic, other control logic and instructions for controlling functions of the tintable window(s), sensor data, and/or schedule information regarding clear sky models can be communicated to the master controller 603 through the network 601. The network 601 can be a wired or wireless network (e.g. a cloud network). In one embodiment, network 601 may be in communication with a BMS to allow the BMS to send instructions for controlling the tintable window(s) through network 601 to the tintable window(s) in a building.

System 600 also includes EC devices 680 of the tintable windows (not shown) and optional wall switches 690, which are both in electronic communication with master controller 603. In this illustrated example, master controller 603 can send control signals to EC device(s) 680 to control the tint level of the tintable windows having the EC device(s) 680. Each wall switch 690 is also in communication with EC device(s) 680 and master controller 603. An end user (e.g., occupant of a room having the tintable window) can use the wall switch 690 to input an override tint level and other functions of the tintable window having the EC device(s) 680.

In FIG. 6, the window control system 602 is depicted as a distributed network of window controllers including a master controller 603, a plurality of network controllers 606 in communication with the master controller 603, and multiple pluralities of end or leaf window controllers 610. Each plurality of end or leaf window controllers 610 is in communication with a single network controller 606. The components of the system 600 in FIG. 6 may be similar in some respects to components described with respect to FIG. 5. For example, master controller 603 may be similar to master controller 503 and network controllers 606 may be similar to network controllers 507. Each of the window controllers in the distributed network of FIG. 6 may include a processor (e.g., microprocessor) and a computer readable medium in electrical communication with the processor.

In FIG. 6, each leaf or end window controller 610 is in communication with EC device(s) 680 of a single tintable window to control the tint level of that tintable window in the building. In the case of an IGU, the leaf or end window controller 610 may be in communication with EC devices 680 on multiple lites of the IGU to control the tint level of the IGU. In other embodiments, each leaf or end window controller 610 may be in communication with a plurality of tintable windows. The leaf or end window controller 610 may be integrated into the tintable window or may be separate from the tintable window that it controls. Leaf and end window controllers 610 in FIG. 6 may be similar to the end or leaf controllers 508 in FIG. 5 and/or may also be similar to window controller 350 described with respect to FIG. 3.

Signals from the wall switch 690 may override signals from window control system 602 in some cases. In other cases (e.g., high demand cases), control signals from the window control system 602 may override the control signals from wall switch 690. Each wall switch 690 is also in communication with the leaf or end window controller 610 to send information about the control signals (e.g. time, date, tint level requested, etc.) sent from wall switch 690 back to master window controller 603. In some cases, wall switches 690 may be manually operated. In other cases, wall switches 690 may be wirelessly controlled by the end user using a remote device (e.g., cell phone, tablet, etc.) sending wireless communications with the control signals, for example, using infrared (IR), and/or radio frequency (RF) signals. In some cases, wall switches 690 may include a wireless protocol chip, such as Bluetooth, EnOcean, Wi-Fi, Zigbee, and the like. Although wall switches 690 depicted in FIG. 6 are located on the wall(s), other embodiments of system 600 may have switches located elsewhere in the room.

In certain implementations, control logic described herein uses filtered sensor values based on temperature readings from one or more infrared sensors and from ambient temperature sensors to determine a cloud condition in the morning and evening and/or at a time just before sunrise. The one or more infrared sensors operate generally independent of sunlight levels allowing for the tinting control logic to determine a cloud condition before sunrise and as the sun is setting to determine and maintain a proper tint level during the morning and evening. In addition, the filtered sensor values based on the temperatures readings from the one or more infrared sensors can be used to determine a cloud condition even when the visible light photosensors are shaded or otherwise obstructed.

Figure 7:
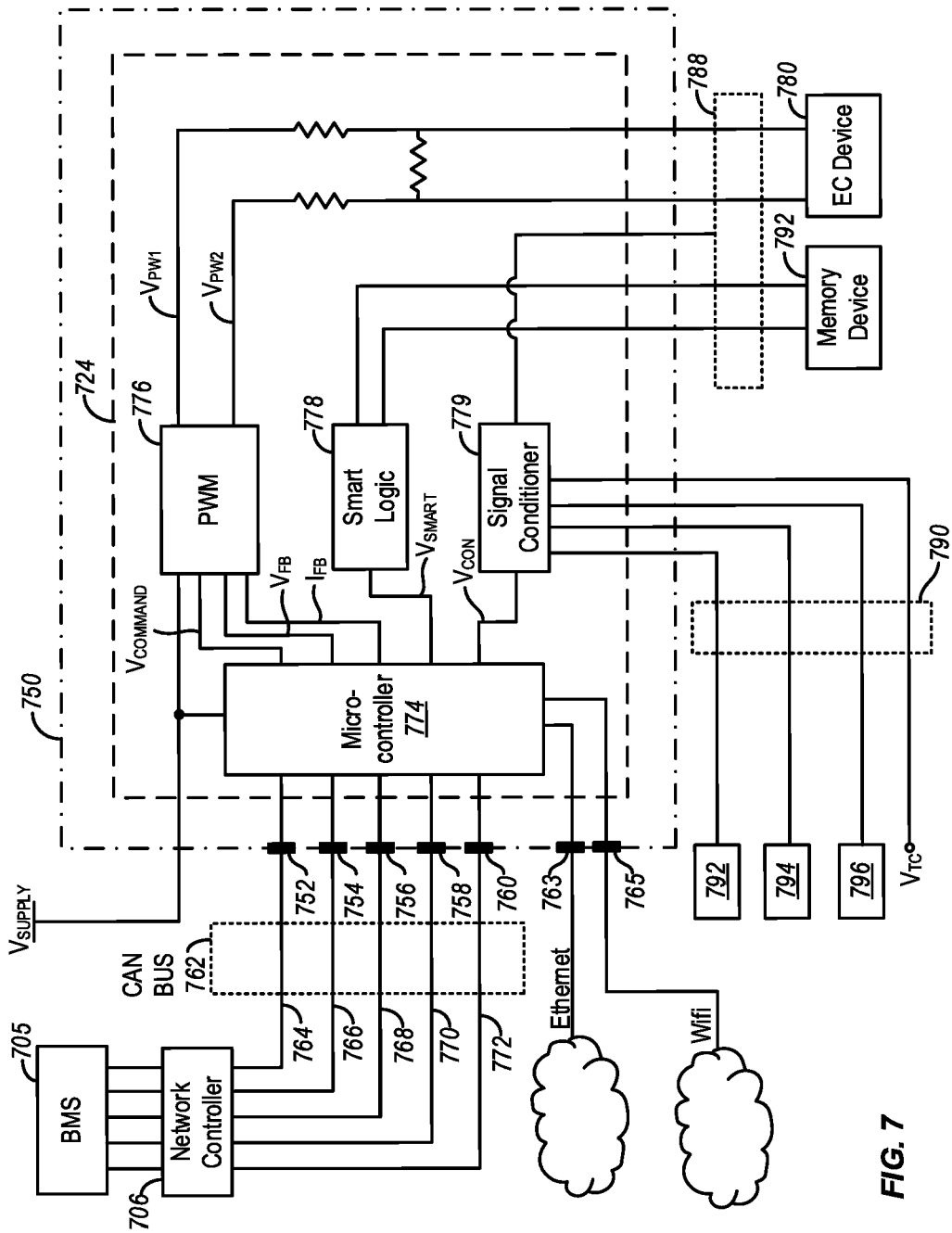
FIG. 7 is a schematic representation of a window controller and associated components.

FIG. 7 is a schematic representation of a window controller and associated components. In the illustrated example, a window controller 724, which may be deployed as, for example, a "pluggable" interface 750 that is readily-removable from EC device 780 (e.g., for ease of maintenance, manufacture, or replacement). In some embodiments, window controller 724 communicates with a network controller over a communication bus 762. For example, communication bus 762 can be designed according to the Controller Area Network (CAN) vehicle bus standard. In such embodiments, first electrical input 752 can be connected to a first power line 764 while second electrical input 754 can be connected to a second power line 766. In some embodiments, as described above, the power signals sent over power lines 764 and 766 are complementary; that is, collectively they represent a differential signal (e.g., a differential voltage signal). In some embodiments, line 768 couples third electrical input 756 to a system or building ground (e.g., an Earth Ground). In such embodiments, communication over CAN bus 762 (e.g., between microcontroller 774 and network controller 706) may proceed along first and second communication lines 770 and 772 transmitted through electrical inputs/outputs 758 and 760, respectively, according to the CANopen communication protocol or other suitable open, proprietary, or overlying communication protocol. In some embodiments, the communication signals sent over communication lines 770 and 772 are complementary; that is, collectively they represent a differential signal (e.g., a differential voltage signal).

In some embodiments, component 750 couples CAN communication bus 762 into window controller 724, and in particular embodiments, into microcontroller 774. In some such embodiments, microcontroller 774 is also configured to implement the CANopen communication protocol. Microcontroller 774 is also designed or configured (e.g., programmed) to implement one or more drive control algorithms in conjunction with pulse-width modulated amplifier or pulse-width modulator (PWM) 776, smart logic 778, and signal conditioner 779. In some embodiments, microcontroller 774 is configured to generate a command signal $V_{COMMAND}$, e.g., in the form of a voltage signal, that is then transmitted to PWM 776. PWM 776, in turn, generates a pulse-width modulated power signal, including first (e.g., positive) component $V_{PW1}$ and second (e.g., negative) component $V_{PW2}$, based on $V_{COMMAND}$. Power signals $V_{PW1}$ and $V_{PW2}$ are then transmitted over, for example, interface 788, to EC device 780 in order to cause the desired optical transitions in electrochromic device 780. In some embodiments, PWM 776 is configured to modify the duty cycle of the pulse-width modulated signals such that the durations of the pulses in signals $V_{PW1}$ and $V_{PW2}$ are not equal: for example, PWM 776 pulses $V_{PW1}$ with a first 60% duty cycle and pulses $V_{PW2}$ for a second 40% duty cycle. The duration of the first duty cycle and the duration of the second duty cycle collectively represent the duration, $t_{PWM}$ of each power cycle. In some embodiments, PWM 776 can additionally or alternatively modify the magnitudes of the signal pulses $V_{PW1}$ and $V_{PW2}$.

In some embodiments, microcontroller 774 is configured to generate $V_{COMMAND}$ based on one or more factors or signals such as, for example, any of the signals received over CAN bus 762 as well as voltage or current feedback signals, $V_{FB}$ and $I_{FB}$ respectively, generated by PWM 776. In some embodiments, microcontroller 774 determines current or voltage levels in the electrochromic device 780 based on feedback signals $I_{FB}$ or $V_{FB}$, respectively, and adjusts $V_{COMMAND}$ according to one or more rules or algorithms to effect a change in the relative pulse durations (e.g., the relative durations of the first and second duty cycles) or amplitudes of power signals $V_{PW1}$ and $V_{PW2}$ to produce voltage profiles as described above. Additionally or alternatively, microcontroller 774 can also adjust $V_{COMMAND}$ in response to signals received from smart logic 778 or signal conditioner 779. For example, a conditioning signal $V_{CON}$ can be generated by signal conditioner 779 in response to feedback from one or more networked or non-networked devices or sensors, such as, for example, an exterior photosensor or photodetector 792, an interior photosensor or photodetector 794, a thermal or temperature sensor 796, or a tint command signal $V_{TC}$. For example, additional embodiments of signal conditioner 779 and $V_{CON}$ are also described in U.S. patent application Ser. No. 13/449,235, filed 17 Apr. 2012, and previously incorporated by reference.

In certain embodiments, $V_{TC}$ can be an analog voltage signal between 0 V and 10 V that can be used or adjusted by users (such as residents or workers) to dynamically adjust the tint of an EC device 780 (for example, a user can use a control in a room or zone of building 501 similarly to a thermostat to finely adjust or modify a tint of the EC devices 780 in the room or zone) thereby introducing a dynamic user input into the logic within microcontroller 774 that determines $V_{COMMAND}$. For example, when set in the 0 to 2.5 V range, $V_{TC}$ can be used to cause a transition to a 5% T state, while when set in the 2.51 to 5 V range, $V_{TC}$ can be used to cause a transition to a 20% T state, and similarly for other ranges such as 5.1 to 7.5 V and 7.51 to 10 V, among other range and voltage examples. In some embodiments, signal conditioner 779 receives the aforementioned signals or other signals over a communication bus or interface 790. In some embodiments, PWM 776 also generates $V_{COMMAND}$ based on a signal $V_{SMART}$ received from smart logic 778. In some embodiments, smart logic 778 transmits $V_{SMART}$ over a communication bus such as, for example, an Inter-Integrated Circuit (I²C) multi-master serial single-ended computer bus. In some other embodiments, smart logic 778 communicates with memory device 282 over a 1-WIRE device communications bus system protocol (by Dallas Semiconductor Corp., of Dallas, Texas).

In some embodiments, microcontroller 774 includes a processor, chip, card, or board, or a combination of these, which includes logic for performing one or more control functions. Power and communication functions of microcontroller 774 may be combined in a single chip, for example, a programmable logic device (PLD) chip or field programmable gate array (FPGA), or similar logic. Such integrated circuits can combine logic, control and power functions in a single programmable chip.

In some embodiments, microcontroller 774 may be communicatively coupled with a private or public network including for example the Internet. In the illustrated example microcontroller 774 includes inputs/outputs 763 and 765, which may provide, respectively, an ethernet and a Wi-Fi interface with such a cloud network.

In general, the logic used to control electrochromic device transitions can be designed or configured in hardware and/or software. In other words, the instructions for controlling the drive circuitry may be hard coded or provided as software. In may be said that the instructions are provided by "programming". Such programming is understood to include logic of any form including hard coded logic in digital signal processors and other devices which have specific algorithms implemented as hardware. Programming is also understood to include software or firmware instructions that may be executed on a general purpose processor. In some embodiments, instructions for controlling application of voltage to the bus bars are stored on a memory device associated with the controller or are provided over a network. Examples of suitable memory devices include semiconductor memory, magnetic memory, optical memory, and the like. The computer program code for controlling the applied voltage can be written in any conventional computer readable programming language such as assembly language, C, C++, Pascal, Fortran, and the like. Compiled object code or script is executed by the processor to perform the tasks identified in the program.

As described above, in some embodiments, microcontroller 774, or window controller 724 generally, also can have wireless capabilities, such as wireless control and powering capabilities. For example, wireless control signals, such as radio-frequency (RF) signals or infra-red (IR) signals can be used, as well as wireless communication protocols such as Wi-Fi (mentioned above), Bluetooth, Zigbee, EnOcean, among others, to send instructions to the microcontroller 774 and for microcontroller 774 to send data out to, for example, other window controllers, a network controller 706, or directly to a BMS 705. In various embodiments, wireless communication can be used for at least one of programming or operating the electrochromic device 780, collecting data or receiving input from the electrochromic device 780, collecting data or receiving input from sensors, as well as using the window controller 724 as a relay point for other wireless communications. Data collected from EC device 780 also can include count data, such as a number of times the EC device 780 has been activated (cycled), an efficiency of the EC device 780 over time, among other useful data or performance metrics.

The window controller 724 also can have wireless power capability. For example, window controller can have one or more wireless power receivers that receive transmissions from one or more wireless power transmitters as well as one or more wireless power transmitters that transmit power transmissions enabling window controller 724 to receive power wirelessly and to distribute power wirelessly to electrochromic device 780. Wireless power transmission includes, for example, induction, resonance induction, RF power transfer, microwave power transfer, and laser power transfer. For example, U.S. patent application Ser. No. 12/971,576 naming Rozbicki as inventor, titled WIRELESS POWERED ELECTROCHROMIC WINDOWS and filed 17 Dec. 2010, incorporated by reference herein in its entirety, describes in detail various embodiments of wireless power capabilities.

In some embodiments cloud-based techniques for monitoring and managing a plurality of sites incorporating optically switchable electrochromic devices is contemplated. "Cloud-based", as the term is used herein and in the claims, means that at least some of the computing and/or data storage resources used in the disclosed techniques reside in one or more remote servers, as opposed to one or more of the sites being monitored. In some embodiments, a web application programming interface (API) with which a local network of electrochromic devices is disposed at a building site may interface with a cloud-based site monitoring system and/or a cloud-based master network controller. Using the API, health and status of the electrochromic devices and associated local network devices may be monitored and controlled. For example, a remote determination of desired CAN bus control settings may be made and transmitted by way of HTTP over the Internet to the API.

Figure 8:
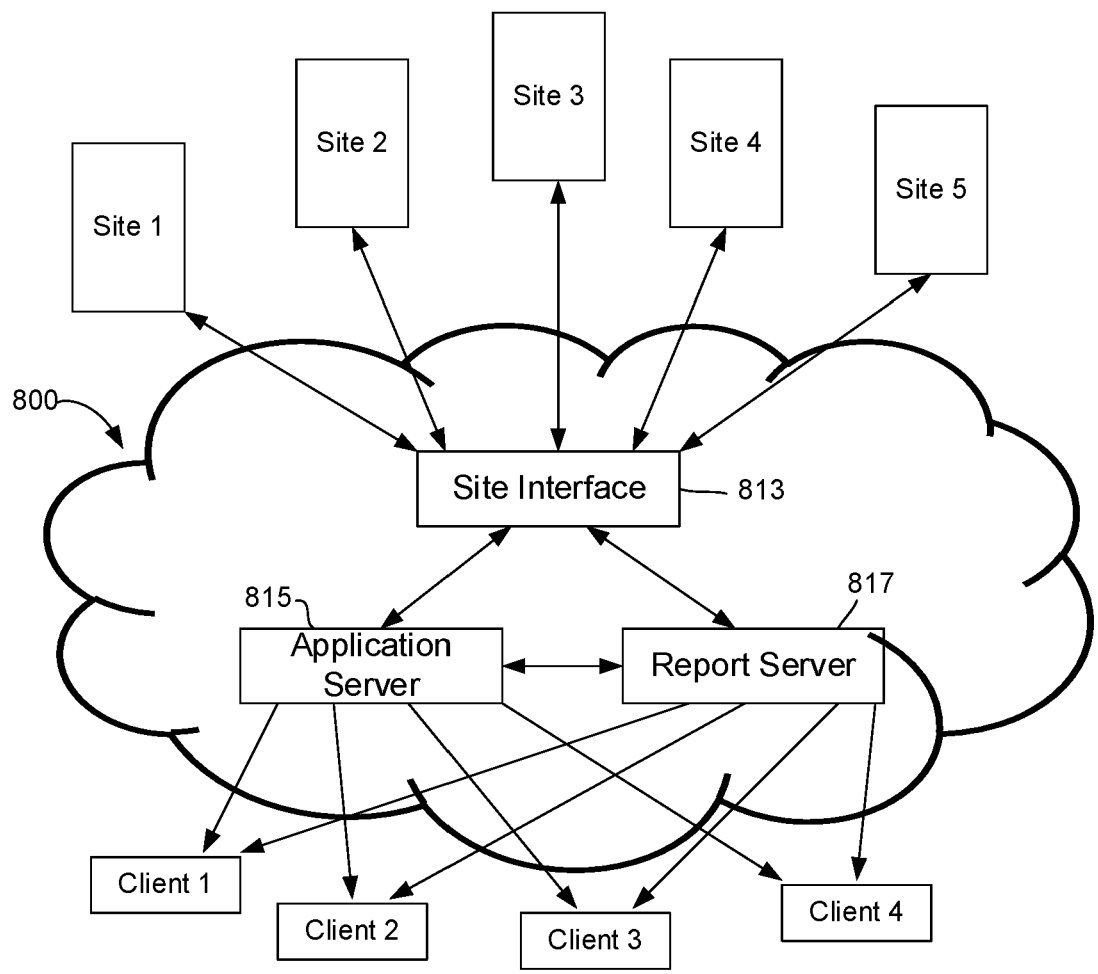
FIG. 8 illustrates an example of a site monitoring and control system, according to an embodiment.

FIG. 8 illustrates an example of a site monitoring and control system, according to an embodiment. In the illustrated example, a site monitoring and control system 800 interfaces with multiple monitored sites—sites 1-5. Each site has one or more switchable optical devices such as electrochromic windows and one or more controllers designed or configured to control switching of the windows. The site monitoring and control system 800 also interfaces with multiple client machines—clients 1-4. The clients may be workstations, portable computers, mobile devices such as smartphones, and the like, each able to present information about the functioning of devices in the sites. Personnel associated with site monitoring and control system 800 may access this information from one or more of the clients. In some instances, the clients are configured to communicate with one another. In some implementations, personnel associated with one or more sites may access a subset of the information via a client. In various implementations, the client machines run one or more applications designed or configured to present views and analysis of the optical device information for some or all of the sites.

The site monitoring and control system 800 may contain various hardware and/or software configurations. In the depicted embodiment, the system 800 includes a site interface 813, an application server 815, and a report server 817.

The site interface 813 may communicate directly with the sites and may include a data warehouse for storing data received from the sites. For example, data from the sites may be stored in a relational database or other data storage arrangement. In one embodiment, the data is stored in a database or other data repository such as an Oracle DB, a Sequel DB, or a custom designed database. The site interface 813 may obtain information from and send commands to any of a number of entities such as master network controllers at the sites. Application server 815 and report server 817 interface with the clients to provide application services and reports, respectively. In one embodiment, the report server runs Tableau, Jump, Actuate, or a custom designed report generator. In the depicted embodiment, the site interface 813 and the application server 815 each provide information to the report server 817. Communication between the site interface 813 and the application server 815 is bidirectional, as is communication between the site interface 813 and the report server 817 as well as the application server 815 and the report server 817.

As described above, a site may include (a) multiple switchable optical devices (e.g., a plurality of switchable optical devices), each directly controlled by a (window) controller, (b) multiple sensors such as illumination sensors, and (c) one or more higher level controllers such as network controllers and master network controllers. In some implementations, some or all functionality of the higher level controllers (e.g., master controller 503 of FIG. 5) is provided by the site monitoring and control system 800. As a result, an on-site master controller may be greatly simplified or even eliminated.

In some embodiments, a site monitoring and control system may comprise a hierarchy of controllers. FIG. 6 shows an example of a hierarchy of controllers that includes three hierarchy levels in which (1) a lower most level comprising one or more local window controllers (e.g., 601), (2) an intermediate level comprising one or more network controllers (e.g., 606), and (3) a highest level comprising a master controller 603. The hierarchy may comprise two or more levels. The hierarchy may include a master controller, a facility controller, a building controller, a floor controller, and/or a local controller. The local controller can be coupled (e.g., directly) to one or more devices. For example, the local controller can be coupled to (e.g., and control) at least 1, 2, 3, 4, 5, 6, 7, 8, 12, 24, or 48 devices. The local controller can be coupled to (e.g., and control) any number of devices between the aforementioned numbers (e.g., from 1 to 48, from 1 to 8, from 1 to 12, or from 1 to 24, devices). The coupling may comprise communication coupling. The coupling may be wired and/or wireless coupling. The coupling may comprise optical coupling or electrical coupling. The wireless coupling may comprise usage of one or more antennas. The wireless coupling may comprise transmission of optical or audio signals. The optical coupling may comprise infrared radiation. The network controller may be a floor and/or building controller.

In some embodiments, a hierarchy level of the monitoring and control system comprises a physical circuitry. The physical circuitry may comprise a controller. The physical circuitry may include a processor. The physical circuitry may include a circuit board. The circuitry may be sophisticated (e.g., a computer), or less sophisticated (e.g., a controllable switch). The controllable switch may communicatively controlled (e.g., signal controlled). The controllable switch can be controlled by a signal transmitted through the wiring network (e.g., an electrical, audio, and/or optical signal). The communicatively controllable switch may be different from a wall switch (e.g., 690). The communicatively controllable switch may be different from a manual switch. Circuitry of a higher hierarchal level may comprise a more sophisticated circuitry than that of a lower hierarchal level. For example, the master controller may comprise a computer, while the local controller may be a switch. The sophistication of the circuitry of at least one higher level in the hierarchy, may be higher than the lowest hierarchy level (e.g., comprising the local controller(s)). In some embodiments, the sophistication of the circuitry may be respective of the hierarchy level, with the highest hierarchy (e.g., including the master controller) having the highest circuitry sophistication, and the lowers hierarchy (e.g., including the local controller) having the lowest circuitry sophistication. The physical circuitry may include a memory and/or data storage unit. The memory can hold more or less data. Memory coupled to a higher hierarchal level circuitry may occupy more data than that of a lower hierarchal level. For example, the master controller may retain more data in its memory, than the memory of a local controller. The memory coupled to (e.g., that is part of) the circuitry of at least one higher level in the hierarchy, may retain more data than the lowest hierarchy level (e.g., comprising the local controller(s)). In some embodiments, the amount of data retained by a memory coupled to the (e.g., as part of) the circuitry, may be respective of the hierarchy level, with the highest hierarchy (e.g., including the master controller) having the highest memory capacity, and the lowers hierarchy (e.g., including the local controller) having the lowest memory capacity. The data storage unit can hold more or less data. Data storage unit coupled to a higher hierarchal level circuitry may occupy more data than that of a lower hierarchal level. For example, the master controller may retain more data in its data storage unit, than the data storage unit of a local controller. The data storage unit coupled to (e.g., that is part of) the circuitry of at least one higher level in the hierarchy, may retain more data than the lowest hierarchy level (e.g., comprising the local controller(s)). In some embodiments, the amount of data retained by a data storage unit coupled to the (e.g., as part of) the circuitry, may be respective of the hierarchy level, with the highest hierarchy (e.g., including the master controller) having the highest data storage capacity, and the lowers hierarchy (e.g., including the local controller) having the lowest data storage capacity.

In some embodiments, a site monitoring and control system may comprise a hierarchy of controllers controlling one or more devices. The devices may be disposed in a facility. The facility can include one or more buildings. The site monitoring and control system may include, or may be coupled to, a communication network and/or a power network. The communication and/or power network may comprise one or more wires. The wires may comprise optical or electrical wires. The wires may comprise coaxial or twisted wires. The communicating network may comprise an antenna (e.g., a receiving antenna and/or a transmitting antenna), a transmitter, a transceiver, a receiver, or a router. The network may include, or may be coupled to, a building management system.

In some embodiments, at least one controller (e.g., comprising circuitry) associated with at least one level of the hierarchy may be disposed outside of a facility. For example, controllers associated with a plurality of hierarchal levels of control may be disposed (e.g., physically located) outside of a facility. For example, controllers associated with one or more higher hierarchal levels of control may be disposed (e.g., physically located) outside of a facility. For example, (e.g., only) one or more controllers associated with the lowest level of control may be disposed in the facility. For example, one or more controllers associated with (e.g., only) the lowest level of control may be physically located in the facility. For example, controller(s) associated with only a single level of the hierarchy levels, are physically located in the facility. For example, controller(s) associated with (e.g., only) the lowest level amongst the hierarchy levels, are physically located in the facility. For example, (e.g., only) controller(s) having the lowest level of (i) circuitry sophistication, (ii) logic sophistication, (iii) memory capacity, and/or (iv) data storage capacity, are physically located in the facility. For example, (e.g., only) controller(s) having the lowest subordination level, are physically located in the facility. For example, (e.g., only) controller(s) that are directly coupled to one or more devices that they control, are physically located in the facility. In some embodiments, when a first controller is directly coupled to a device, there is no intervening second controller between the first controller and the device. In some embodiments, when a first controller is directly coupled to a device, there is no other circuitry intervening between the first controller and the device. The circuitry can be an electronic and/or optical circuitry (e.g., including one or more optical fibers).

In some embodiments, logic associated with at least one level of the hierarchy may be disposed outside of a facility. The logic may be embedded in at least non-transitory medium that is readable by a circuitry (e.g., a processor such as a computer). The logic may be in the form a code (e.g., ASCII, Java, C++ or Python). For example, logic associated with a plurality of hierarchal levels of control may be embedded in a non-transitory media located outside of a facility. For example, logic associated with one or more higher hierarchal levels of control may embedded in a non-transitory media located (e.g., physically disposed) outside of a facility. For example, one or more logics associated with (e.g., only) the lowest level of control may be embedded in a non-transitory media located disposed in the facility. For example, one or more logics associated with (e.g., only) the lowest level of control may be embedded in a non-transitory media physically located in the facility. For example, all logic(s) associated with the hierarchy of control may be embedded in a non-transitory media physically located outside of the facility. The logic(s) associated with (e.g., only) the hierarchy of control may be embedded in a non-transitory media physically located outside of the facility, and transmitted (e.g., via one or more network systems) to the facility. Transmission may be via signaling (e.g., optical, acoustic, and/or electrical signaling). Transmission may be to a circuitry (e.g., of a local controller). The logic may be ready by the circuitry of the hierarchy of controllers (e.g., any circuitry thereof).

In some embodiments, a plurality of devices may be operatively (e.g., communicatively) coupled to the control system. The control system may comprise the hierarchy of controllers. The devices may comprise an emitter, a sensor, or a window (e.g., IGU). The device may be any device as disclosed herein. At least two of the plurality of devices may be of the same type. For example, two or more IGUs may be coupled to the control system. At least two of the plurality of devices may be of different types. For example, a sensor and an emitter may be coupled to the control system. At times the plurality of devices may comprise at least 20, 50, 100, 500, 1000, 2500, 5000, 7500, 10000, 50000, 100000, or 500000 devices. The plurality of devices may be of any number between the aforementioned numbers (e.g., from 20 devices to 500000 devices, from 20 devices to 50 devices, from 50 devices to 500 devices, from 500 devices to 2500 devices, from 1000 devices to 5000 devices, from 5000 devices to 10000 devices, from 10000 devices to 100000 devices, or from 100000 devices to 500000 devices). For example, the number of windows in a floor may be at least 5, 10, 15, 20, 25, 30, 40, or 50. The number of windows in a floor can be any number between the aforementioned numbers (e.g., from 5 to 50, from 5 to 25, or from 25 to 50). At times the devices may be in a multi-story building. At least a portion of the floors of the multi-story building may have devices controlled by the control system (e.g., at least a portion of the floors of the multi-story building may be controlled by the control system). For example, the multi-story building may have at least 2, 8, 10, 25, 50, 80, 100, 120, 140, or 160 floors that are controlled by the control system. The number of floors (e.g., devices therein) controlled by the control system may be any number between the aforementioned numbers (e.g., from 2 to 50, from 25 to 100, or from 80 to 160). The floor may be of an area of at least about 150 m$^2$, 250 m$^2$, 500 m$^2$, 1000 m$^2$, 1500 m$^2$, or 2000 square meters (m$^2$). The floor may have an area between any of the aforementioned floor area values (e.g., from about 150 m$^2$ to about 2000 m$^2$, from about 150 m$^2$ to about 500 m$^2$, from about 250 m$^2$ to about 1000 m$^2$, or from about 1000 m$^2$ to about 2000 m$^2$).

In some embodiments, the controller comprises circuitry. The controller may be an automatic controller. The controller may be programmable. The controller may comprise programmable circuitry. The controller may comprise a programmable logic device (PLD). The programmable logic device may comprise complex programmable logic device, field programmable gate array, generic array logic, programmable array logic, or programmable logic array. The controller may comprise a proportional, integral and derivative controller. The controller may comprise a microcontroller. The controller may comprise a switch (e.g., an electrical and/or optical switch), a capacitor, a resistor, or an actuator. The controller may comprise a signal booster.

In some embodiments, the hierarchy of controllers may be configured to control one or more devices. A device of the one or more devices may include a window, sensor, actuator, emitter, antenna, and/or receiver. The emitter may include a buzzer, a light, heater, cooler, and/or a heating cooling ventilation and air conditioning system (HVAC). The sensor may be configured to process, measure, analyze, detect and/or react to one or more of: data, temperature, humidity, sound, force, pressure, electromagnetic waves, position, distance, movement, flow, acceleration, speed, vibration, dust, light, glare, color, gas(es), and/or other aspects (e.g., characteristics) of an environment (e.g., of an enclosure). The enclosure may be of the facility. The gases may include volatile organic compounds (VOCs). The gases may include carbon monoxide, carbon dioxide, water vapor (e.g., humidity), oxygen, radon, and/or hydrogen sulfide. The window may be a tintable window (e.g., an electrically tintable window such as an electrochromic window).

In some embodiments, a controller may comprise a processing unit (e.g., CPU or GPU). A controller may receive an input (e.g., from at least one sensor). The controller may comprise circuitry, electrical wiring, optical wiring, socket, and/or outlet. A controller may deliver an output. A controller may comprise multiple (e.g., sub-) controllers. The controller may be a part of a control system (e.g., hierarchy of controllers). A control system may comprise a master controller, floor (e.g., comprising network controller) controller, a local controller. The local controller may be a window controller (e.g., controlling an optically switchable window), enclosure controller, or component controller. For example, a controller may be a part of a hierarchal control system (e.g., comprising a main controller that directs one or more controllers, e.g., floor controllers, local controllers (e.g., window controllers), enclosure controllers, and/or component controllers). A controller may control one or more devices (e.g., be directly coupled to the devices). A controller may be disposed proximal to the one or more devices it is controlling. For example, a controller may control an optically switchable device (e.g., IGU), an antenna, a sensor, and/or an output device (e.g., a light source, sounds source, smell source, gas source, HVAC outlet, or heater). In one embodiment, a floor controller may direct one or more window controllers, one or more enclosure controllers, one or more component controllers, or any combination thereof. The floor (e.g., comprising network) controller may control a plurality of local (e.g., comprising window) controllers. A plurality of local controllers may be disposed in a portion of a facility (e.g., in a portion of a building). The portion of the facility may be a floor of a facility. For example, a floor controller may be assigned to a floor. In some embodiments, a floor may comprise a plurality of floor controllers, e.g., depending on the floor size and/or the number of local controllers coupled to the floor controller. For example, a floor controller may be assigned to a portion of a floor. For example, a floor controller may be assigned to a portion of the local controllers disposed in the facility. For example, a floor controller may be assigned to a portion of the floors of a facility. A master controller may be coupled to one or more floor controllers. The floor controller may be disposed in the facility. The master controller may be disposed in the facility, or external to the facility. In some embodiments, the controller is a part of, or is operatively coupled to, a building management system.

In some embodiments, a controller receives one or more inputs and/or generate one or more outputs. The controller may be a single input single output controller (SISO) or a multiple input multiple output controller (MIMO). A controller may interpret an input signal received. A controller may acquire data from the one or more components (e.g., sensors). Acquire may comprise receive or extract. The data may comprise measurement, estimation, determination, generation, or any combination thereof. A controller may comprise feedback control. A controller may comprise feed-forward control. Control may comprise on-off control, proportional control, proportional-integral (PI) control, or proportional-integral-derivative (PID) control. Control may comprise open loop control, or closed loop control. A controller may comprise closed loop control. A controller may comprise open loop control. A controller may comprise a user interface. A user interface may comprise (or operatively coupled to) a keyboard, keypad, mouse, touch screen, microphone, speech recognition package, camera, imaging system, or any combination thereof. Outputs may include a display (e.g., screen), speaker, or printer. In some embodiments, a local controller controls one or more IGUs, one or more sensors, one or more output devices (e.g., one or more emitters), or any combination thereof. A controller may be operatively coupled (e.g., directly/indirectly and/or wired and/or wirelessly) to an external source. The external source may comprise a network (e.g., electrical grid and/or communication network). The external source may comprise one or more sensor or output device. The external source may comprise a cloud-based application and/or database. The communication may be wired and/or wireless. The external source may be disposed external to the facility. For example, the external source may comprise one or more sensors and/or antennas disposed, e.g., on a wall or on a ceiling of the facility. The communication may be monodirectional or bidirectional.

The methods, systems and/or the apparatus described herein may comprise a control system. The control system can be in communication with any of the apparatuses (e.g., sensors, emitters, receivers, antennas, or windows) described herein. The apparatuses (e.g., devices) may include at least two of the same type and/or at least two of different types, e.g., as described herein. For example, the control system may be in communication with the first device and/or with the second device. The control system may control the one or more devices. The control system may control one or more components of a building management system (e.g., lightening, security, and/or air conditioning system). The controller may regulate at least one (e.g., environmental) characteristic of the enclosure. The control system may regulate the enclosure environment using any devices, e.g., as disclosed herein. The control can include manual and/or automatic control. The control system may regulate the enclosure environment using any component of the building management system. For example, the control system may regulate the energy supplied by a heating element and/or by a cooling element. For example, the control system may regulate velocity of an air flowing through a vent to and/or from the enclosure. The control system may comprise a processor. The processor may be a processing unit. The controller may comprise a processing unit. The processing unit may be central. The processing unit may comprise a central processing unit (abbreviated herein as "CPU"). The processing unit may be a graphic processing unit (abbreviated herein as "GPU"). The controller(s) or control mechanisms (e.g., comprising a computer system) may be programmed to implement one or more methods of the disclosure. The processor may be programmed to implement methods of the disclosure. The controller may control at least one component of the forming systems and/or apparatuses disclosed herein.

In some embodiments, the control system includes a computer system. The computer system can control (e.g., direct, monitor, and/or regulate) various features of the methods, apparatuses and systems of the present disclosure, such as, for example, control heating, cooling, lightening, venting, or any combination thereof. The computer system can be part of, or be in communication with, any device disclosed herein. The computer may be coupled to one or more mechanisms disclosed herein, and/or any parts thereof. For example, the computer may be coupled to one or more sensors, valves, switches, lights, windows (e.g., IGUs), motors, pumps, optical components, or any combination thereof.

The computer system can include a processing unit (also "processor," "computer" and "computer processor" used herein). The computer system may include memory or memory location (e.g., random-access memory, read-only memory, flash memory), electronic storage unit (e.g., hard disk), communication interface (e.g., network adapter) for communicating with one or more other systems, and peripheral devices, such as cache, other memory, data storage and/or electronic display adapters. In some embodiments, the memory, storage unit, interface, and/or peripheral devices are in communication with the processing unit, e.g., through a communication bus (solid lines), such as a motherboard. The storage unit can be a data storage unit (or data repository) for storing data. The data storage unit may be a memory. The computer system can be operatively coupled to a computer network ("network"), e.g., with the aid of the communication interface. The network can include the Internet, an internet and/or extranet, or an intranet and/or extranet that is in communication with the Internet. In some cases, the network includes a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processing unit can execute a sequence of machine-readable instructions, which can be embodied in a program or software. The instructions may be stored in a memory location, such as a memory. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the computer system can be included in the circuit.

The storage unit can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet.

The computer system can communicate with one or more remote computer systems through a network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. A user (e.g., client) can access the computer system via the network.

Methods as described herein can be implemented by way of machine (e.g., computer processor) executable code stored on an electronic storage location of the computer system, such as, for example, on the memory or electronic storage unit. The machine executable or machine-readable code can be provided in the form of software. During use, the processor can execute the code. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processer adapted to execute the code or can be compiled during runtime. The code can be supplied in a programming language that can be selected to enable the code to execute in a pre-compiled or as-compiled fashion.

In some embodiments, the processor comprises a logic (e.g., in the form of a code). The code can be program instructions. The program instructions may cause the at least one processor (e.g., computer) to direct a feed forward and/or feedback control loop. In some embodiments, the program instructions cause the at least one processor to direct a closed loop and/or open loop control scheme. The control may be based at least in part on one or more sensor readings (e.g., sensor data). One controller may direct a plurality of operations. At least two operations may be directed by different controllers. In some embodiments, a different controller may direct at least two of operations (a), (b) and (c). In some embodiments, different controllers may direct at least two of operations (a), (b) and (c). In some embodiments, a non-transitory computer-readable medium cause each a different computer to direct at least two of operations (a), (b) and (c). In some embodiments, different non-transitory computer-readable mediums cause each a different computer to direct at least two of operations (a), (b) and (c). The controller and/or computer readable media may direct any of the apparatuses or components thereof disclosed herein. The controller and/or computer readable media may direct any operations of the methods disclosed herein.

The site monitoring system may include one or more interfaces for communicating with the remote sites. These interfaces are typically ports or connections for securely communicating over the internet. Of course, other forms of network interfaces may be used. The data may be compressed before sending from a site to the site monitoring system. The site monitoring system may interface with the individual sites via a wireless connection or cable connection. In the example embodiment illustrated in FIG. 8, the site monitoring and control system 800 is implemented in the "cloud". A site monitoring system can be centralized or distributed and can be accessed from anywhere using client application by authorized personnel. The various components of the system may be located together or apart in one or more sites, a location remote from all sites and/or in the cloud. Additional features, functions, modules, etc. of the site monitoring system may include a data and event reporter, a data and event log and/or a database, data analyzer/reporter, and communicator.

While in many embodiments, all or most of the site data analysis may be performed at the site monitoring and control system 800, this is not always the case. In some implementations, some site level analytics, data compression, etc. is performed at the remote site prior to sending site data to the site monitoring system. For example, a network or master network controller may have sufficient processing power and other resources for conducting analytics, data compression, etc. and thus processing may be distributed to take advantage of this. This distribution of processing power may not be static, that is, depending on what functions are being performed, the site monitoring and control system 800 may draw on remote processors for performing the aforementioned tasks, or not. Thus, the site monitoring and control system 800 may be configured with the flexibility of using remote processors at the site or not.

Through monitoring of the sensors and controllers at the various installations, the site monitoring and control system 800 can provide any one or more of the following services:

a. Customer service—the site monitoring and control system 800 may note when data from a switchable device, a sensor, and/or a controller indicates a problem. The problem may be immediate, such as a malfunction, or an impending problem can be anticipated, e.g. when a component's performance drifts from specified parameters (while still functioning adequately). In response, service personnel may visit the remote location to correct the problem and/or communicate to the remote location, installation that there is a problem. In the latter scenario, service personnel may, e.g., reprogram the switchable device's controller to compensate for a drift from specification. In some instances, potential issues are flagged and resolved before they become apparent at a site. For example, the aforementioned reprogramming may provide adequate performance from the window permanently or provide adequate performance until a field service person can visit the site and replace or repair the unit. Additionally, the monitoring system may be configured to autocorrect problems with sites. Unless stated otherwise, any of the problems, issues, errors, etc. described herein can be autocorrected using heuristics in the site monitoring system. In one example, the monitoring system detects a drift from specification in an electrochromic window and automatically reprograms the window's controller(s) to compensate for the drift. The system also alerts service personnel as to this event. The service personnel can then decide the best course of action, e.g., further reprogramming, replacing the window, replacing the controller, and the like. The occupant may have no indication that anything has gone awry with the window and/or controller, the occupant's perception of the window's performance may be unchanged throughout these. This system enables quick resolution of problems. For example, a dashboard interface may provide the ability to drill down into issues from a high level summary. From the high level summary, the system may provide easy access to site-specific context based log file sections, schematics, pictures and reports. In some implementations, the system flags an entire site when one or more problems with the site are identified. In this way, persons interacting with the system need not be exposed to minutiae concerning the issue until they want such information. Thus, e.g., service personnel can quickly choose a flagged site, and drill down to the actual problem, which may be e.g. a single window with a non-critical issue. This allows the service personal to (a) quickly determine where problems arise, (b) quickly determine the nature of the problem at each site, and (c) prioritize any problems effectively. The system may also provide look-ahead data to a site's other systems such as HVAC systems, thereby enabling such systems to enhance user comfort and/or save energy.

b. Customize the installation based on observed usage trends. User preferences may be incorporated in a program over time. As an example, the site monitoring system may determine how an end user (e.g. occupant) tries to override a window control algorithm at particular times of day and uses this information to predict future behavior of the user. It may modify the window control algorithm to set tint levels according to the learned user preference.

c. Deploy learned approaches to other installations (e.g., how to best tint windows when an afternoon thunderstorm approaches). There are benefits achieved in using the collective experience and information from an installed base of switchable device networks. For example, it helps to fine tune control algorithms, customize window/network products for a particular market segment, and/or test new ideas (e.g., control algorithms, sensor placement).

The following description presents examples of some types of site information that may be monitored by a site monitoring system. The information may be provided from various sources such as voltage and/or current versus time data for individual switchable devices, sensor output version time, communications and network events and logs for controller networks, etc. The time variable may be associated with external events such as solar position, weather, etc. Information with a periodic component may be analyzed in the frequency domain as well as the time domain.

For example, the following information may be derived from window controllers current/voltage data:

a. Changes in peak current [this is sometimes produced during application of a ramp to drive voltage for producing an optical transition.]

b. Changes in hold (leakage) current [this may be observed at an end state of a switchable device. A rate of increasing leakage current may correlate with the likelihood that a short has developed in the device. Sometimes a short causes an undesirable blemish such as a halo in the device. These may be field serviceable using, e.g., a portable defect mitigation apparatus such as described in U.S. patent application Ser. No. 13/859, 623, filed Apr. 9, 2013, which is incorporated herein by reference in its entirety.]

c. Change in voltage compensation required [Voltage compensation is the change in voltage required to account for the voltage drop in the conductive path from the power supply to the switchable device.]

d. Change in total charge transferred [measured over a period of time and/or during a certain state of the switchable device (e.g., during drive or during hold).]

e. Change in power consumption [Power consumption may be calculated by (I*V) per window or controller.]

f. Comparison with other WC (window controllers) on the same façade with identical loads [This allows the monitoring system to determine that a particular controller has an issue, rather than a particular device controlled by the controller. For example, a window controller may be connected to five insulated glass units, each exhibiting the same issue. Because it is unlikely that five devices will all suffer from the same issue, the monitoring system may conclude that the controller is to blame.]

g. Instances of abnormal profiles: e.g., double tinting/double clearing [Double tinting/clearing refers to a situation where a normal drive cycle (voltage and/or current profile) is applied and it is found that the switchable device has not switched, in which case a second drive cycle must be conducted.]

h. Switching characteristics vs. external weather [At certain temperatures or weather conditions, the monitoring system expects particular switching results or performance. Deviations from the expected response suggests an issue with a controller, a switchable device, and/or a sensor.]

The changes and comparisons described here can be produced from data collected at, e.g., the network controller level. Historical data (days, weeks, months, years) is preserved in the site monitoring system, and such data can be used for comparison. With such data, variations due to temperature can be identified and ignored, if appropriate. The various changes, along or in combination, may provide a signature of a problem in a window, a controller, a sensor, etc. Any one or more of the foregoing parameters may identify an increase in impedance at any position from the power supply to (and including) the switchable device. This path may include the switchable device, a bus bar connected to the device, a lead attach to the bus bar, a connector to the lead attach or IGU, a group of wires (sometimes called a "pigtail") between the connector (or IGU) and the power supply. As an example, a change in any or more of parameters 1a-1e may indicate corrosion caused by water in a window frame. A model using a combination of these parameters may recognize the signature of such corrosion and accurately report this issue remotely.

As a further example, the following information may be derived from window controller state and zone state changes:
  a. Any window controller getting out of sync with its zone—for example, this may be due to communication issues [Example: If there are multiple controllers in a zone of a site, and one of these controllers does behave as expected, the site monitoring system may conclude that the aberrant controller is not receiving or following commands over a communications network. The site monitoring system can take action to isolate the source of the problem and correct it.]
  b. Longest switching time for the zone and adjustments to make all glass switch at the same rate [The site monitoring system may identify a particular switchable device that is not switching at a desired rate or an expected rate. Without replacing or modifying the device, the monitoring site may modify the switching algorithm so that the device switches at the expected rate. For example, if a device is observed to switch too slowly, its ramp to drive or drive voltage may be increased. This can be done remotely, and automatically in certain embodiments.]

As a yet further example, the following information may be derived from system logs:
  a. Any change in frequency of communication errors-increase in noise or device degradation [The received communications from a controller may be slowed or stopped. Or, the send communications may not be acknowledged or acted upon.]
  b. Connection degradation if a pigtail (or other connection) starts showing up as disconnected [In certain embodiments, a connector, e.g., including a memory and/or logic, provides a signal indicating that it is becoming disconnected. A window controller may receive such signals, which can be logged at the remote site monitoring system. A further description pigtails and other electrical connection features is presented in U.S. patent application Ser. No. 14/363,769, filed Jun. 6, 2014, which is incorporated herein by reference in its entirety.]

As yet another example, the following information may be derived from system photosensor data:
  a. Any degradation over time [This may be manifest as a signal magnitude reduction. It may be caused by various factors including damage to the sensor, dirt on the sensor, an obstruction appearing in front of the sensor, etc.]
  b. Correlation with external weather [Normally, the site monitoring system will assume that the photosensor output should correlate with the weather.]
  c. Comparison with zone state change to ensure that a site's window control technology is working correctly [The site monitoring system normally expects that the zone will change state when its photosensor output meets certain state-change criteria. For example, if the sensor indicates a transition to sunny conditions, the switchable devices in the zone should tint. In certain embodiments, there are one or more photosensors per zone.

d. Any changes in surroundings after commissioning [As an example, a tree grows in front of one or more sensors, a building is constructed in front of one or more sensors or a construction scaffold is erected in front of one or more sensors. Such changes in surroundings may be evidenced by multiple sensors affected by the changes being similarly affected (e.g., their photosensor outputs go down at the same time). Among other purposes, commissioning serves to provide information about the deployment of sensors, controllers, and/or switchable optical devices in a site. Commissioning is further described in PCT Application No. PCT/US2013/036456, filed Apr. 12, 2013, which is incorporated herein by reference in its entirety.]

As another example, the following information may be derived from log file analysis of driver of state changes:
  a. Overrides by zone-further tuning of control algorithms for the zone [The site monitoring system may learn the requirements of a particular site and adapt its learning algorithm to address the requirements. Various types of adaptive learning are described in PCT Application No. PCT/US2013/036456, filed Apr. 12, 2013, which was previously incorporated herein by reference in its entirety.]
  b. Mobile device vs. Wall Switch overrides-consumer preference [When overrides are observed, the monitoring system may note which type of device initiated the override, e.g., a wall switch or a mobile device. More frequent use of wall switches may indicate a training issue or a problem with the window application on the mobile device.]
  c. Time/Frequency of various states-usefulness of each state [When multiple tint states are available, and some are underused, it may indicate to the remote monitoring system that there is an issue with a particular state. The system may change the transmissivity or other characteristic of the state.]
  d. Variation by market segment [The frequency of use (popularity) of certain states or other properties of a site's switching characteristics may correlate with a market segment. When a site monitoring system learns this, it may develop and provide market-specific algorithms. Examples of market segments include airports, hospitals, office buildings, schools, government buildings, etc.]
  e. Total number of transitions-Expected number of cycles over warranty period and life by market segment. [This may provide in situ lifecycle information.]

As a further example, the following information may be derived from energy calculations:
  a. Energy saved by zone by season, total system energy saving by season [The site monitoring system may compare energy savings from multiple sites to identify algorithms, device types, structures, etc. that provide improvements. Compare sites and improve lower performing sites.]
  b. Provide advanced energy load information to AC system by zone [Buildings have large thermal masses, so air conditioning and heating do not take effect immediately. Using a solar calculator or other predictive tools (described elsewhere herein), the site monitoring system can provide advance notice to HVAC systems so they can begin a transition early. It may be desirable to provide this information by zone. Moreover, a site monitoring system may tint one or more windows or zones to aid the HVAC system in doing its job. For example, if a heat load is expected on a particular façade, the site monitoring system may provide advance notice to the HVAC system and also tint windows on that side of the building to reduce what would otherwise be the HVAC's cooling requirements. Depending upon the tinting speed of the windows, the site monitoring system can calculate and time tinting and HVAC activation sequences appropriately. For example, if the windows tint slowly, the HVAC activation may be sooner, if they tint quickly, then the HVAC signal to action may be delayed or ramped more slowly to reduce load on the system.]

In certain embodiments, the windows, controllers, and/or sensors have their performance or response checked at an initial point in time and thereafter rechecked repeatedly. In some cases, recent performance/response measurements are compared with earlier performance/response measurements to detect trends, deviations, stability, etc. If necessary, adjustments can be made, or service can be provided to address trends or deviations detected during comparisons. The collection of relevant parameters for a window, sensor, or controller may serve as a "fingerprint" for the device. Such parameters include voltage response, current response, communications fidelity, etc. as described elsewhere herein. In some embodiments, windows, sensors, and/or controllers are checked and optionally fingerprinted at the factory. For example, a switchable window may go through a burn in procedure during which relevant parameters can be extracted. Windows exhibiting problems can have their current performance compared against earlier fingerprints to optionally determine whether the problem developed after shipping/installation or during operation. Fingerprints can also be generated, optionally automatically, when the devices are commissioned (e.g., installed at a site and initially detected and cataloged). Fingerprints can be stored in a memory associated with the window, e.g. in a pigtail. The site monitoring system may reprogram the memory in the pigtail (or other memory) remotely and automatically in certain embodiments. Commissioning is described in PCT Patent application No. PCT/US2013/036456, filed Apr. 12, 2013, and incorporated herein by reference in its entirety.

In certain embodiments, during commissioning at a new site, the site monitoring system compares a designed site layout to the actual, as commissioned layout, to flag any discrepancy at time of commissioning. This may be used to correct a device, controller, etc. at the site or to correct design document. In some cases, the site monitoring system simply verifies that all window controllers, network controllers, zones, etc. match between design document and actual site implementation. In other cases, a more extensive analysis is conducted, which may verify cable lengths etc. The comparison may also identify installation problems such as incorrect photosensor orientations, defective photosensors, etc., and optionally automatically correct such problems. As indicated, during commissioning, the site monitoring system may obtain and store initial fingerprints of many or all individual components in the site, including voltage/current measurements at switchable optical devices for different device transitions. Such fingerprints may be used to periodically check the site and detect degradation in upstream hardware (i.e. wiring, power supplies, uninterrupted power supply (UPS)), as well as window controllers and switchable optical devices. Using a UPS in a switchable optical window network is described in U.S. Patent Application No. 62/019,325, filed Jun. 30, 2014, which is incorporated herein by reference in its entirety.

While much of the discussion herein focuses on systems for detecting and diagnosing issues with networks of switchable optical devices, a further aspect of the disclosure concerns a site monitoring system that leverages these capabilities to automatically collect data, automatically detect problems and potential problems, automatically notify personnel or systems of problems or potential problems, automatically correcting such problems or potential problems, and/or automatically interfacing with building or corporate systems to analyze data, implement corrections, generate service tickets, etc.

Examples of this automatic features of site monitoring systems may include:

1. If there is a slow degradation in current to a window (or other signature of non-fatal issue with switching current received by a window), the site monitoring system can auto-correct this issue by, for example, directing a controller associated with the window to increase the switching voltage to the window. The system may calculate an increase in voltage using empirical and/or analytic techniques that relate changes in current drawn or optical switching properties to changes in applied voltage. The changes in voltage may be limited to a range such as a range defining safe levels of voltage or current for the devices in the window network. The changes to the voltage may be implemented by the site monitoring system reprogramming one or more memories storing tint transition instructions for the window in question. For example, a memory associated with the window, e.g. in a pigtail of the window, is programmed from the factory to contain window parameters that allow a window controller to determine appropriate drive voltages for the electrochromic coating associated with the window. If there is degradation or similar issues, one or more of these parameters may need change and so the site monitoring system reprograms the memory. This may be done, e.g., if the window controller automatically generates drive voltage parameters based on the stored values in the memory (e.g., a memory associated with the pigtail). That is, rather than the site monitoring system sending new drive parameters to the window controller, the system may simply reprogram the window memory so the window controller can determine new drive parameters itself. Of course, the site monitoring system may also provide the tint transition parameters to the window controller, which can then apply them according to its own internal protocol, which may involve storing them in an associated memory or providing them to a higher level network controller.

2. If there is a slow degradation in photosensor (or other signature of non-fatal issue with a sensor) causing a lower than accurate reading, the site monitoring system can auto-correct the sensor reading before using the reading for other purposes such as input for optical device switching algorithms. In certain embodiments, the site monitoring system applies an offset within some limit to compensate a photosensor reading. This allows for, e.g., uninterrupted occupant comfort and automatic adjustment of window tinting for improved aesthetics. Again, for example, the occupant may not realize that any of these changes to the window and/or related components or software has occurred.

3. If the system detects that a room is occupied or learns that the room is commonly occupied, and the tinting algorithm applies a tint after the glare begins, the site monitoring system may automatically adjust the tint algorithm to start earlier, when the room is occupied or predicted to be occupied. In certain embodiments, glare is detected by a photosensor located in a room or outside a room where the glare occurs. The algorithm may employ an occupancy sensor located within the room.

4. When the system detects a difference in tinting times for different windows in the same façade, it may cause all windows to tint at the same time and, if desired, to the same tint level by auto adjusting ramping voltage parameters (if the occupant wants whole façade tinting at the same time).

5. The site monitoring system may detect a window controller that is out of synchronization with other window controllers for a group of windows in a zone or a façade. The description of FIGS. 18A-H contains a detailed explanation of such example. The system may then bring the window back into sync automatically by adjusting the applied switching voltage or taking other remedial action within its control.

The remote monitoring system may collect and use local climate information, site lighting information, site thermal load information, and/or weather feed data for various purposes. A few examples follow.

Weather Service Rating: There are existing services that rely on weather feeds/data to sell and/or enable their services. For example, "smart sprinklers" and even landscaping companies using conventional sprinkler systems use weather data to program their watering patterns. These weather data are often local, e.g. zip code based data, and there are multiple sources of weather data. In certain embodiments, the remote monitoring system uses actual data it collects to rate what weather services predict for any given area. The system may determine which is most accurate and provide that rating to services that rely on weather feeds. Any given weather service may be more accurate depending on the geographical area, e.g. weather service A might be best in San Francisco, but not as good in the Santa Clara Valley (where service B is better). The system can provide a rating service identifying which weather feed is more reliable for a given area, by collecting its actual sensor data, doing statistical analysis, and providing to customers as valuable intelligence. This information is useful for entities other than sites; examples include sprinkler companies, companies that use or control solar panels, outdoor venues, any entity that relies on the weather.

Weather Service: A site monitoring system can collect sensor data live over large geographic areas. In certain embodiments, it provides this data to weather services so that they can more accurately provide weather data. In other words, weather services rely heavily on satellite imagery and larger sky pattern data feeds. Information from one more sites with switchable optical devices and associated sensors, widely deployed, can provide real time ground level information on sun, clouds, heat, etc. Combining these two data, more accurate weather forecasts can be achieved. This approach may be viewed as creating a sensor net across the country or other geographic region where multiple sites exist.

Consumer Behavior: Indirect data from end user patterns can be gleaned, e.g. by knowing when/how end users tint or bleach optically tintable windows in any geographical location or region. In certain embodiments, data collected by the site monitoring system is analyzed for patterns that may have value to other consumer products vendors. For example, "heavy tinters" may indicate: aversion to sun/heat, the fact that high sun levels are present, the need for more water in a region, a region ripe for more sunglasses sales, etc. Likewise, "heavy bleachers" may indicate opposite trends that will be useful to vendors that sell, e.g.: sun lamps, tea, books, heating pads, furnaces, tanning booths, and the like.

The window controllers and/or site monitoring system of the present disclosure, may be used in conjunction with a building management system (BMS) a computer-based control system installed in a building that monitors and controls the building's mechanical and electrical equipment such as ventilation, lighting, power systems, elevators, fire systems, and security systems as described hereinabove. In some embodiments, a BMS may not be present or a BMS may be present but may not communicate with a master network controller or communicate at a high level with a master network controller such as when the site monitoring system communicates with the master window controller directly. In these embodiments, a master network controller can provide, for example, enhanced: 1) environmental control, 2) energy savings, 3) flexibility in control options, 4) improved reliability and usable life of other systems due to less reliance thereon and therefore less maintenance thereof, 5) information availability and diagnostics, 6) effective use of staff, and various combinations of these, because the tintable windows can be automatically controlled. In these embodiments, maintenance on the BMS would not interrupt control of the tintable windows.

In certain embodiments, a BMS may be in communication with the site monitoring system to receive control signals and transmit monitored data from one or more systems in a site network. In other embodiments, the site monitoring system may be in direct communication with the master window controller and/or other systems in a site network to manage the systems.

Figure 9B:
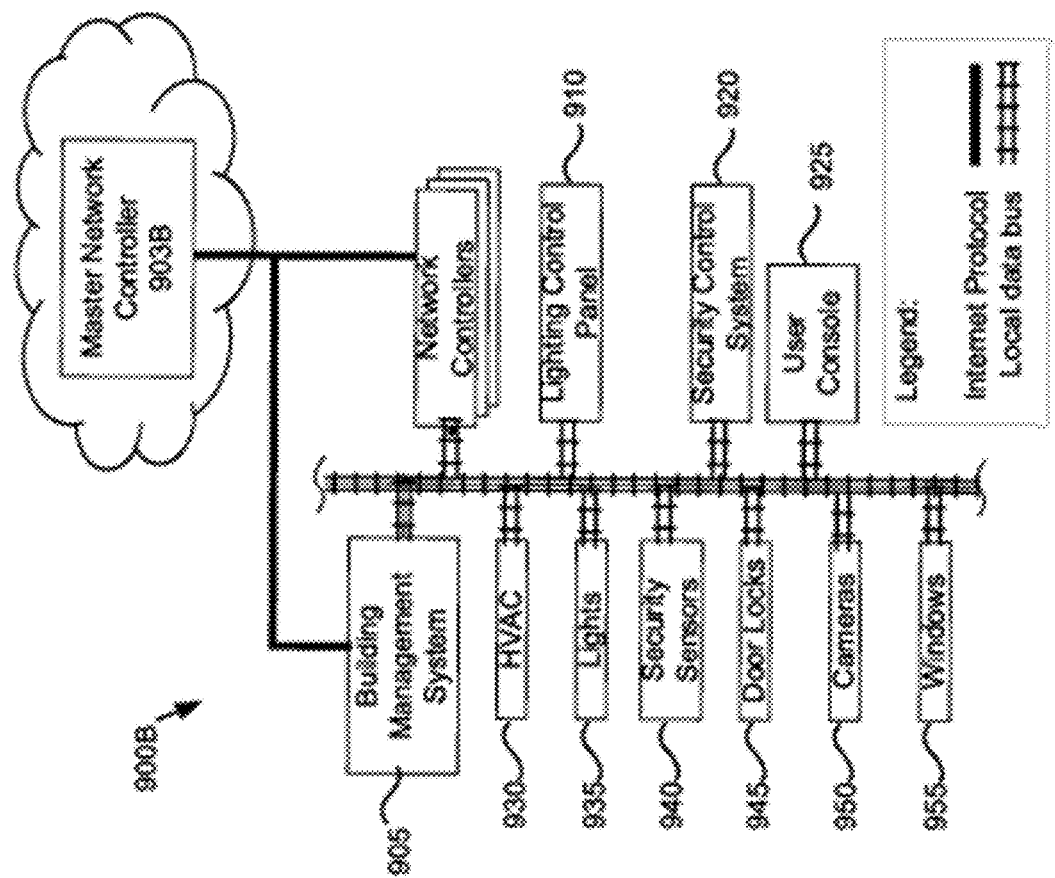
FIGS. 9A and 9B depict examples of a building network block diagram.
Figure 9A:
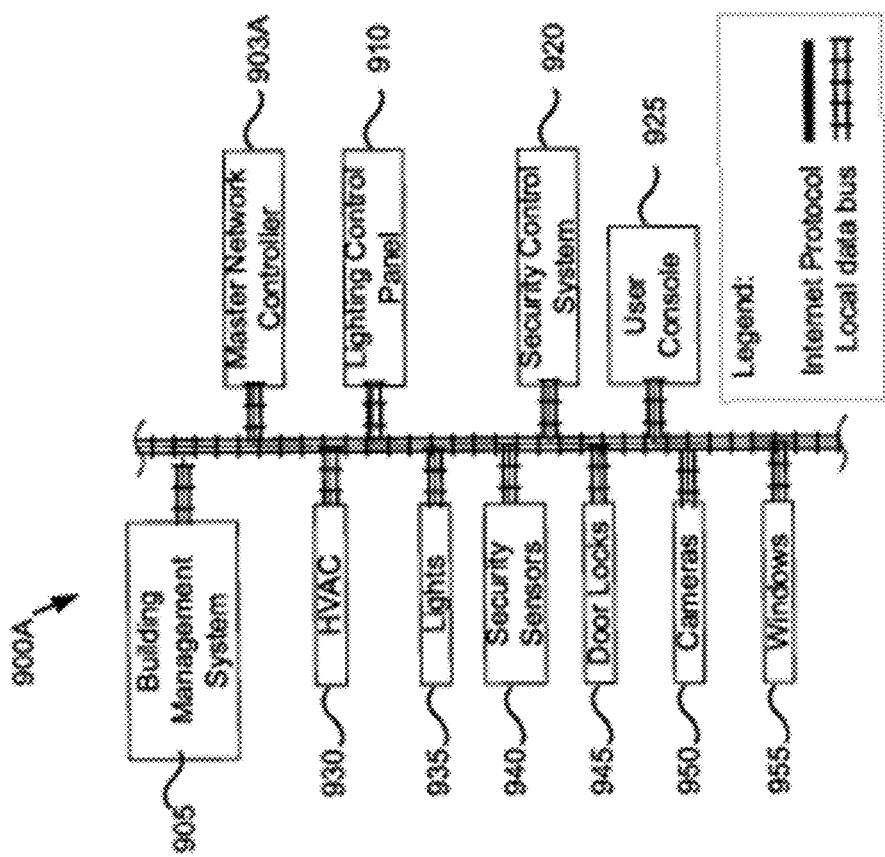

FIGS. 9A and 9B depict examples of a building network block diagram. As noted above, such a network may include any number of different communication protocols, including BACnet and CANopen, operable over local a local data bus. As shown in a first example, FIG. 9A, site network 900A includes a master network controller 903A, a lighting control panel 910, a BMS 905, a security control system, 920, and a user console, 925. These different controllers and systems at the site may be used to receive input from and/or control a HVAC system 930, lights 935, security sensors 940, door locks 945, cameras 950, and tintable windows 955, of the site. As shown in a second example, FIG. 9B, site network 900B is communicatively coupled with a master network controller 903B, and includes, similarly to site network 900A, a lighting control panel 910, a BMS 905, a security control system, 920, and a user console, 925 which may be used to receive input from and/or control a HVAC system 930, lights 935, security sensors 940, door locks 945, cameras 950, and tintable windows 955, of the site. In the example illustrated in FIG. 9B, the master network controller 903B may be incorporated in a site monitoring and control system, such as the site monitoring and control system 800, described hereinabove in connection with FIG. 8. Master network controller 903A and master control network 903B may function in a similar manner as master network controller 603 described in connection with FIG. 6.

In some cases, the BMS 905 may be in communication with a site monitoring and control system, such as the site monitoring and control system 800, described hereinabove in connection with FIG. 8, and receive instructions for controlling the tintable window(s) from the site monitoring system. In other embodiments, network 900B may be in communication with a cloud-based master network controller 903B by way of the Internet for controlling the tintable window(s) in a building.

Lighting control panel 910 may include circuits to control the interior lighting, the exterior lighting, the emergency warning lights, the emergency exit signs, and the emergency floor egress lighting. Lighting control panel 910 also may include occupancy sensors in the rooms of the site. BMS 905 may include a computer server that receives data from and issues commands to the other systems and controllers of the site network. For example, BMS 905 may receive data from and issue commands to each of the lighting control panel 910, and security control system 920. Security control system 920 may include magnetic card access, turnstiles, solenoid driven door locks, surveillance cameras, burglar alarms, metal detectors, and the like. User console 925 may be a computer terminal that can be used by the site manager to schedule operations of, control, monitor, optimize, and troubleshoot the different systems of the site. Software from Tridium, Inc. may generate visual representations of data from different systems for user console 925. In some embodiments, the BMS 905 may receive data from and issue commands to a respective master control network 903A or 903B.

In some cases, the site network 900A or 900B may run according to daily, monthly, quarterly, or yearly schedules. For example, the lighting control system, the window control system, the HVAC, and the security system may operate on a 24 hour schedule accounting for when people are at the site during the workday. At night, the site may enter an energy savings mode, and during the day, the systems may operate in a manner that minimizes the energy consumption of the site while providing for occupant comfort. As another example, the systems may shut down or enter an energy savings mode over a holiday period.

The scheduling information may be combined with geographical information. Geographical information may include the latitude and longitude of a site such as, for example, a building. In the case of a building, geographical information also may include information about the direction that each side of the building faces. Using such information, different rooms on different sides of the building may be controlled in different manners. For example, for east facing rooms of the building in the winter, the window controller may instruct the windows to have no tint in the morning so that the room warms up due to sunlight shining in the room and the lighting control panel may instruct the lights to be dim because of the lighting from the sunlight. The west facing windows may be controllable by the occupants of the room in the morning because the tint of the windows on the west side may have no impact on energy savings. However, the modes of operation of the east facing windows and the west facing windows may switch in the evening (e.g., when the sun is setting, the west facing windows are not tinted to allow sunlight in for both heat and lighting).

Wireless communication between, for example, master and/or intermediate window controllers and end window controllers offers the advantage of obviating the installation of hard communication lines. This is also true for wireless communication between window controllers and BMS. In one aspect, wireless communication in these roles is useful for data transfer to and from electrochromic windows for operating the window and providing data to, for example, a BMS for optimizing the environment and energy savings in a building. Window location data as well as feedback from sensors are synergized for such optimization. For example, granular level (window-by-window) microclimate information is fed to a BMS in order to optimize the building's various environments.

Figure 10:
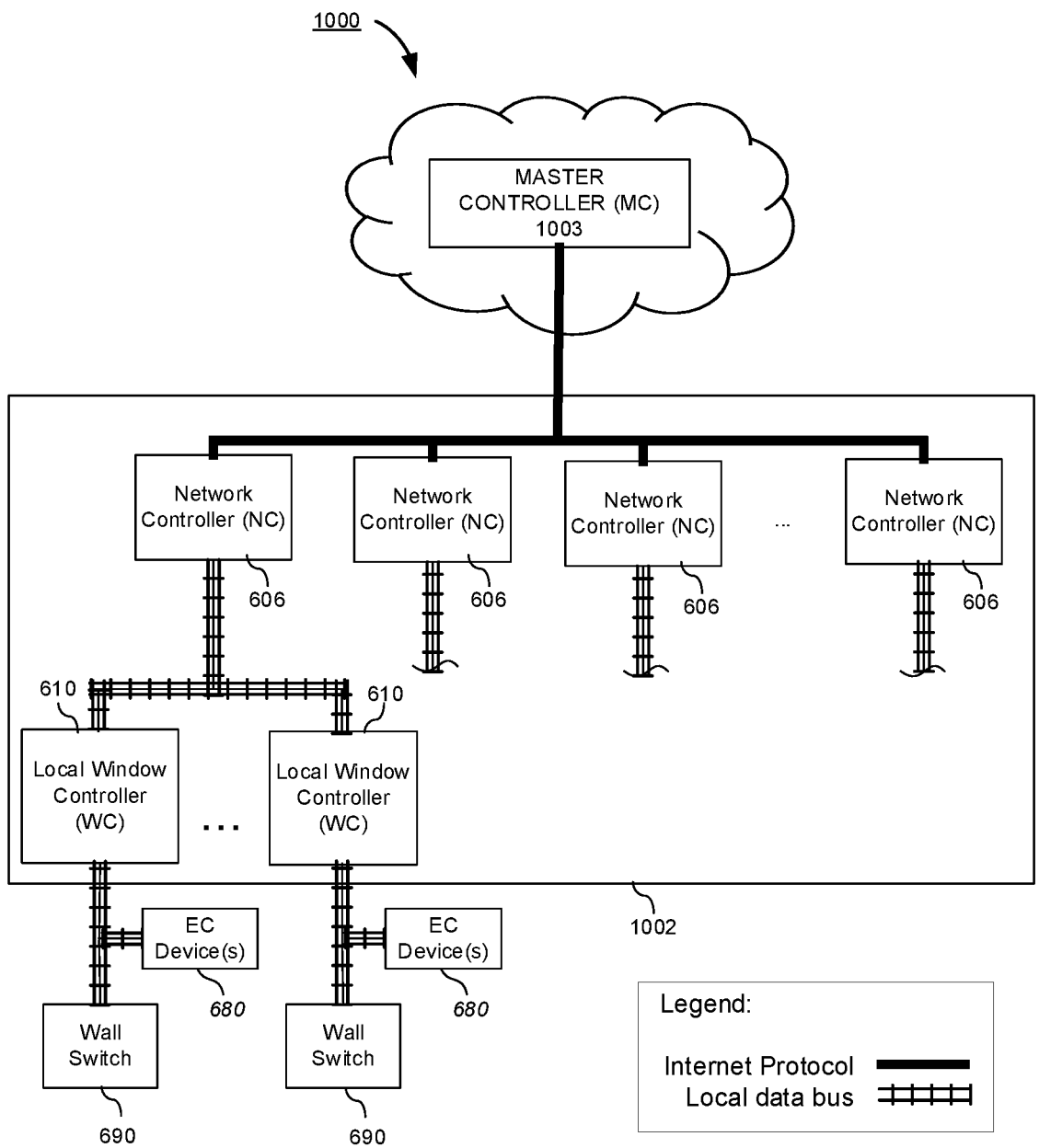
FIG. 10 is a block diagram of components of a system for controlling functions of one or more tintable windows of a building according to certain implementations.

FIG. 10 is a block diagram of components of a system 1000 for controlling functions (e.g., transitioning to different tint levels) of one or more tintable windows of a building (e.g., building 501 shown in FIG. 5), according to another embodiment. System 1000 may or may not be communicatively coupled with a BMS (not illustrated) or may operate independently of a BMS or with a building that does not include a BMS.

Similarly, to system 600 described in connection with FIG. 6, the system 1000 includes a window control system 1002 having a network of window controllers that can send control signals to the tintable windows to control their function. System 1000 also includes a cloud-based master controller 1003 in electronic communication with network controllers 606. The predictive control logic, other control logic and instructions for controlling functions of the tintable window(s), sensor data, and/or schedule information regarding clear sky models can be communicated by the master controller 603 through the Internet to the network controllers 606. In the illustrated example, the network controllers are communicatively coupled by a local data bus (e.g., a CAN bus) with local window controllers. In another example, the master controller 1003 may be in communication with a BMS (not illustrated) to allow the BMS to send instructions for controlling the tintable EC devices/window(s) through the local data bus to the tintable window(s).

Figure 11:
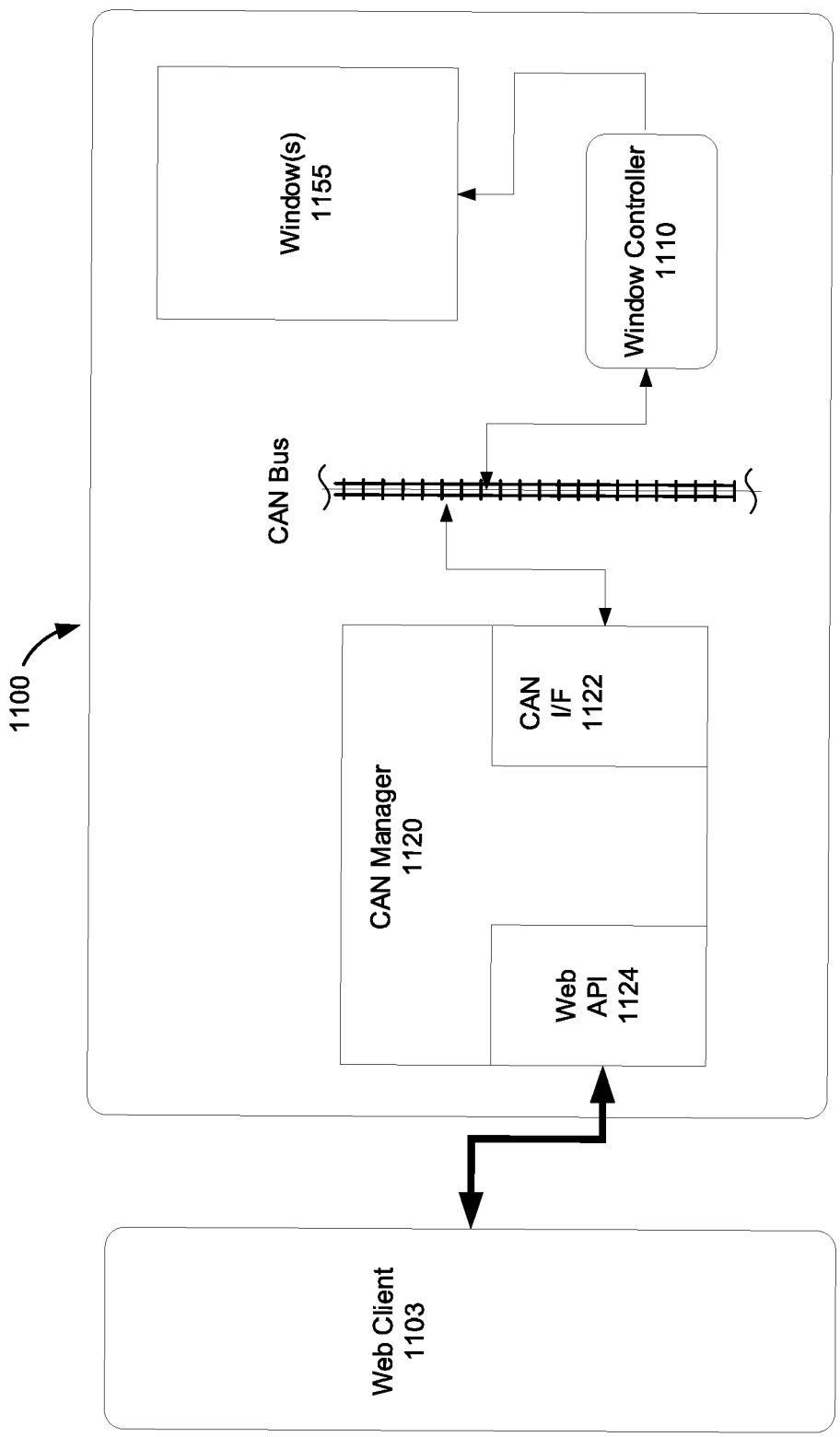
FIG. 11 is a simplified block diagram of a building site interfacing with a cloud-based monitor and control system, according to some embodiments.

FIG. 11 is a simplified block diagram of a building site interfacing with a cloud-based monitor and control system, according to some embodiments. In the illustrated example, a building site 1100 includes electrochromic windows 1155 communicatively coupled with a window controller 1110. In the illustrated example, the window controller 1110 is communicatively coupled, by way of a CAN bus, with a CAN manager 1120. The CAN manager 1120, in some embodiments, may be implemented on a single-board host device. The CAN manager 1120 may include a CAN interface (I/F) 1122 that is communicatively coupled with the CAN bus and a web API 1124 that is communicatively coupled with a web client 1103. The web API 1124 may be configured to receive, and handle HTTP instructions received from the web client 1103. In some examples, the web client 1103 may be or include the master network controller 1003. Alternatively, or in addition, the web client 1103 may include a human operator interface, for example one or more control consoles that may be configured to be accessible using workstations, portable computers, mobile devices such as smartphones, and the like, and to present information about the functioning of devices in the sites.

Figure 12:
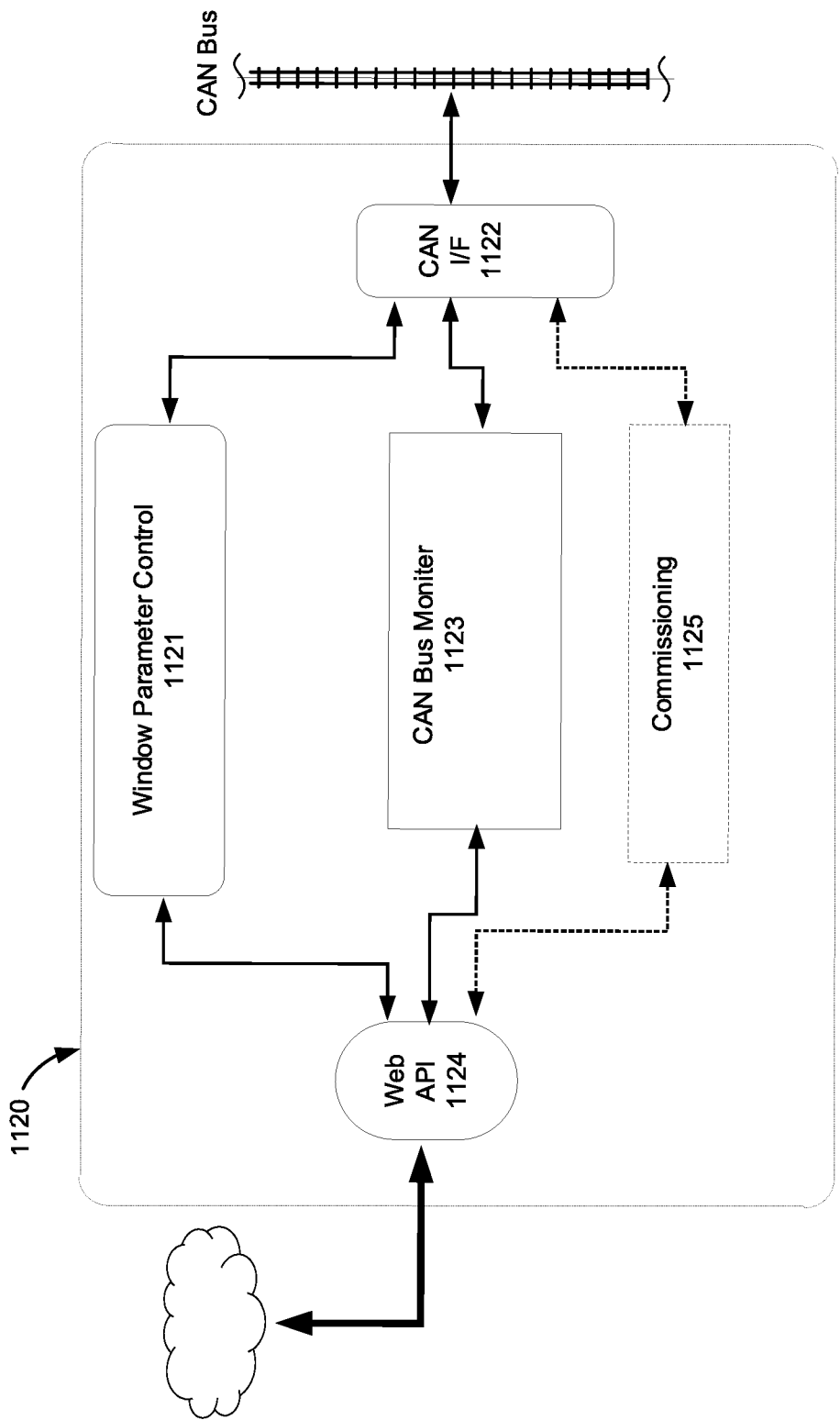
FIG. 12 illustrates features of a CAN manager, according to some embodiments.

FIG. 12 illustrates features of a CAN manager, according to some embodiments. In the illustrated example, the CAN manager 1120 includes, in addition to the web API 1124 and the CAN I/F 1122, functional module blocks for window parameter control, block 1121, CAN bus monitoring, block 1123 and commissioning, block 1125. The window parameter block 1121 may be configured to execute instructions received by way of web API 1124 to change a tint state of an electrochromic window. Such instructions may be executed, for example by, setting values for a parameter on a window controller (not illustrated) that is communicatively coupled with the CAN I/F 1122 by way of the CAN bus. The CAN bus monitor block 1123 may be configured to monitor, by way of the CAN I/F 1122, the health and status of devices communicating with the CAN bus, particularly, the electrochromic windows and any sensors and controllers associated with operation of the electrochromic windows. Such monitored information may be stored locally and/or uploaded (periodically or on-demand) by way of the web API 1124 to the web client 1103 (not illustrated). In the illustrated example the CAN manager 1120 optionally includes commissioning block 1125, by way of which a web client may manage commissioning of electrochromic windows as described above.

Figure 13:
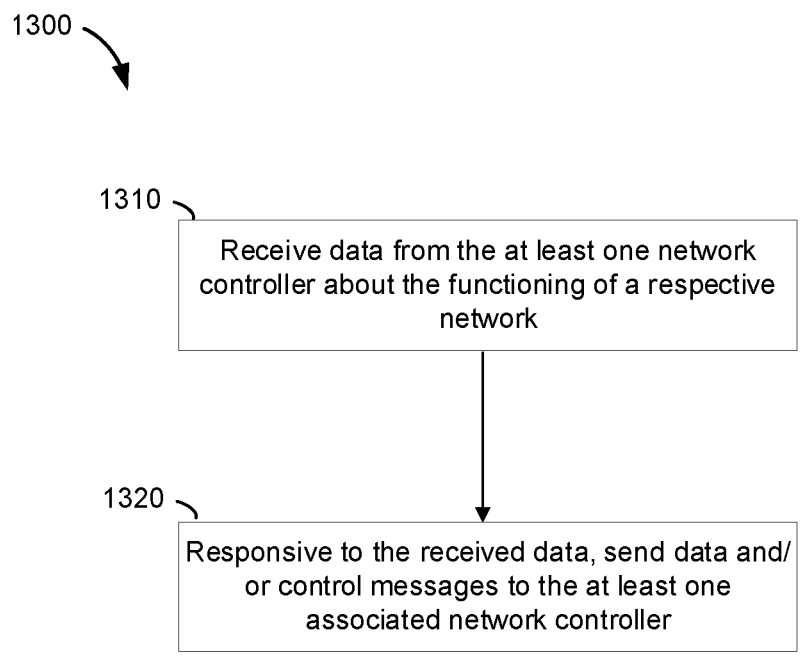
FIG. 13 is a flowchart showing an example of a method of monitoring and/or controlling remote building sites using a cloud-based system.

FIG. 13 is a flowchart showing an example of a method of monitoring and/or controlling remote building sites using a cloud-based system. As described hereinabove, each site may include including a network of electrochromic windows, window controllers and at least one network controller. A method 1300 may begin, at block 1310 with receiving, at the cloud-based system, data from the at least one network controller about the functioning of the respective network. Responsive to the received data, at block 1320, the method may conclude by sending, from the cloud-based system data and/or control messages to the at least one network controller.

It should be understood that techniques as described above can be implemented in the form of control logic using computer software in a modular or integrated manner. Based on the disclosure and teachings provided herein, a person of ordinary skill in the art will know and appreciate other ways and/or methods to implement the disclosed techniques using hardware and a combination of hardware and software.

Any of the software components or functions described in this application, may be implemented as software code to be executed by a processor using any suitable computer language such as, for example, Java, C++ or Python using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

Although the foregoing disclosed embodiments for controlling lighting received through a window or a building's interior have been described in the context of optically switchable windows such as electrochromic windows, one can appreciate how the methods described herein may be implemented on appropriate controllers to adjust a position of a window shade, a window drapery, a window blind, or any other device that may be adjusted to limit or block light from reaching a building's interior space. In some cases, methods described herein may be used to control both the tint of one or more optically switchable windows and the position of a window shading device. All such combinations are intended to fall within the scope of the present disclosure.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A system for controlling one or more electrochromic windows disposed in a facility, the system comprising:
   a hierarchy of controllers comprising a plurality of control levels of which a lower level controller is physically disposed in the facility and a higher level controller is disposed remotely from the facility, wherein:
   the lower level controller is communicatively coupled with at least one window controller by way of a local data bus compliant with a controller area network (CAN) bus standard and includes a CAN manager that includes:
   an interface with the CAN bus;
   a web application programming interface (API) communicatively coupled with the higher level controller and configured to upload information to and receive and handle HTTP instructions from the higher level controller; and
   control logic for: window parameter control of the one or more electrochromic windows, CAN bus monitoring, and commissioning of the one or more electrochromic windows.

2. The system of claim 1, wherein the lower level controller is controlled by the higher level controller.

3. The system of claim 1, wherein the higher level controller comprises one or more controllers that are disposed in the cloud.

4. The system of claim 3, wherein the higher level controller comprises one or more controllers configured to dynamically alter their role in the hierarchy of controllers.

5. The system of claim 1, wherein the lower level controller comprises at least one controller that is configured to directly control the one or more electrochromic windows.

6. A building comprising:
   a network of one or more electrochromic windows being disposed in a facility;
   a hierarchy of window controllers comprising a plurality of control levels of which a lower level controller is physically disposed in the facility and a higher level controller is disposed remotely from the facility, wherein:

the lower level controller is communicatively coupled with at least one window controller by way of a local data bus compliant with a controller area network (CAN) bus standard and includes a CAN manager that includes:

an interface with the CAN bus;

a web application programming interface (API) communicatively coupled with the higher level controller and configured to upload information to and receive and handle HTTP instructions from the higher level controller; and control logic for: window parameter control of the one or more electrochromic windows, CAN bus monitoring, and commissioning of the one or more electrochromic windows.

7. The building of claim 6, wherein at least a portion of logic of the hierarchy of controllers is disposed externally to the facility.

8. The building of claim 7, wherein at least a portion of the logic of the hierarchy of controllers is disposed in a cloud.

9. The building of claim 6, further comprising facilitating adjustment of the one or more electrochromic windows at least in part by considering dynamic user input.

10. The building of claim 9, wherein the facility comprises at least twenty (20) electrochromic windows.

11. A method for controlling one or more electrochromic windows disposed in a facility, the method comprising:

controlling, or directing control of, the one or more electrochromic windows with a hierarchy of controllers that comprises a plurality of control levels of which a lower level controller is physically disposed in the facility and a higher level controller is disposed remotely from the facility, wherein:

the lower level controller is communicatively coupled with at least one window controller by way of a local data bus compliant with a controller area network (CAN) bus standard and includes a CAN manager that includes:

an interface with the CAN bus;

a web application programming interface (API) communicatively coupled with the higher level controller and configured to upload information to and receive and handle HTTP instructions from the higher level controller; and control logic for: window parameter control of the one or more electrochromic windows, CAN bus monitoring, and commissioning of the one or more electrochromic windows.

12. The method of claim 11, wherein the higher level controller comprises one or more controllers that are disposed in the cloud.

13. The method of claim 11, further comprising controlling, or directing control of, an environment of the facility at least in part by controlling the one or more electrochromic windows.

14. The method of claim 11, wherein the facility comprises at least 20 electrochromic windows.

15. The method of claim 11, wherein the facility comprises a multi-story building.

* * * * *